United States Patent
Lai et al.

(10) Patent No.: US 12,236,369 B2
(45) Date of Patent: Feb. 25, 2025

(54) SYSTEM AND METHOD FOR MACHINE LEARNING ARCHITECTURE WITH ADAPTIVE IMPORTANCE SAMPLING WITH NORMALIZING FLOWS

(71) Applicant: ROYAL BANK OF CANADA, Toronto (CA)

(72) Inventors: Zhexin Lai, Toronto (CA); Amir H. Khoshaman, Toronto (CA); Marcus A. Brubaker, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 1065 days.

(21) Appl. No.: 17/163,106

(22) Filed: Jan. 29, 2021

(65) Prior Publication Data

US 2021/0241156 A1    Aug. 5, 2021

Related U.S. Application Data

(60) Provisional application No. 62/968,860, filed on Jan. 31, 2020.

(51) Int. Cl.
*G06N 20/00* (2019.01)
*G06F 17/18* (2006.01)
*G06N 7/01* (2023.01)

(52) U.S. Cl.
CPC .............. *G06N 7/01* (2023.01); *G06F 17/18* (2013.01); *G06N 20/00* (2019.01)

(58) Field of Classification Search
CPC ........... G06N 7/01; G06N 20/00; G06F 17/18
See application file for complete search history.

(56) References Cited

U.S. PATENT DOCUMENTS

| | | | |
|---|---|---|---|
| 11,043,208 B1* | 6/2021 | Michelin | G06N 20/20 |
| 2009/0027390 A1* | 1/2009 | Bin Zafar | G06T 15/506 345/426 |
| 2016/0328656 A1* | 11/2016 | Yuan | G06F 40/284 |
| 2020/0125957 A1* | 4/2020 | Lu | G06F 17/16 |
| 2021/0158149 A1* | 5/2021 | Zhang | G06N 3/04 |

OTHER PUBLICATIONS

Betancourt, M. (2017). A conceptual introduction to hamiltonian monte carlo. arXiv preprint arXiv:1701.02434.
Cappé, O., Douc, R., Guillin, A., Marin, J.-M., and Robert, C. P. (2008). Adaptive importance sampling in general mixture classes. Statistics and Computing, 18:447-459.
Carpenter, B.,Gelman, A, (2013). Stan: A Probabilistic Programming Language. Journal of Statistical Software.
Cornuet, J-M., Jean-Michel Marin, A. M. C. P. R. (2012). Adaptive multiple importance sampling. Scandinavian Journal of Statistics, 39(4):798-812.

(Continued)

*Primary Examiner* — Thu V Huynh
(74) *Attorney, Agent, or Firm* — Norton Rose Fulbright Canada LLP

(57) ABSTRACT

A system for computational estimation sampling from non-trivial probability distributions. The system comprises a processor, operating in conjunction with computer memory. The processor is configured to conduct importance sampling using normalizing flows where a base distribution has a set of parameters that can be adjusted to account for heavy-tailed distributions.

20 Claims, 35 Drawing Sheets

(56) References Cited

OTHER PUBLICATIONS

Craiu, R. and Rosenthal, J. (2014). Bayesian computation via markov chain monte carlo. Annual Review of Statistics and Its Application, 1:179-201.

Dinh, L., Sohl-Dickstein, J., and Bengio, S. (2017). Density Estimation using Real NVP. In ICLR.

Dinh, L., Krueger, D., and Bengio, Y. (2015). NICE: Non-linear Independent Components Estimation. In ICLR Workshop.

Elvira, V., Martino, L., Luengo, D., and Corander, J. (2015). A gradient adaptive population importance sampler. In 2015 IEEE International Conference on Acoustics, Speech and Signal Processing (ICASSP), pp. 4075-4079.

Gelman, A. (2006). Prior distributions for variance parameters in hierarchical models. Bayesian Analysis, (3):515-533.

Grathwohl, W., Chen, R. T. Q., Bettencourt, J., Sutskever, I., and Duvenaud, D. K. (2018). FFJORD: free-form continuous dynamics for scalable reversible generative models. CoRR, abs/1810.01367.

Jan, J.et al. (2017). Stein variational adaptive importance sampling. Uncertainty in Artificial Intelligence 2017.

Hoffman, M. D. and Gelman, A. (2011). The No-U-Turn Sampler: Adaptively Setting Path Lengths in Hamiltonian Monte Carlo. arXiv e-prints, p. arXiv:1111.4246.

Hotelling, H. (1930). The generalization of student's ratio. The Annals of Mathematical Statistics, 2.

Kingma, D. P. and Dhariwal, P. (2018). Glow: Generative Flow with Invertible 1x1 Convolutions. Technical report.

Kingma, D. P. and Welling, M. (2014). Auto-encoding variational bayes. CoRR, abs/1312.6114.

Kingma, D. P., Salimans, T., Jozefowicz, R., Chen, X., Sutskever, I., and Welling, M. (2016). Improved variational inference with inverse autoregressive flow. In Lee, D. D., Sugiyama, M., Luxburg, U. V., Guyon, I., and Garnett, R., editors, Advances in Neural Information Processing Systems 29, pp. 4743-4751. Curran Associates, Inc.

Laguna, M. and Marti, R. (2005). Experimental testing of advanced scatter search designs for global optimization of multimodal functions. J. of Global Optimization, 33(2):235-255.

Liu, Q. et al. (2016). Stein Variational Gradient Descent: A General Purpose Bayesian Inference Algorithm. In NIPS.

Martino, L., Elvira, V., Luengo, D., and Corander, J. (2017). Layered adaptive importance sampling. Statistics and Computing, 27(3):599-623.

Neal, R. M. (2011). Mcmc using hamiltonian dynamic. Handbook of Markov Chain Monte Carlo, pp. 113-162.

Neal, R. M. (2005). The short-cut metropolis method. Technical Report 0506, Department of Statistics, University of Toronto.

Neal, R. M. (1998). Annealed Importance Sampling. Statistics and Computing, (11):125-139.

Owen, A. and Zhou, Y. (1998). Safe and effective importance sampling. Journal of the American Statistical Association, 95:135-143.

Papamakarios, G., Pavlakou, T., and Murray, I. (2017). Masked autoregressive flow for density estimation. In Guyon, I., Luxburg, U. V., Bengio, S., Wallach, H., Fergus, R., Vishwanathan, S., and Garnett, R., editors, Advances in Neural Information Processing Systems 30, pp. 2338-2347. Curran Associates, Inc.

N. G. Polson, J. G. S. (2012). On the Half-Cauchy Prior for a Global Scale Parameter. Bayesian Analysis, (4):887-902.

Rezende, D. J. and Mohamed, S. (2015). Variational Inference with Normalizing Flows. In ICML.

Rippel, O. and Adams, R. P. (2013). High-Dimensional Probability Estimation with Deep Density Models. Technical report.

Ernest K. Ryu, S. P. B. (2015). Adaptive importance sampling via stochastic convex programming. arXiv preprint arXiv:1412.4845.

Salakhutdinov, R. and Hinton, G. (2009). Deep boltzmann machines. In van Dyk, D. andWelling, M., editors, Proceedings of the Twelfth International Conference on Artificial Intelligence and Statistics, vol. 5 of Proceedings of Machine Learning Research, pp. 448-455, Hilton Clearwater Beach Resort, Clearwater Beach, Florida USA. PMLR.

Jascha Sohl-Dickstein, Mayur Mudigonda, M. R. D. (2016). Hamiltonian Monte Carlo Without Detailed Balance.

Tabak, E. G. and Vanden-Eijnden, E. (2010). Density Estimation by Dual Ascent of the Log-Likelihood. Communications in Mathematical Sciences, 8(1):217-233.

Tabak, E. G. and Turner, C. V. (2013). A Family of Nonparametric Density Estimation Algorithms. Communications on Pure and Applied Mathematics, 66(2):145-164.

Wu, Y., Burda, Y., Salakhutdinov, R., and Grosse, R. B. (2016). On the quantitative analysis of decoder-based generative models. CoRR, abs/1611.04273.

Bugallo, M. F., Elvira, V., Martino, L., Luengo, D., Miguez, J., and Djuric, P. M. (2017). Adaptive Importance Sampling: The past, the present, and the future. IEEE Signal Processing Magazine, 34(4):60-79.

Cotter, C., Cotter, S., and Russell, P. (2019) Ensemble Transport Adaptive Importance Sampling. arXiv:1508.01132v4.

Cox, D. R. and Small, N. J. H. (1978). Testing multivariate normality. Biometrika, 65(2):263-272.

Kahn, H. and Marshall, A. W. (1953). Methods of reducing sample size in monte carlo computations. Operations Research, 1(5):263-278.

Knuth, D. E. (1998). The Art of Computer Programming, vol. 3: (2Nd Ed.) Sorting and Searching. Addison Wesley Longman Publishing Co., Inc., Redwood City, CA, USA.

Meyn, S. and Tweedie, R. L. (2009). Markov Chains and Stochastic Stability. Cambridge University Press, New York, NY, USA, 2nd edition.

Müller, T., McWilliams, B., Rousselle, F., Gross, M., and Novák, J. (2018). Neural importance sampling. CoRR, abs/1808.03856.

Plummer, M., Best, N., Cowles, K., and Vines, K. (2005). Coda: Convergence diagnosis and output analysis for mcmc. R News, 6.

Smith, S. P. and Jain, A. K. (1988). A test to determine the multivariate normality of a data set. IEEE Transactions on Pattern Analysis and Machine Intelligence, 10(5):757-761.

\* cited by examiner

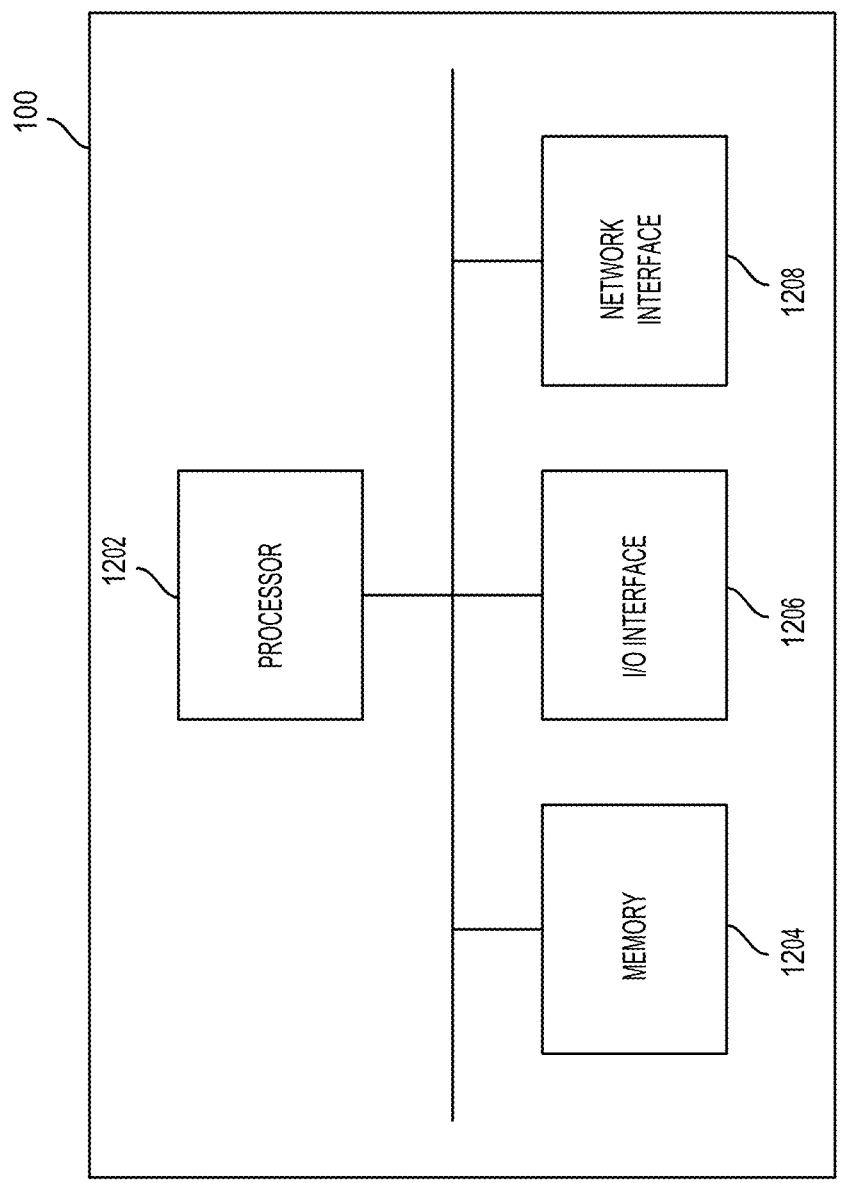

SYSTEM AND METHOD FOR MACHINE LEARNING ARCHITECTURE WITH ADAPTIVE IMPORTANCE SAMPLING WITH NORMALIZING FLOWS

CROSS REFERENCE

This application is a non-provisional of, and claims all benefit, including priority to: U.S. Application No. 62/968,860, filed 2020 Jan. 31, entitled "SYSTEM AND METHOD FOR MACHINE LEARNING ARCHITECTURE WITH ADAPTIVE IMPORTANCE SAMPLING WITH NORMALIZING FLOWS" (Ref.: 05007268-199USPR), incorporated herein by reference in its entirety.

FIELD

Embodiments of the present disclosure generally relate to the field of machine learning, and more specifically, embodiments relate to devices, systems and methods for improving computational performance of processes that utilize Monte Carlo methods.

INTRODUCTION

A challenge with computational approaches that utilize repeated random sampling is that these computational approaches require large amounts of computer processing resources to process complex mathematical models. Due to the high volumes of computer processing resources required, computational efficiency is an important technical limitation (e.g., for a same amount of resources, a superior accuracy is desired). Examples of these computational approaches include Monte Carlo based numerical methods, where randomness is used to solve problems that may be deterministic. These approaches are particularly useful where it is difficult or impossible to use other approaches. For example, Monte Carlo based approaches are useful in physics/phenomena modelling, weather modelling, systems engineering, and finance (e.g., pricing approaches dependent on event probability distributions).

Sequential approaches to repeated sampling may not lend themselves to parallelization, and may be unable to take advantage of recent computing architecture which has improved performance of parallel, repeated and homogeneous tasks. Moreover, approaches to importance distribution sampling to model a target distribution may be inaccurate or unresponsive to heavier tailed target distributions. Improvement is desirable.

SUMMARY

The present application describes systems, methods and devices for estimation of high dimensional integrals or sampling from nontrivial probability distributions. Where it might be straightforward to evaluate a 1D integral, plausible to evaluate a 3D integral or the like, computing functions quickly becomes intractable in further dimensions. The curse of dimensionality led to the adoption of Monte Carlo methods for estimation of high dimensional integrals or sampling from nontrivial probability distributions, as their error is a function of the number of samples used (and the quality of those samples) rather than the dimensionality of the integral itself.

A two staged approach is described in some embodiments, having a first exploration stage coupled to a exploitation stage. The exploration stage can be used to aid, for example, in improving the downstream accuracy of the exploitation stage, for example, by encouraging the model to automatically explore a tail region of the target distribution, and furthermore, a second set of parameters relating to tailed characteristics of a base distribution used for normalizing flow can be iteratively adjusted alongside other parameters of the flow so that heavier-tailed distributions are more easily captured. The exploration stage is useful to in situations where it is important to avoid an arbitrarily large variance, but requires more training cycles relative to a variation with only the exploitation stage.

In an example, Monte Carlo estimation can be used to estimate the risk of system failure, such as the risk of failure within a production line. Factors which are uncertain can be modelled with a distribution (e.g., the likelihood of the failure of a robot in the assembly line), and the general risk of system failure can be modelled by sampling values from the target distribution and evaluating the risk. Approaches to the generating of said estimation include Markov Chain Monte Carlo (MCMC) methods, which inherently require sequential computational processes which are not suited to parallelization.

The present application includes systems, methods and devices implementing importance sampling for generating Monte Carlo estimations, wherein samples are drawn from an importance distribution, which overweighs an important region of the target distribution, to construct a Monte Carlo estimate. Continuing the example, the importance distribution may seek to estimate the risk associated with the robot failing relatively early in its lifecycle, as there may not be replacement parts available, or work arounds may not have been well explored early in the lifecycle. A technical further challenge arises when the target distribution has certain characteristics, such as a heavier tailed distribution.

Unlike MCMC, importance sampling is parallelizable, as it includes repeated sample generation and evaluation which sampling and evaluation are not inherently sequential. Importance sampling may allow for more efficient use of computing resources by leveraging modern parallel computing architecture such as graphical processing units (GPUs).

Approaches to importance sampling have relied upon simplistic chosen importance distributions for ease of implementation. For example, Gaussian distributions are well known and considered easy to work with, and as a result approaches almost exclusively rely upon implementations based on Gaussian distributions.

Simplistic chosen importance distributions are particularly ill suited to capture heavier tailed target distribution characteristics. Bayesian statistical models where the reliability of observed samples is uncertain, and where the expected outcome is also uncertain, is an example of a problem where heavier tailed distributions could be present, and where the limitations of approaches to importance sampling are more pronounced. These shortcomings of the discussed approaches are also present in approaches where normalizing flows are used. Both simplistic chosen importance distributions and poor modelling of heavier tailed distributions may lead to importance sampling that suffers from a high degree of variance as a result of not capturing higher order moments sensitive to tail behaviour of the target distribution.

The present disclosure describes a proposed approach to Monte Carlo estimation which implements importance sampling that accurately models the tail of the target distribution while still learning the general shape and typical set of the target distribution with a relatively small number of samples.

The approach implements a loss function which includes a plurality of moment penalty terms, such as a first order moment, second order moment, etc., (alternatively referred to as scalar penalty terms) to promote the importance sample generator to explore the target distribution efficiently. The penalty terms distinguish between samples from the tail or other locations of the target distribution, and the penalty is defined to encourage the approach to explore tails of the target distribution. By incorporating the plurality of moment penalty terms, the approach further encourages the importance distribution to match tail characteristics of the target distribution.

In some example embodiments, the moment penalty terms are defined by a Chi-Square distance between the centered moments of the target and importance distributions. For example, in example embodiments, the loss function is based on an optimization relation:

$$O_{\chi^2}(F;\theta) = \sum_j^p O_{\chi^2}(f_j;\theta)$$

wherein each $$O_{\chi^2}(f_j;\theta) = \mathbb{V}[f_j(x)w] \approx \frac{1}{N}\sum_i \left(\frac{f_j(x^{(i)})\hat{p}(x^{(i)})}{q(x^{(i)})}\right)^2;$$

wherein for each $f_j$ (where j is an integer) is defined as follows, $f_0(x^{(i)})=1$ and $$f_1(x^{(i)}) = \frac{1}{D}\sum_{d=1}^D x_d^{(i)};$$

and
wherein for $$j>1 \quad f_j(x^{(i)}) = \frac{1}{D}\sum_{d=1}^D (x_d^{(i)} - \bar{x}_d)^j$$

where sample $x^{(i)}=(x_1^{(i)}, x_2^{(i)}, \ldots, x_D^{(i)})\sim q$ and $x=(\bar{x}_1, \ldots, \bar{x}_d)$ is a empirical sample mean of an importance distribution (alternatively referred to as a proposal distribution).

By assigning the moment penalty terms to be a function of the centered moments, and updating the model based on said value, the model reduces the possibility of tails of the importance distribution falling below tails of the target distribution.

In example embodiments, the loss function is further defined by a Kullback-Leibler (KL) divergence and an annealing schedule, where the annealing schedule initially promotes more aggressive exploration of the target distribution by biasing the loss in favour of the penalty terms to a greater extent relative to the KL divergence, and subsequently promotes the fine tuning of the approach by biasing the penalty terms to have a lower weight relative to the KL.

The annealing schedule may be linear, and be provided in accordance with a relation:

$$O(\beta,\theta)=\beta O_{\chi^2}(F;\theta)+(1-\beta)O_{KL}(\theta).$$

The proposed approach also introduces parameterizing and using an adaptive importance distribution (alternatively referred to as a base distribution) for normalizing flows that enables the model to represent heavier tailed distributions by adjusting the parameters of the importance distribution during training. The technical challenges associated with simplistic chosen importance distributions may be overcome with a parameterized importance distribution as the distributions which are capable of modelling light and heavy tailed distributions can be learned, and moreover, greater accuracy can be achieved by updating the importance distribution to more closely resemble the target distribution, as opposed to updating the mapping function.

In some embodiments, the importance distribution is initially a Student's T base distribution, which favourably allows for iterative updating that can capture both light and heavy tail distributions, in contrast to other approaches. Alternatively, rather than a Student's T distribution, other distributions having degrees of freedom that can be adjusted to modify tail behavior as a second set of parameters can also be utilized. For example, a generalized normal distribution/generalized Gaussian distribution GCD (including, for example, various types of Laplace distributions, among others) can provide the additional degree of freedom to be adjusted alongside the flow parameters.

As described in various embodiments, a system, method, and corresponding non-transitory computer readable medium storing machine interpretable instructions (e.g., articles of manufacture directed to computer program products) are directed to an improved computational approach to adaptive importance sampling. This approach can be used to perform Monte Carlo estimation on high dimensional integrals.

Normalizing flows are used to model the importance distribution whose parameters are iteratively updated via a gradient-based method so as to improve the choice of importance distribution while computing Monte Carlo estimates simultaneously.

The normalizing flows incorporate the loss function, and the constituent polynomial expanded Chi-Square loss function adapted for better exploration of the tail region of the distribution.

The proposed approach also introduces an adaptive base distribution for normalizing flows that enables the model to represent heavier tailed distributions which are useful (e.g., critical in some cases) for importance sampling.

In a first aspect, there is provided a system for computational estimation sampling from non-trivial probability distributions, the system comprising: a processor, operating in conjunction with computer memory, the processor configured to: conduct importance sampling by obtaining one or more further sample observations from an importance distribution, the importance sampling using a loss function adapted to minimize a variance of an importance sampling estimator for higher order moments. Higher order moments closely related to tail behaviour, and one definition of tail behaviour relates to the existence of higher order moments. Higher order moments are sensitive to the tail behaviour of the distribution which can lead to high variance importance sampling estimators, if that behaviour is not well captured. Tail behaviour is important to the accuracy and efficiency of importance sampling generally. Therefore, a loss function which focuses on estimation of higher order moments should help better capture tail behaviour.

The system can be provided as part of an overall computer system adapted for conducting Monte Carlo computational analyses. For example, such a computer system can include a computer server that resides within a data center (e.g., a rack server) that is coupled to a message bus where input/training data sets are received.

The computer system may be able to generate a Monte Carlo estimate which provides a desired degree of accuracy or confidence with fewer computational resources relative to exiting approaches. For example, where other approach may require 100 computational calculations to reach the desired accuracy, the proposed approach may only require 90 steps.

The computer system may, in accordance to various embodiments described herein, weigh the samples by a ratio of a target distribution (alternatively referred to as a target posterior) and the importance distribution to construct a Monte Carlo estimate; and to encapsulate the Monte Carlo estimate as a data field in an output data structure. The output data structure can be made available across the message bus such that a downstream computing system can use it as an input or a trigger. For example, the output data structure could be adapted to store data values corresponding to estimated pricing for securities, estimated future weather patterns, estimated physical structures, among others.

Normalizing flows are used as the importance distribution and normalizing flow parameters are iteratively updated using a gradient-based method. The iterative updates may improve the choice of importance distribution while computing Monte Carlo estimates simultaneously.

In another aspect, the normalizing flows use a Student-t distribution or other distribution which is heavy tailed, as a base distribution. Moreover, the base Student-t distribution is parameterized with degrees of freedom, which are learned along with the other parameters of the flow. The use of a Student-t distribution is an unintuitive choice as the technical problems associated with heavier tailed distributions are not well explored or identified, and Applicant notes that the identification of the technical challenges associated with of accurately modelling heavy tailed distributions, as discussed in this description is also a novel consideration. Approaches using standard losses and Gaussian distribution, may result in biasing the model undesirably towards a lighter tail distribution.

In another aspect, implementing normalizing flows includes constructing a complex probability distribution by applying a succession of bijective transformations to a random variable with a defined distribution. A normalizing flow is a transformation of a random variable, $z \in \mathbb{R}^D$, through bijective mappings $f_\theta$ parameterized by $\theta$.

Given the probability density function of z, $p_z(z)$ called base distribution, the probability of the transformed variable $x=f_\theta(z)$ is given by the multivariate change-of-variable formula:

$$q_x(x) = q_z(f_\theta^{-1}(x)) |\det J(x)|$$

where J is the Jacobian matrix of $f_\theta^{-1}$.

Thus the density of x is determined through a combination of the density of the base distribution $p_z$ composed with the mapping function $f_\theta$ and the local change of volume induced by each transformation in the form of the absolute value of the determinant of the Jacobian.

As described herein, normalizing flow models used as importance distributions allow the obtaining one or more further sample observations by applying the bijective maps and evaluating density by the change of variable formula.

In another aspect, the samples are independently obtained or evaluated on a plurality of instances of a parallel computing architecture. An advantage of using importance sampling that it is inherently parallelizable, as samples are independently generated and evaluated; hence, it is parallelizable on GPUs and the estimator is unbiased and guarantees the asymptotic convergence.

In another aspect, the Monte Carlo estimate is generated in relation to at least one of: weather modelling, engineering modelling, physics/phenomena modelling, statistical modelling, and financial modelling.

Corresponding methods, processes, and computer program products (e.g., non-transitory computer readable media storing machine interpretable instructions for execution on a computer processor) are contemplated.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 12 is a diagram of an example computing device, according to some embodiments.

DETAILED DESCRIPTION

Figure 1A:
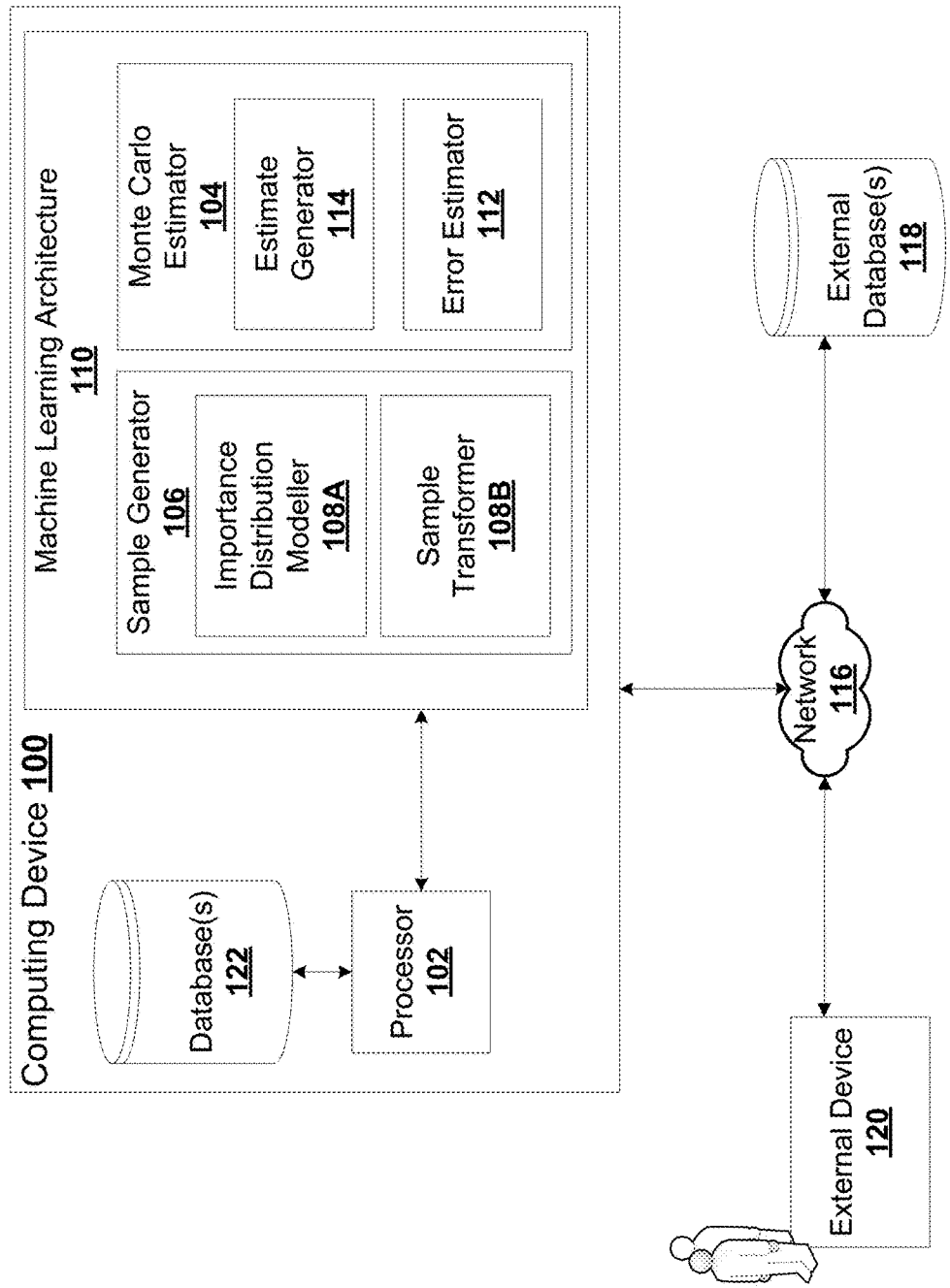
FIG. 1A is an example system for Monte Carlo estimation, according to some embodiments.

As described in various embodiments, a system, method, and corresponding non-transitory computer readable medium storing machine interpretable instructions (e.g., articles of manufacture directed to computer program products) are directed to an improved computational approach to adaptive importance sampling for Monte Carlo (MC) estimation on high dimensional integrals.

MC methods are a class of powerful algorithmic computational approaches that allow estimation of high-dimensional integrals or sampling from nontrivial probability distributions. MC estimations can employ repeated random sampling of target distributions to determine parameters associated with the target distribution. For example, MC estimation may be used to estimate an expected value of a probability distribution.

Experimentally, traditional approaches in conducting MC analyses were found to be insufficient for certain use cases, especially where tail behavior in the target distribution required accurate capture.

Applicant proposes a method of conducting MC analyses based on adaptive importance sampling (AIS). AIS includes two separate features; (1) importance sampling, wherein a target distribution is modelled with an importance distribution, wherein the importance distribution overemphasizes, or is biased, sampling values from an area of the target distribution which is considered to be more important (e.g., sampling to a greater extent from tail regions of a distribution indicative of financial solvency, where the tail represents insolvency) and (2) adaptive importance sampling, where the importance distribution is adjusted over time to more closely match the target distribution based on samples generated from the initial importance distribution.

To generate the MC estimation, adaptive importance sampling (hereinafter referred to generally as importance sampling) draws samples from the latest importance distribution, which samples are used to determine a weight (e.g., a ratio) of the target distribution probability density at the sample and the importance distribution probability density at the sample (i.e., the importance weight). The importance weight is subsequently used to construct a MC estimate.

The following examples are presented here and for reference and to provide an illustration of the uses of adaptive importance sampling and MC estimation.

In an example embodiment, the proposed system generates MC estimates representative of a likelihood that a hospital or other medical service establishments will have a certain amount of infected staff at a particular time. The importance distribution (alternatively referred to as the proposal distribution) may be used to represent one or more of the following likelihoods (the target distribution); the likelihood an infected patient infects a staff member, the likelihood that a patient is infected, the likelihood that a staff member is infected, the likelihood that an infected staff member infects a patient, and so forth. The aforementioned target distributions may be the subject of pre-existing studies, such that at least some characteristics of the target distribution of said phenomena in previous circumstances are known or suspected based on experimental data (e.g., the likelihood that a patient infects a staff member may be suspected to be represented by a ten dimensional Bi-modes diagonal Gaussian distribution based on previous data of infectious diseases).

The proposed model may, via adaptive importance sampling, continually adapt a proposal distribution (e.g., a Student's T distribution) to more accurately represent an estimated ten dimensional Bi-modes diagonal Gaussian distribution. The proposed adaptive importance sampling adapts the proposal distribution by generating samples from the proposal distribution, and assessing them relative to the previous experimental data.

The generated samples may subsequently be used to determine importance weights (as described herein) which are used as samples in a MC estimation.

In another example embodiment, the proposed system generates MC estimates representative of a likelihood of production line failure. Importance distributions may be used to represent the following target distributions: the likelihood of a particular piece of equipment malfunction, the likelihood of staff absences, the likelihood of material shortages, and so forth. The likelihood of the particular piece of equipment may be suspected based on previous information provided by a manufacturer of said equipment, the likelihood of staff absences may be derived from existing staff absence data, and so forth.

As with the hospital example, the proposed system models the target distributions through adaptive importance sampling, and uses at least some samples drawn from the continually updated importance distributions to generate a MC estimate.

In a further example embodiment, the proposed system generates MC estimates representative of a likely price of a particular financial instrument. Importance distributions may be used to represent the following likelihoods; the likelihood of consumer sentiment shifting, the likelihood and magnitude of interest rates changing, and so forth.

An approach to generating MC estimates is Markov Chain MC (MCMC), where samples from a target distribution are obtained by construction and running of a Markov chain for a long time. However, the MCMC framework suffers from a number of technical limitations. First, it is an inherently serial construction, limiting the ability of MCMC methods to exploit the parallel structure of modern computational hardware (e.g., GPUs which are designed to perform homogenous computations in parallel). Second, samples generated with the MCMC method that are temporally close are highly correlated with each other, either increasing the amount of time the model needs to operate to produce an accurate MC estimation, or underrepresenting less explored portions of the target distribution in the final MC estimation. Finally, the constraints placed on Markov Chain transition kernel to implement MCMC make them difficult and often unintuitive to design.

The proposed approach overcomes the serial nature of MCMC by implementing importance sampling to take advantage of parallelizable computing infrastructure. Samples are independently generated (e.g., samples are generated without reference to a previous sample) and evaluated. Furthermore, as a result, the approach is unbiased and guarantees asymptotic convergence.

A technical challenge associated with implementing importance sampling is that the choice of importance distribution may be incorrect, or a poor approximation of the target distribution, such that the variance of the MC estimator can be arbitrarily high or infinite. As a result of these technical challenges, many approaches discard importance sampling as a framework for general purpose MC inference (e.g., arguing that if enough is known about a target distribution to construct a good importance distribution, then there is likely little left to be done).

A further technical challenge associated with implementing importance sampling is that the importance distribution should be heavier tailed than the target distribution. Higher order moments are sensitive to the tail behaviour of the distribution which can lead to high variance importance sampling estimators if that behaviour is not well captured.

Some approaches construct methods that automatically adapt mapping of an importance distribution to the target distribution. The methods, called adaptive importance sampling have been limited by the simplistic nature of their importance distributions which are adapted. For example, they have largely been constructed either as a single Gaussian or as mixtures of Gaussians.

Applicant proposes an approach whereby normalizing flows, a new class of flexible parametric probability distributions, are used to overcome the technical challenges associated with both selecting and generating an importance distribution heavier tailed than the target distribution, and generating complex importance distributions for AIS. Normalizing flows are a framework for constructing complex probability distributions by applying a succession of bijective transformations to a random variable with a simple, known distribution. Normalizing flows represent a potentially powerful class of models for density estimation. The use of normalizing flows in solving some of the technical problems described herein is new, as the study of normalizing flows is in a nascent phase.

The proposed approach incorporates normalized flows to further configure adaptive importance sampling to issues that arise in more general MC estimation for statistical inference, and not just to limited cases. Alternatively stated, the proposed approach constructs a framework of adaptive importance sampling to perform MC estimation on challenging target distributions (e.g., target distributions with heavy tails) using normalizing flows to represent the importance distribution.

As described in some embodiments, a novel loss function is implemented that specifically aims to minimize the variance of the importance sampling estimator for higher order moments. This encourages the machine learning architecture to explore and capture the tail of the target distribution while still learning the general shape and typical set.

The machine learning architecture's ability to learn heavy tailed distributions is explored empirically. Such distributions can be used in respect of in the Hierarchical Bayesian model. In Bayesian inference, a fairly weakly informative prior distribution is desired.

Unfortunately, the empirical results show that some popular normalizing flow models with standard Gaussian as base distribution struggle to model the heavy tailed target distributions. To address this technical challenge, Applicants, in some embodiments, propose an approach to replace the Gaussian base distribution in the normalizing flow with a Student-t distribution. In example embodiments, applicant proposes a base or initial importance distribution to address the variance issue such as heavy tailed distributions including Half-t distribution, Half-Cauchy and log-Normal. Such choice of base or initial importance distributions generally leads to a heavy tailed resulting importance distributions. Moreover, the importance distribution can be a generalized Gaussian distribution which can be parameterized. This provides additional parameters, the degree of freedom, which are learned along with the other parameters of the flow. Further, it also allows the estimated distribution to better capture heavy tailed distributions.

Referring now to FIG. 1, a diagram of a system for computing MC estimates is disclosed. Computing device 100 of the system includes processor 102, databases 122, and machine learning architecture 110.

In example embodiments, the computing device 100 is connected, via networks 116, to external databases 118 or external devices 120 to retrieve information related to generating the MC estimate. For example, computing device 100 may be configured to retrieve samples, distribution models, or other model inputs for either the target distribution or the importance distribution (as described herein) from external databases 118 or external devices 120. According to some embodiments, for example, the computing device 100 is in communication with database 122 of computing device 100 to retrieve samples, distribution models, or other model inputs.

The processor 102 is in communication machine learning architecture 110, including sample generator 106, and MC estimator 104, to generate samples based on the importance distribution, and to generate the MC estimate based on the generated samples. In example embodiments, sample generator 106 and MC estimator 104 are non-transitory computer readable machine code stored in memory of computing device 100, which when executed by the processor cause a computing device 100 to perform any of the methods described herein.

The machine learning architecture 110 includes a plurality of parameters which are used to define the sample generator 106 and MC estimator 104. For example, the sample generator may be a function defined by one or more parameters whose values are iteratively updated with gradient based methods and a loss function. The selection of loss function defines in part which of and how the value of the parameters change with update iterations. For example, some update iterations will only update a few parameters a small amount, and other iterations may update all parameters a large amount. The values of the parameters of machine learning architecture 110 therefore define in part the MC estimates generated by computing device 100.

MC estimator 104 generates MC estimates based on one or more sample observations (hereinafter referred to as samples for ease of reference) obtained by the sample generator 106, for example via estimate generator 114. MC estimator 104 also determines whether samples generated by the sample generator 106 belong to the target distribution with error estimator 112. In example embodiments, as described herein, the MC estimator 104 operates according to different states, wherein in a first state the MC estimator 104 exclusively evaluates error, and in a second state the MC estimator 104 both evaluates error and accumulates samples to generate the MC estimate.

Estimate generator 114 repeatedly, and potentially in parallel, evaluates random samples obtained from the sample generator 106 to obtain numerical results. For example, some example embodiments of estimate generator 114 of MC estimator 104 are described below:

Let $\tilde{p}(x)$ be a non-negative, real-valued function defined in $\mathbb{R}^D$ such that $\int_{\mathbb{R}^D} \tilde{p}(x)dx=Z$ is a finite real positive value.

Then set $\tilde{p}(x)$ to be an unnormalied probability distribution (i.e., the target distribution) such that $$p(x) = \frac{1}{Z}\tilde{p}(x)$$

is its normalized form and $Z$ is called the normalizing constant of $\tilde{p}(x)$.

Estimate generator 114, given $\tilde{p}(x)$ or $p(x)$, would like to estimate $\mathbb{E}_{p(x)}[f(x)]$.

Estimate generator 114, uses the samples generated by the sample generator 106 based on the importance distribution (denoted by $q(x^{(i)})$ or simply $q(x)$) as samples of the target distribution and thereafter evaluates the samples to determine a weight $(w^{(i)})$ and aggregates the weights to determine an expected value $\Sigma_i \overline{w}^{(i)} f(x^{(i)})$, or other parameter, of the target distribution $p(x)$ based on the following relations:

$$\mathbb{E}_{p(x)}[f(x)] = \int f(x)\frac{\tilde{p}(x)}{Z}dx = \int f(x)\frac{\tilde{p}(x)}{Z}\frac{q(x)}{q(x)}dx =$$

-continued $$\mathbb{E}_{q(x)}\left[\frac{f(x)\tilde{p}(x)}{Zq(x)}\right] \approx \frac{1}{N}\sum_i^N \frac{f(x)\tilde{p}(x^{(i)})}{\hat{Z}q(x^{(i)})} \text{ where } \left(\hat{Z} = \frac{1}{N}\sum_i^N \frac{\tilde{p}(x^{(i)})}{q(x^{(i)})}\right).$$

Let $W^{(i)} = \frac{\tilde{p}(x^{(i)})}{q(x^{(i)})}$ and $\overline{w}^{(i)} = \frac{w^{(i)}}{\sum_i w^{(i)}}$.

Then $\hat{Z} = \frac{\sum_i w^{(i)}}{N}$ and $\mathbb{E}_{p(x)}[f(x)] \approx \sum_i \overline{w}^{(i)} f(x^{(i)})$.

Figure 1B:
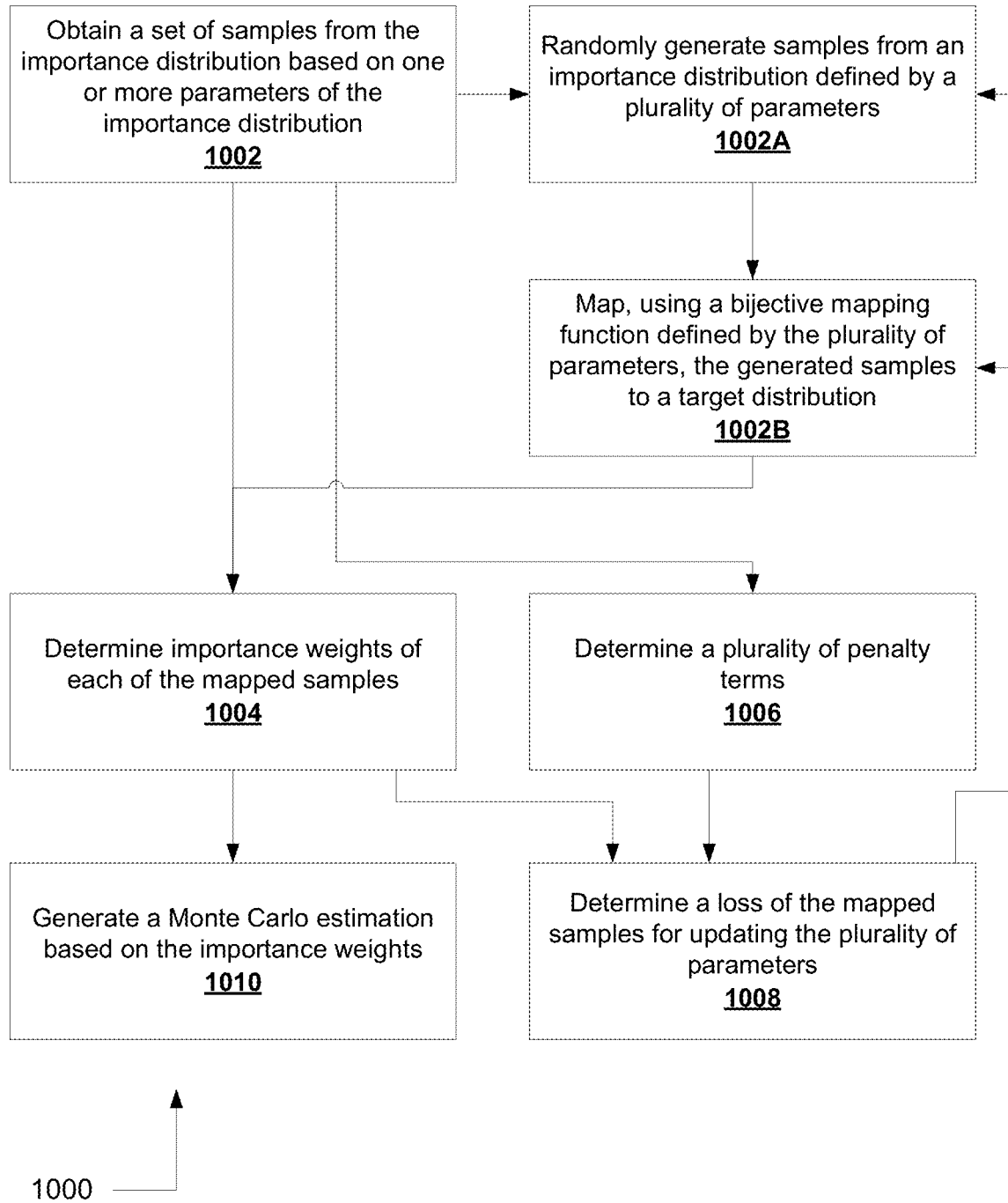
FIG. 1B is a flow chart of a method for generating a Monte Carlo estimation with the system of FIG. 1A, according to example embodiments.

The samples are thereafter aggregated based on (with reference to FIG. 1B).

For a sequence of importance distributions $\{q(x; \theta_t)\}_{t=0}^T$ where T is the total number of iterations and $q(x; \theta_t)$ is the importance distribution parameterized by $\theta_t$ at iteration t.

At block 1002, for each $q(x; \theta_t)$, the approach includes drawing a set of samples $\{x_t^{(i)}\} \sim q(x; \theta_t)$, where $\theta_t$ is determined by samples from the previous iteration $\{x_{t-1}^{(i)}\}$.

At block 1004, the weights are determined and normalized via:

$$\overline{w}_t^{(i)} = \frac{w_t^{(i)}}{\sum_{t,i} w_t^{(i)}}.$$

At block 1010, a MC estimation is performed based on: $\mathbb{E}_{p(x)}[f(x)] \approx \Sigma_{t,i} \overline{w}_t^{(i)} f(x_t^{(i)})$.

Once the samples have been aggregated, or prior to the samples being aggregated to determine an expected value (e.g., where the MC estimator 104 operates according to a first stage) the MC estimator 104 may determine an error of the generated sample with error estimator 112. For example, as will be described below, the error estimator 112 may employ a loss function to determine an error associated with the samples.

Error estimator 112 of MC estimator 104 may implement adaptive importance sampling, where the importance distribution of importance distribution modeller 108A used to obtain the samples is updated based on previous samples. In example embodiments, error estimator 112 may simply determine the weights of the generated samples and a separate gradient determiner (not shown), or other component may implement adaptive importance sampling based on the values determined by error estimator 112.

In order to update the plurality of parameters of machine learning architecture 110 of the sample generator 106 (e.g., the plurality of parameters that define the importance distribution modeller 108A), the machine learning architecture 110 is configured with a loss function defined to processes samples previously generated by the sample generator 106. The plurality of parameters are updated based on a gradient of the loss function.

In previous approaches, the error estimator 112 would update the parameters $\theta_t$ of the mapping function (e.g., at least some of the plurality of parameters), with a forward KL divergence as a loss function to determine the extent of the updates to the parameters, which frame work is shown below:

$$O_{KL}(\theta) = KL[\tilde{p}(\cdot) \| q(\cdot; \theta)] \quad (1)$$

$$= \int \tilde{p}(x) \log \frac{\tilde{p}(x)}{q(x;\theta)} dx \quad (2)$$

-continued $$= \int \tilde{p}(x)\log\tilde{p}(x)dx - \tilde{p}(x)\log q(x;\theta)dx \quad (3)$$

$$= C - \int \frac{\tilde{p}(x)q(x;\theta)}{q(x;\theta)}\log q(x;\theta)dx \quad (4)$$

$$= C - \mathbb{E}_{q(x)}\left[\frac{\tilde{p}(x)}{q(x)}\log q(x;\theta)\right] \quad (5)$$

$$\approx C - \sum_i \bar{w}^{(i)}\left(x^{(i)};\theta\right), \quad (6)$$

where $x^{(i)} \sim q(x;\theta)$ and $$\bar{w}^{(i)} = \frac{w^{(i)}}{\sum_i w^{(i)}};$$

$$w^{(i)} = \frac{\tilde{p}(x)}{q(x;\theta)},$$

and C is a constant not depending on θ.

Applicant notes that the first term in equation (6) does not depend on the parameters θ; hence minimizing the KL divergence is equivalent to maximizing $\Sigma_i \bar{w}^{(i)} \log q(x^{(i)}; \theta)$. The approaches have indicated that forward KL divergence may perform well in image rendering application.

Applicant submits that forward KL divergence does not promote sufficiently efficient sampling. For example, the KL divergence may be modelled by the Renyi divergence between the distributions, defined as:

$$D_\alpha(q(x)\|p(x)) = \frac{1}{\alpha-1}\log\int p(x)^\alpha q(x)^{1-\alpha}dx \quad (7)$$

as α→1.

As is shown in eq. (7), the KL forward divergence does not provide a sufficiently severe penalty for any x where density of the target distribution p(x), is greater than the density of the importance distribution q(x), which discourages efficient sampling where samples have said characteristics.

Applicant proposes an approach that encourages the proposal distribution to explore the support of the target distribution as much as possible. Two alternate approaches are described; a first approach that determines error based on the Chi-Square distance between the target distribution and the importance distribution (which is equivalent to minimizing the variance of importance weights), and a second approach which further defines the error based on the KL divergence and selectively weighting said KL divergence.

By configuring error estimator 112 to determine loss as a function of the Chi-Square distance between the target distribution and the importance distribution, the error estimator 112 is more likely to explore the support of p than forward KL divergence. For example, optimizing the aforementioned Renyi divergence of α=2, is equivalent to optimize the log of variance of importance weights (or Chi-Square distance between the target and importance distribution), as shown below:

$$\mathcal{O}_{\chi^2}(f;\theta) = \log\mathbb{V}_q\left[\frac{\tilde{p}(x)}{q(x)}\right]. \quad (8)$$

$$= \log\left(\mathbb{E}_q\left[\left(\frac{\tilde{p}(x)}{q(x)}\right)^2\right] - \left[\mathbb{E}_q\left(\frac{\tilde{p}(x)}{q(x)}\right)\right]^2\right) \quad (9)$$

$$= \log\left(\mathbb{E}_q\left[\left(\frac{\tilde{p}(x)}{q(x)}\right)^2\right] - \underbrace{\left(\int \tilde{p}(x)dx\right)^2}_{\text{Constant}}\right) \quad (10)$$

$$= \log\mathbb{E}_q\left[\left(\frac{p(x)}{Zq(x)}\right)^2\right] - \text{Constant} \quad (11)$$

$$= \log\mathbb{E}_q\left[\left(\frac{p(x)}{q(x)}\right)^2\right] - \log(Z^2) - \text{Constant} \quad (12)$$

$$= \log\mathbb{E}_q\left[\left(\frac{p(x)}{q(x)}\right)^2\right] - \text{Constant}. \quad (13)$$

Where the equivalence between Chi-Square distance and minimizing is shown as equation (10) can be interpreted as minimizing the variance of the normalizing constant's estimator (That is, one chooses f to be $$f(x) = \int \tilde{p}(x)dx = Z, \text{ then}$$

$$\log\mathbb{V}_q\left[\frac{f(x)\tilde{p}(x)}{q(x)}\right] = \log\mathbb{V}_q\left[\frac{Z\tilde{p}(x)}{q(x)}\right] = \log\mathbb{V}_q\left[\frac{\tilde{p}(x)}{q(x)}\right] - C,$$

where C is a constant).

This amounts to finding proposal distribution that gives the best estimate of the normalizing constant.

Applicant submits that, for α=2, which is a subset of instances that include an α larger α>1, the error estimator 112 penalizes more severely for any x such that p(x)>q(x).

Applicant proposes that the error estimator 112 operate according to the following function:

$$\mathcal{O}_{\chi^2}(F;\theta) = \sum_j^\rho \mathcal{O}_{\chi^2}(f_j;\theta) \quad (14)$$

where each $$\mathcal{O}_{\chi^2}(f_j;\theta) = \mathbb{V}[f_j(x)w] \approx \frac{1}{N}\sum_i \left(\frac{f_j(x^{(i)})\tilde{p}(x^{(i)})}{q(x^{(i)})}\right)^2.$$

where hereinafter $$\frac{\tilde{p}(x^{(i)})}{q(x^{(i)})}$$

will be referred to as the importance weight, or importance value and denoted by w.

For each $f_j$ (where j is an integer) is defined as follows, $f_0(x^{(i)})=1$ and $$f_1(x^{(i)}) = \frac{1}{D}\sum_{d=1}^D x_d^{(i)}.$$

For $$j > 1 \quad f_j(x^{(i)}) = \frac{1}{D}\sum_{d=1}^{D}(x_d^{(i)} - \bar{x}_d)^j$$

where the sample $x^{(i)} = (x_1^{(i)}, x_2^{(i)}, \ldots, x_D^{(i)}) \sim q$ and $\bar{x} = (\bar{x}_1, \ldots, \bar{x}_d)$ is the empirical sample mean of proposal distribution.

Applicant's proposed approach avoids the technical challenge of past approaches in that different weights are assigned to different importance weights. For example, one can think of equation (8) as a special case of $\mathbb{V}_q[f(x)w]$ when $f(x)=1$. That is, for each of $x \sim q(x)$, the penalty assigned to individual importance weights is constant (independent of whether the sample comes from the tail or central regions of q; see FIG. 10C).

The proposed error function is an error loss $\mathbb{V}_q[f(x)w]$ in which $f(\cdot)$ assigns each importance weight w a unique penalty based on the location of the value relative to the importance distribution geometry and encourages the importance distribution to match target distribution on multiple moment estimations (normalizing constant, mean, variance, skewness and kurtosis). For example, the i-th importance weight is assigned a positive scalar penalty $$\left(\frac{1}{D}\sum_{d=1}^{D}(x_d^{(i)} - \bar{x}_d)^j\right)^2$$

in the loss function, and samples $x^{(i)}$ that are further away from the empirical mean of importance distribution (i.e., samples in the tail regions of proposal) will be penalized based on their distance from the empirical mean of target distribution in the polynomial order (see FIG. 10C) and the gradient of $$\frac{p(x^{(i)})}{q(x^{(i)})}$$

is scaled up. In this way, the scalar function $f_j$ allows the approach to match the j-th of centered moment of the importance distribution with the target distribution.

The proposed error function strongly encourages space exploration and overcomes the pitfalls from the tail underestimation by incorporating a penalty based on the samples location under the importance distribution. Moreover, since poor estimation often results from the infinite variance of importance weights attributed to the tail underestimation, matching the centered moments (rather than un-centered ones) is important to reduce the possibility of tails of q falling below tails of p.

In example embodiments, other moment estimators are used to define the degree of the scalar penalty assigned to the sample based on its location in the importance distribution.

Applicant further proposes another method of operating the error estimator 112. While the first approach promoted more efficient sampling, it may not necessarily lead to desirable performance on higher order estimations. Estimating error based solely on Chi-Square may encounter issues where the dimensionality of the target distribution becomes higher, as the performance of an error estimator based on Chi-Square distance becomes similar to the forward KL divergence, in the sense of not being able to explore the support of target distribution.

Alternatively stated, the first proposed approach may, in example embodiments, encourage aggressive exploration of the support of importance distribution, but possibly inhibit fine-tuning of the importance distribution to the local regions of target distribution.

Applicants propose to balance the trade-off between the competing goals of aggressive exploration and fine-tuning through the use of a linear annealing schedule between equation (14) and by incorporating KL divergence (more localized method as explained above) with the following formula:

$$O(\beta,\theta) = \beta O_{\chi^2}(F;\theta) + (1-\beta)O_{KL}(\theta) \quad (15)$$

The annealing schedule (i.e., $\beta$ and $(1-\beta)$) may be responsive to the different operating states of the MC estimator 104, where in the first state, the MC estimator starts to update the model parameters of the sample generator 106 through training of the normalizing flow by optimizing Chi-Square distance (i.e., $\beta$ is large or close to one) to take advantage of the greater stability to optimize and, in a second state, gradually shift the approach to error estimation towards the KL loss (i.e., $\beta$ is small or close to zero) once the error estimator 112 becomes more stable in order to capture the tail behaviour.

Samples which are used in the MC Estimator 104 are generated by sample generator 106.

Sample generator 106 includes an importance distribution model 108A and a sample transformer 108B. The Sample generator 106 is a computer representation of an importance distribution and a mapping function, and is alternatively referred to as the proposal distribution model data object.

The sample transformer 108B is configured to draw samples from the importance distribution model 108A and transform them into samples of the target distribution (or estimates of what would be target distribution samples) based on the trainable plurality of parameters.

In example embodiments, the sample generator 106, which is representative of normalizing flow architecture, is configured to include one or more parameters to transform a random variable, $z \in \mathbb{R}^D$ from the importance distribution model 108A, through bijective mappings $f_\theta$ parameterized by $\theta$ (i.e., the sample transformer 108B) into samples from the target distribution.

The sample transformer 108B, given the probability density function of the variable z, represented as $p_z(z)$ (e.g., the function defining the base distribution of the importance distribution model 108A), generates the probability of the transformed variable $x = f_\theta(z)$, given by the multivariate change-of-variable formula:

$$q_x(x) = q_z(f_\theta^{-1}(x))|\text{det}J(x)| \quad (16)$$

where J is the Jacobian matrix of $f_\theta^{-1}$.

Thus the density of x (a sample observation) is determined through a combination of the density of the importance distribution $p_z$ composed with the mapping $f_\theta$ and the local change of volume induced by each transformation in the form of the absolute value of the determinant of the Jacobian.

Hereinafter, for ease of reference, $q(\cdot; \theta)$ will represent the sample generator 106 with the parameters $\theta$. Applicants denote this model as FAIS (flow adaptive importance sampling).

As will be and has been described herein, the parameters $\theta$ of importance distribution model 108A and sample transformer 108B are iteratively updated via a gradient-based method and further based on a MC estimate evaluated with samples generated by sample generator 106. Updating the parameters improves the performance of the importance distribution model 108A and the sample transformer 108B while computing MC estimates simultaneously.

In some embodiments, the proposed approach mitigates the technical challenge of using having a light tailed distribution as a base distribution, which has difficulty modelling heavy tailed distributions, by using a Student-t as the base distribution in the sample generator 106. Applicants, during experimentation, observed that it is formidable challenge for a sample generator 106 with light-tailed base distribution (such as a normal distribution) to learn heavy-tailed target distributions. The sample generator 106, with a Student-t as the base distribution, more accurately models heavy tailed distributions by learning the degree of freedom of the Student-t distribution based on the training data. In example embodiments, one of a variety of heavily tailed distributions may be used in place of a student-t distribution, such as Half-t distribution, Half-Cauchy and log-Normal distributions.

For example, when the degree of freedom of the Student-t base distribution approaches 1, the distribution converges to the Cauchy distribution with heavy tails. As the degree of freedom goes to infinity, the distribution approaches a Gaussian distribution. This allows the sample generator 106, with a Student-t as the base distribution, to effectively capture a wide family of heavy-tailed distributions.

Returning again to FIG. 1B, the method 1000 of MC estimation including updating the plurality of parameters of the machine learning architecture 110 includes:

At block 1002A, the method includes randomly generating samples from an importance distribution defined by a plurality of parameters.

At block 1002B, the method includes mapping, using a bijective mapping function defined by the plurality of parameters, the generated samples to a target distribution. The result of the sampling includes a data object which can represent an expected sample of the target distribution. For example, a sample could be a data structure or object storing a value representative of an interest rate value, a rate of infection, etc.

At block 1006, the method includes determining a plurality of moment penalty terms (alternatively referred to as scalar penalty terms). For example, the plurality of moment penalty terms may be the moment penalty terms for a batch of samples, as described herein, and dependent upon the estimated mean of the samples of the batch.

At block 1008, the method includes determining a loss with the loss function (e.g., equations 14 or 15). The determined loss is subsequently used to update the plurality of parameters.

To summarize, in a first state of operation, the machine learning architecture 100 is configured to generating samples at block 1002, based on blocks 1002A and 1002B, determine importance weights based on the generated samples at block 1004 and determine moment penalty terms based on block 1006. The machine learning architecture 100 is further configured to determine a loss based on the importance weights and the moment penalty terms, and update the plurality of parameters that define the bijective mapping function and the importance distribution based on said loss. In this first state, the importance weights are discarded.

In a second state of operation, the importance weights are further utilized to generate the MC estimates at block 1010. For example, a MC estimates could be a data value in an output data structure, which data value could be representative of an expected price of an instrument, an expected amount of individuals to be infected, and so forth.

An algorithm representation of method 1000 is shown below:

---
Algorithm 1:

Input : T := total number of training steps; O(Θ) := loss function; p̃(x) := target distribution; q(x; Θ⁰) := normalizing flow parameterized by Θ⁰ = {θ⁰; df⁰} where df⁰ is the initial degree of freedom and θ is the flow parameters; M ∈ N number of exploratory steps
S ← { }; W ← { };
for t := 0, ... T do Draw $\{x_t^{(i)}\}_{i=1}^{S} \sim q(x; \theta^t)$ and compute weights $w_t^{(i)} \leftarrow \frac{\tilde{p}(x)}{q(x; \Theta^t)} \forall i$ Compute loss function $O(\Theta)$ and gradient $\frac{\partial O}{\partial \Theta}$ Update $\Theta^{t+1}$ using Adam
    if t > M then
        Save the samples and weights S ← S ∪ {$x_t^{(i)}$}; W ← W ∪ {$w_t^{(i)}$}
    end
end
return S, W

---

Figure 1C:
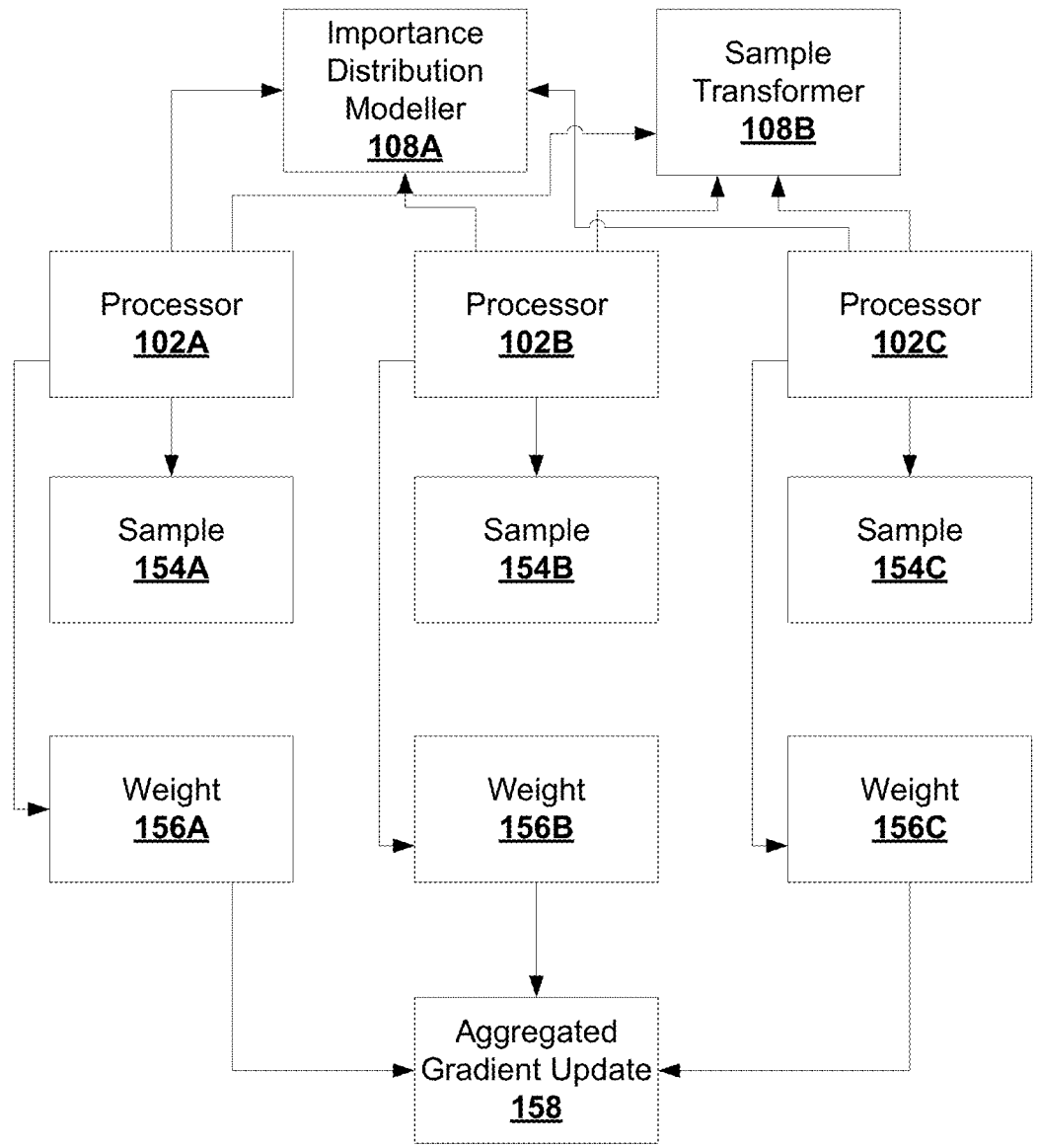
FIG. 1C is a schematic diagram of parallel sample generation with the system of FIG. 1A, according to example embodiments.

Referring now to FIG. 1C, a schematic diagram of parallel sample generation with the system of FIG. 1A, according to example embodiments is shown.

Processor 102, shown as a series of processors 102A, 102B, and 102C (or a series of processing threads) which access or retrieve the importance distribution modeller 108A and the sample transformer 108B of sample generator 106.

Each of processors 102A, 102B, and 102C generate a sample (respectively sample observations 154A, 154B, and 154C) independent of one another based on the current plurality of parameters defining the importance distribution modeller 108A. Each of processors 102A, 102B, and 102C generate a weight value for the respective sample (e.g., weight values 156A, 156B, and 156C for sample observations 154A, 154B, and 154C). In example embodiments, some processors are configured to continually generate samples, and other processors continually generate weights based on retrieved samples, all operating in parallel. Each processor may further be configured to generate, via error estimator 112, a gradient value associated with the respective sample observation, wherein the aggregate gradient value of the batch of samples (i.e., the samples generated prior to updating the plurality of parameters) is used to update the plurality of parameters. For clarity, the gradient value associated with the respective sample observation is the evaluation of the gradient, for example, of equation 14 for the particular sample observation.

As presented herein, Applicants empirically demonstrate that the proposed approaches not only improves the range of distributions that can be accurately modelled with importance sampling, but also leads to improvements in at MC estimation and maximum likelihood.

In example embodiments, the operating characteristics of the proposed approach are measured with one or more diagnostics to determine whether the importance distribution matches the target distribution. An implicit advantage of implementing the sample generator 106 as a normalized flow architecture is that said architecture admits some natural diagnostics for assessing whether the proposal is matched up with target distribution.

For example, matching can be done by drawing some test samples x~p(x), and then performing inverse function z=f⁻¹(x). If z≁$q_z$, there is evidence that the proposal has fitted target poorly.

In the context of importance sampling, one cannot generate samples from target distribution. However, the system can use a sub-sampling method to assess the learning performance without accessing the samples of $\tilde{p}$.

Figure 2A:
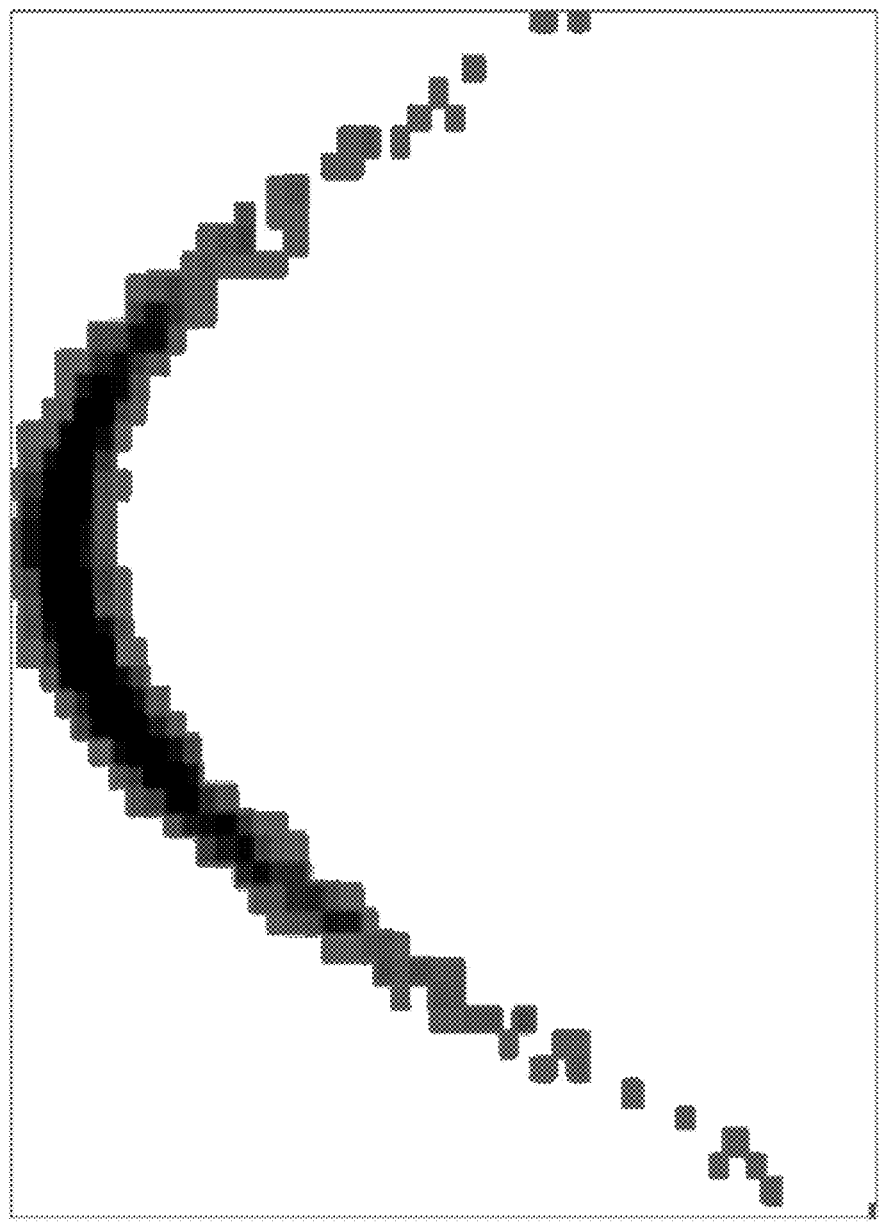
FIG. 2A is a graph diagram of a target distribution, according to some embodiments.
Figure 2B:
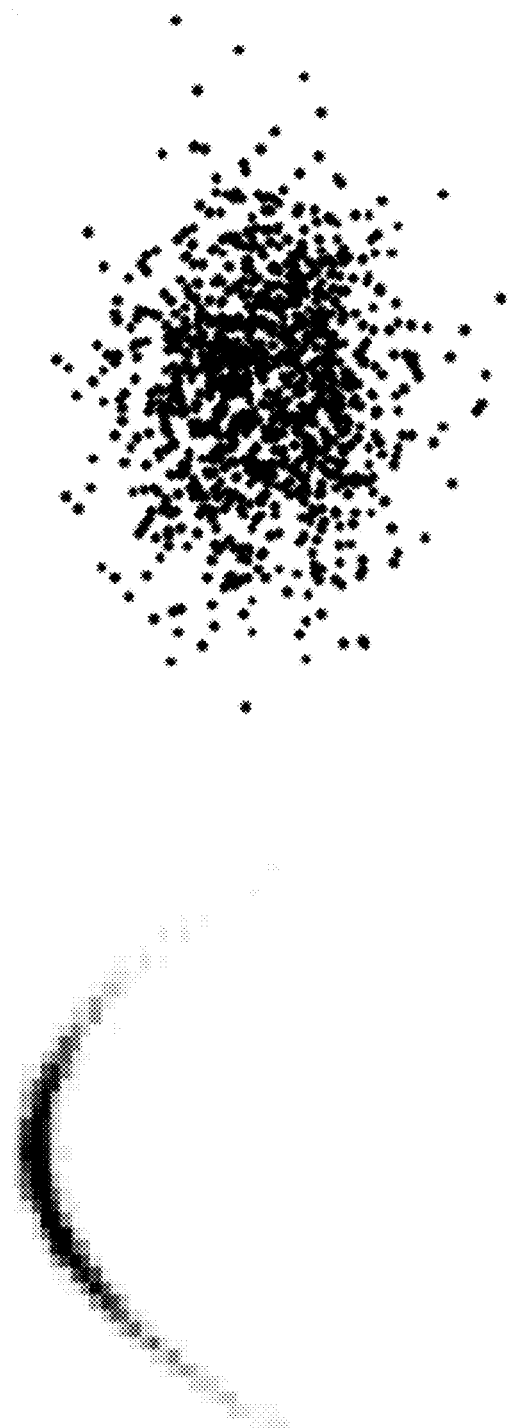
FIG. 2B is a graph diagram of inversely transformed sub-samples behavior based on how well an approximation approximates of the target distribution, according to some embodiments.
Figure 2C:
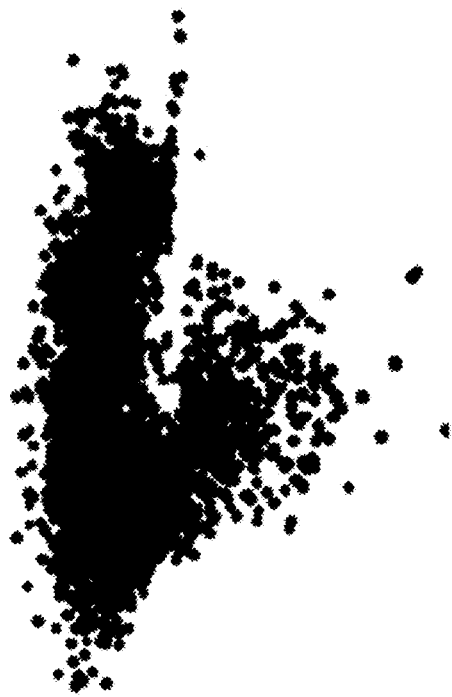
FIG. 2C is a graph diagram of inversely transformed sub-sample behavior based on how well another approximation approximates of the target distribution, according to some embodiments.
Figure 2C:

FIGS. 2A-2C are scatter plots that show how inversely transformed sub-samples behave based on how well q approximates the target distribution, shown as an example in FIG. 2A.

The model in FIG. 2B approximates the target distribution well and its inversely transformed sub-samples are similar to the base distribution. On the other hand, the model in FIG. 2C poorly fits the target, and its inversely transformed sub-samples don't match Student-t distribution for any degrees.

Experiments

In example embodiments, the operating characteristics of the proposed approach are measured by measuring the error estimated by error estimator 112 against the total number of calls to $\tilde{p}(x)$. The number of calls to this function may translate into the number of samples drawn from the importance distribution modeller 108A. Measuring according to a number of samples drawn may be a good indicator of performance as, since all the MC methods are designed to be the asymptotic convergent, Applicants only interest is in the empirical convergent speed of the estimation. Measuring performance by the total number of samples required to achieve a certain error level places emphasis of the computing resources required to achieve a particular rate of error, as compared to the resource independent metric of error.

Assessing the error level in reference to the computational time, as compared to computational resources, may not be relevant, since for instance, Hamiltonian MC (HMC) is essentially a sequential method and inherently requires more time compared to annealed importance sampling (AIS) can be in parallel.

Moreover, comparison using the number of parameters of the model is not an appropriate choice, since HMC has only one parameter (step-size) and Stein Variational Gradient Descent (SVGD) are non-parametric. Moreover, Applicants do not use the effective sample size (ESS) as performance measure since HMC and (importance sampling) IS interpret ESS quite differently. Moreover, it is possible to have large ESS for models that are unable to estimate the second moment accurately.

The following section describes particulars of the Applicant's experimental testing:

RealNVP (Dinh et al., 2017) was used as the importance distribution modeller 108A, and the sample transformer 108B. The proposed method may be required to efficiently generate samples and perform density estimation, and RealNVP allows Applicants to do both sample estimation and density estimation in a single pass in parallel.

Many of Applicants' approaches to which the proposed approaches are compared are non-parametric models such as SVGD, AIS or methods such as HMC which have only one parameter (step size) while the sample generator 106 can contain hundreds of parameters. As a result, Applicants ignore the model complexity as performance measure (number of the parameters).

Methods such as HMC, which require evaluation of the exact gradient of target distribution $\tilde{p}(x)$ for each sample, are treated in the experiments as requiring one additional call of target distribution because the additional evaluation provides more information about each sample.

Applicants have chosen six types of target distributions that are popularly used in the literature to study efficiency of sampling methods. These distributions include Gaussian mixture models, and some embodiments on estimating the marginal likelihood of Restricted Boltzmann Machine and variational Auto-Encoder. Both cases are zero order moment estimation and are generally easier than the other problems.

In the experimental testing, Applicants' method tackled various technical challenges described herein and outperformed the comparison approaches. The experimental results were robust to the hyper-parameters of MC estimator 106 (that is, Applicants use the same set of hyper-parameters across all problems without fine-tuning; the only exception made here is that a different network structure for the mixture model).

The Applicants experiments indicated that, even in high dimension, a small batch size ($S=100 \leq D$) at each iteration is sufficient to generate importance distributions that allow for acurate modelling of target distributions for many problems (with only the mixture model as exception). Having a small training batch size is crucial for deep learning models, because it allows one to build deeper network without too much concerns of computational complexity.

For first, second, third and fourth moments estimation, Applicants use the log Mean squared error (Log-MSE) for error measure. Given the true value and its estimator $f$, $\hat{f} \in \mathbb{R}^D$, the error is defined as:

$$\log\left(\frac{1}{D}\sum_d (\hat{f}_d - f_d)^2\right).$$

For normalizing constant estimation, the error is defined as: $\log(|\log(Z) - \log(\hat{Z})|)$.

The interpolation starts with $\beta=1$ and linearly decreasies down to some values close to 0 as the training process goes on. But $\beta$ never goes to zero so that the exploration is kept as part of training. The polynomial order $\rho$ in (equation (13)) was set to 4 during experimentation.

In this disclosure, Applicants show the results of 30 independent experiments, and report the averaged error in said experiments. Note that by doing this, the high standard deviation of estimator implicitly can be penalized, as discussed in respect of standard deviation below.

For the experimentation, the Applicants divided training into two stages which required the MC estimator 104 to operate in two states. In the first stage, the MC estimator 104 operates in a first state, reflective of exploration exploration. During the first stage, the importance distribution modeller 108A can be poorly fit to the target distribution, and most of the samples generated by sample generator 106 can lead to arbitrarily bad MC estimations. During the first stage, MC estimator 104 is configured to discard samples generated by sample generator 106 when computing the MC estimation, but said samples are used for updating model parameters with error estimator 112 (which is similar to the burning-in stage of HMC/MCMC). During a second stage, the stage of exploitation, the MC estimator 104 operates according to a second state, wherein the samples are used both for updating model parameters with error estimator 112, and for generating MC estimates.

In the experiments, the same two stage approach was used for other importance sampling approaches.

In these experiments, Applicants take the samples generated from the most recent $5 \times 10^4$ or $10^5$ number of target evaluations as MC estimation samples.

For all error curves in the experiments, Applicants proposed approach in example embodiments exhibits a common phenomena: as more and more exploit samples are generated for MC estimation, the error curve of the sample generator 106 is relatively smoothly decreasing much faster than other methods. This may show that the proposed exploratory stage has successively approximated the target distribution quite well. The exploit samples now are safe to be used for the construction of reliable estimators.

10D Mixture Experiment

Figure 3A:
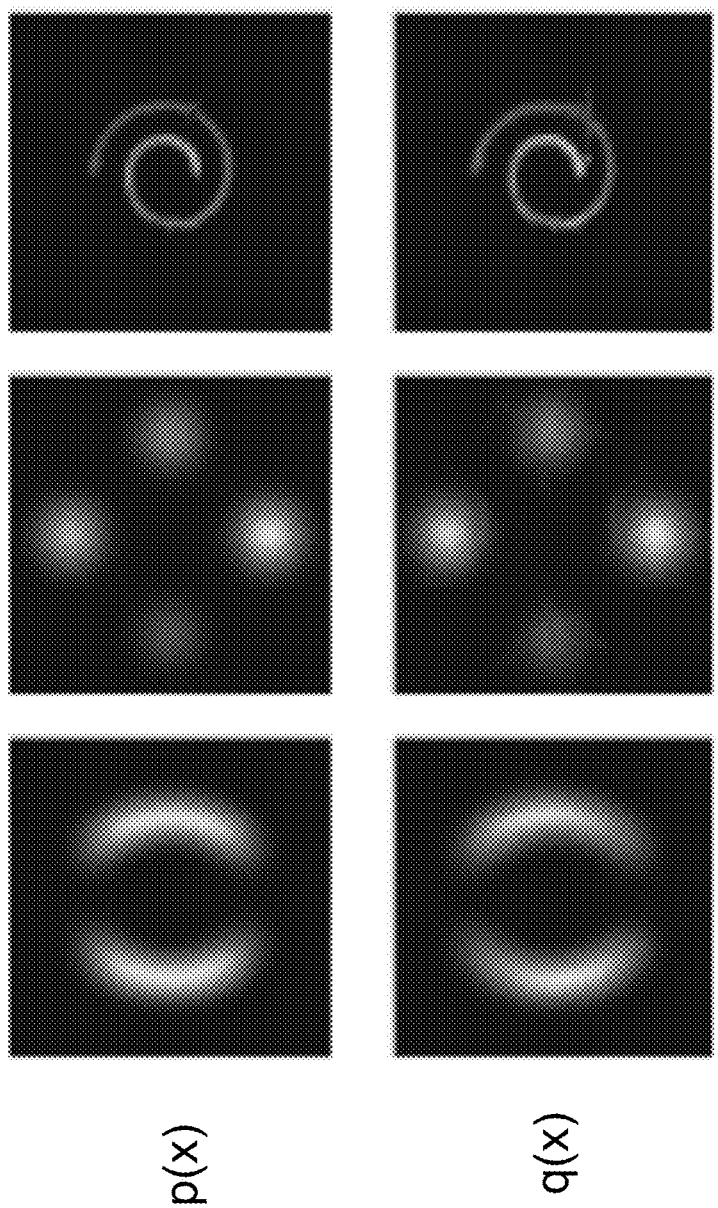
FIG. 3A is a graph diagram of target distributions based on training 2D mixture models with complicated geometry, according to some embodiments.
Figure 3B:
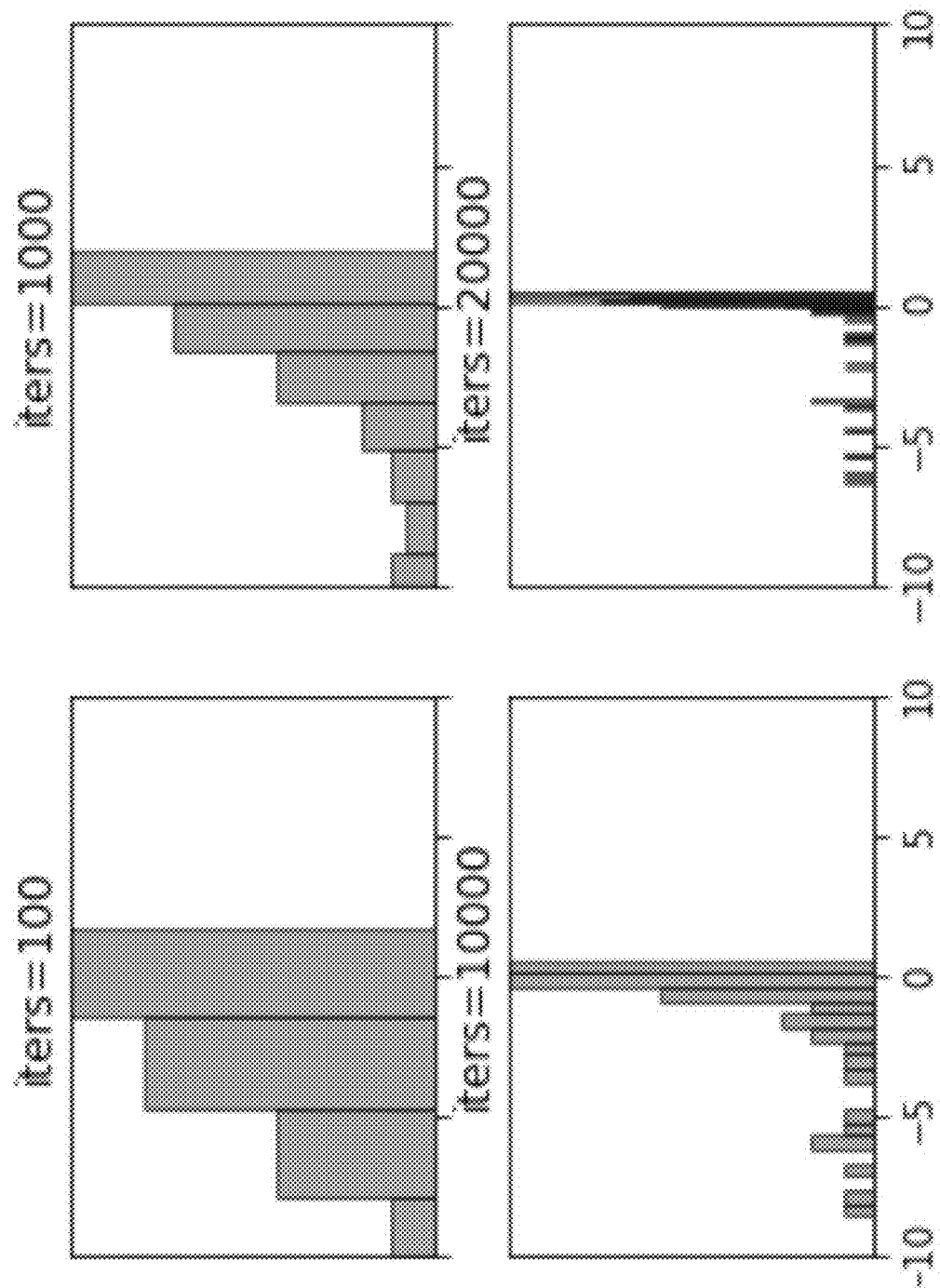
FIG. 3B is a graph diagram of importance weights of target distributions corresponding to samples at each iterations in log-space, according to some embodiments.
Figure 3C:
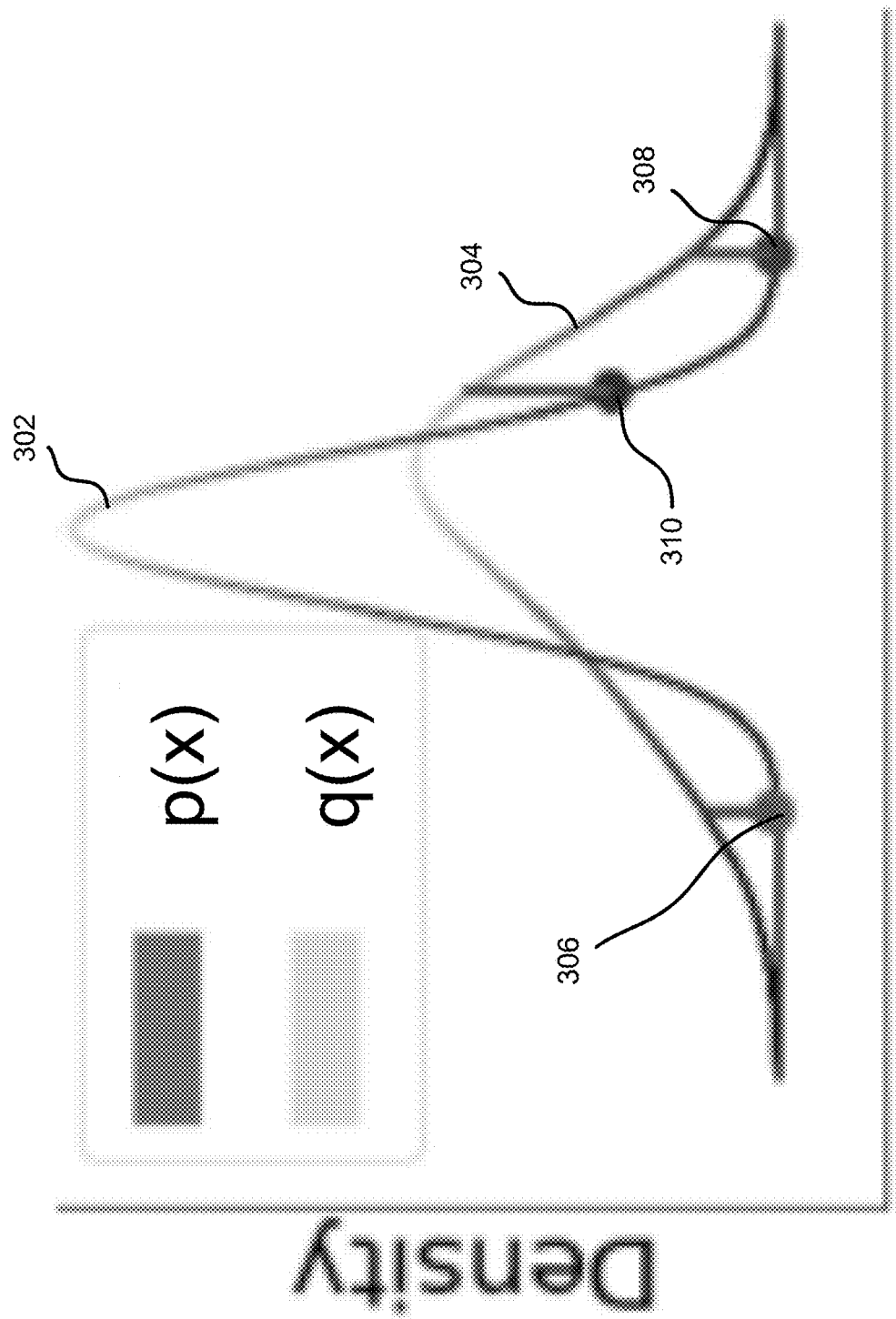
FIG. 3C is a graph diagram of an importance distribution and target distribution, according to some embodiments.

FIGS. 3A-3C relate to experiments where the target distribution was a 10 dimensional Bi-modes diagonal Gaussian distribution with variance one defined by $$\tilde{p}(x) = \frac{1}{2}N(x|\mu_1, I) + \frac{1}{2}N(x|\mu_2, I) \text{ where } \mu_1 = (2, \ldots, 2),$$

$$\mu_2 = (-2, \ldots, -2).$$

FIG. 3A shows a visual comparison of the target distribution in a top row, and the learned importance distribution, in the bottom row, for three separate target distributions. The importance distribution was trained using 2D mixture models to model the complicated geometry.

FIG. 3B shows a histogram plot with the importance weights corresponding to samples at each iterations in log-space. FIG. 3B shows that as the training goes on, the variance of weights goes small and converges to zero. This indicates that Applicants importance distribution matches up with target distribution.

FIG. 3C shows an exaggerated visualization to visually represent the Applicants approach where, for the drawn samples x such that the target distribution 304, represented by p(x). disagrees with the importance distribution 302, represented as q(x), where x from the tail region of q(x) (e.g., samples 308 and 306), will have a larger penalty assigned to them compared to samples closer to a mean of a distribution (e.g., sample 310). This helps Applicants q to "lift-up" its tails.

Table 1, shown below, describes the mixture distribution result and the numbers in the table are the log error of MC estimation based on the learned importance distribution.

| (r)1-2 Algorithm | $\mathbb{E}_p[x]$ | $\mathbb{V}_p[x]$ | log(Z) |
|---|---|---|---|
| FAIS | −8.46 | −6.62 | −2.90 |
| HMC | 1.3972 | 2.777 | NA |
| AIS | −6.102 | −4.80 | −1.93 |
| GAIS | 1.385 | 2.772 | −0.350 |
| LAIS | 1.392 | 2.8362 | 0.390 |
| SVGD | −6.17 | −3.07 | NA |
| stepsize = 0.5 | | | |

Figure 4A:
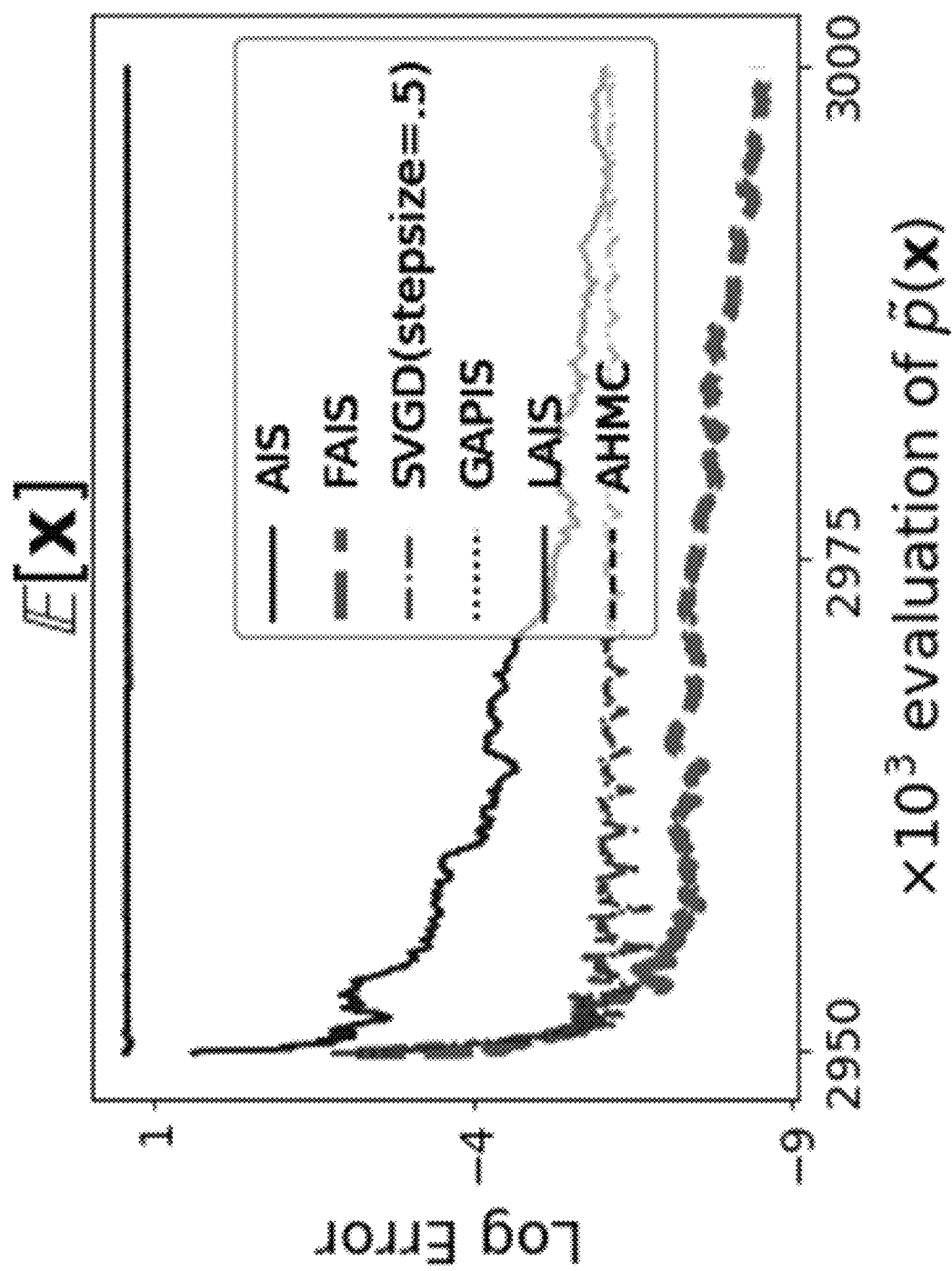
FIG. 4A is a graph diagram of a Mixture based Monte Carlo error of a first moment of a sample distribution, according to some embodiments.
Figure 4B:
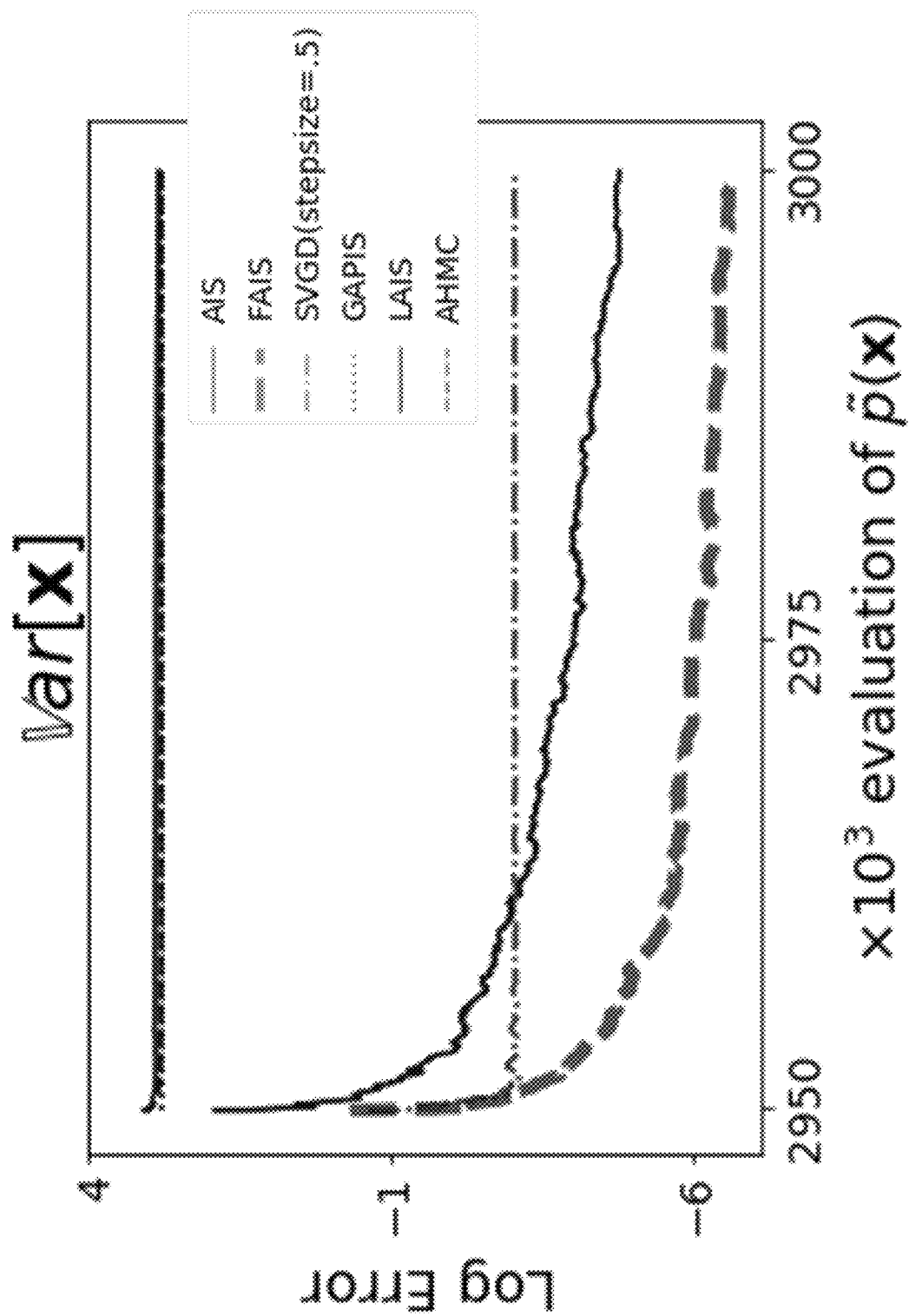
FIG. 4B is a graph diagram of a Mixture based Monte Carlo error of a second moment of a sample distribution, according to some embodiments.

FIGS. 4A-4B describe the measured MC error on first (FIG. 4A) and second moments (FIG. 4B) in these experiments. These two estimations inform of the ability of the proposed approach to model on multi-modes in comparison to comparison methods.

Low estimation errors from SVGD, AIS and FAIS shows that they are capable of capturing the multi-modes (the improvement of FAIS indicates that FAIS still generates more efficient samples beyond just capture modes) while the biased estimations from AHMC, GAPIS, LAIS show that samples from these methods are stuck in local modes.

Figure 4C:
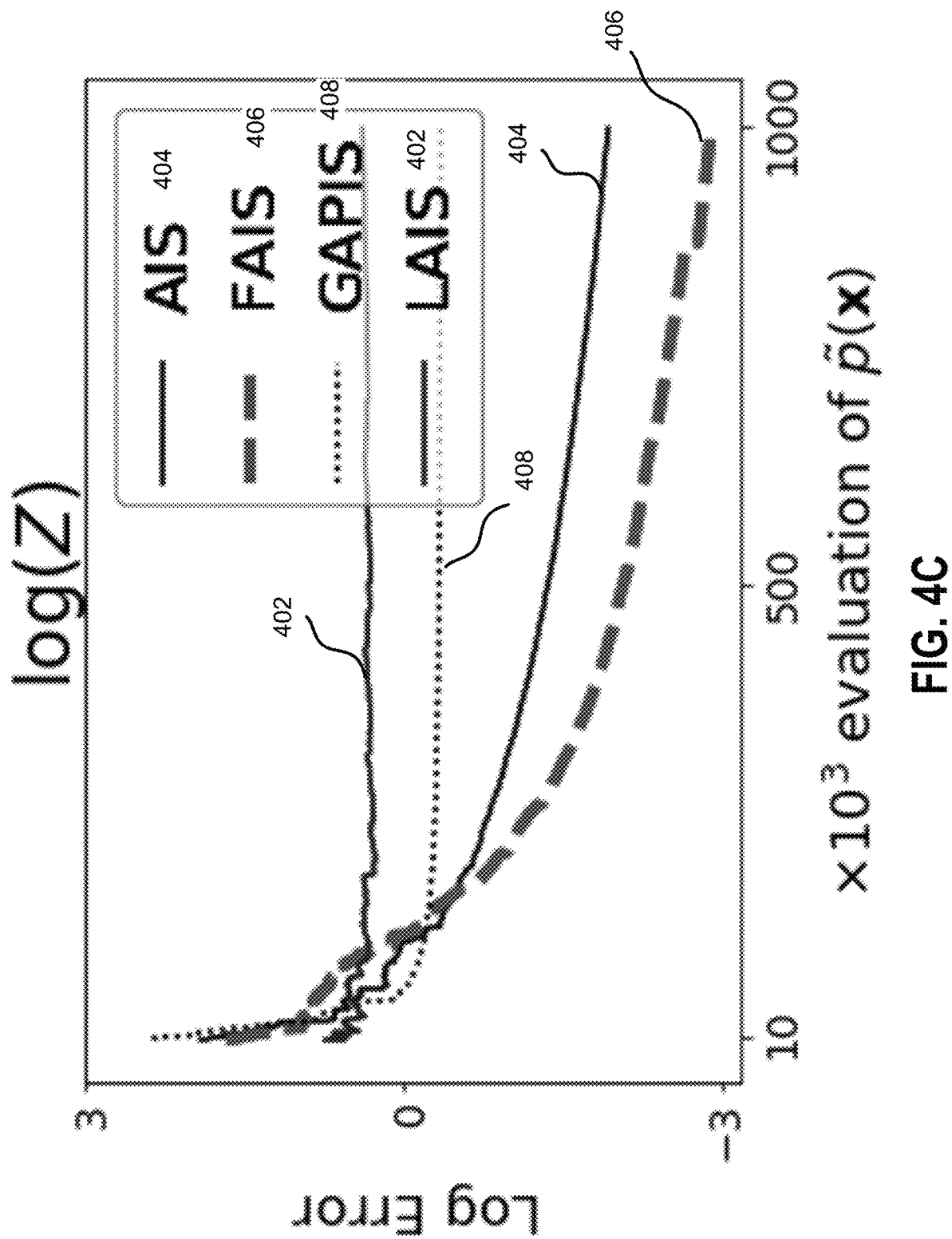
FIG. 4C is a graph diagram of a Mixture based Monte Carlo error of a normalizing constant, according to some embodiments.

FIG. 4C demonstrates the error of the normalizing constant for each algorithm, with lines 402, 404, 406, and 408 indicating the results for LAIS, AIS, FAIS, and GAPIS respectively.

15D Correlated Schwefel Distribution Experiment

Schwefel Distribution and its similar version RoughWell contains an infinite number of local minimums and local maximums that can easily fail many adaptive approaches. Applicants make the problem more challenging by injecting high correlations between each dimension with randomly initialized means. Define the target distribution to be:

$$\tilde{p}(x) \propto \exp\left(-\frac{1}{2}(x-\mu)\sum^{-1}(x-\mu)^T - \sum_i \sin\left(\frac{\pi\sqrt{|x_i|}}{0.01}\right)\right)$$

where $\mu$ is randomly initialized uniformly in range [−5,5] and $\Sigma$ is the covariance matrix value 10 along the diagonal and 9.95 elsewhere.

Table 2, shown below, describes the Schwefel Distribution result and the number in the table is the log error of MC estimation:

| (r)1-2 Algorithm | $\mathbb{E}_p[x]$ | $\mathbb{C}\text{ov}_p[x]$ | $\mathbb{K}\text{urtosis}_p[x]$ |
|---|---|---|---|
| FAIS | −3.45 | −1.25 | −3.50 |
| AHMC | −1.63 | 4.60 | 0.11 |
| AIS | −0.78 | 4.59 | 20.40 |
| GAIS | 0.55 | 4.60 | 30.05 |
| LAIS | −0.48 | 4.59 | 8.54 |
| SVGD | 1.18 | 4.48 | 1.69 |
| stepsize = 0.1 | | | |

Figure 5A:
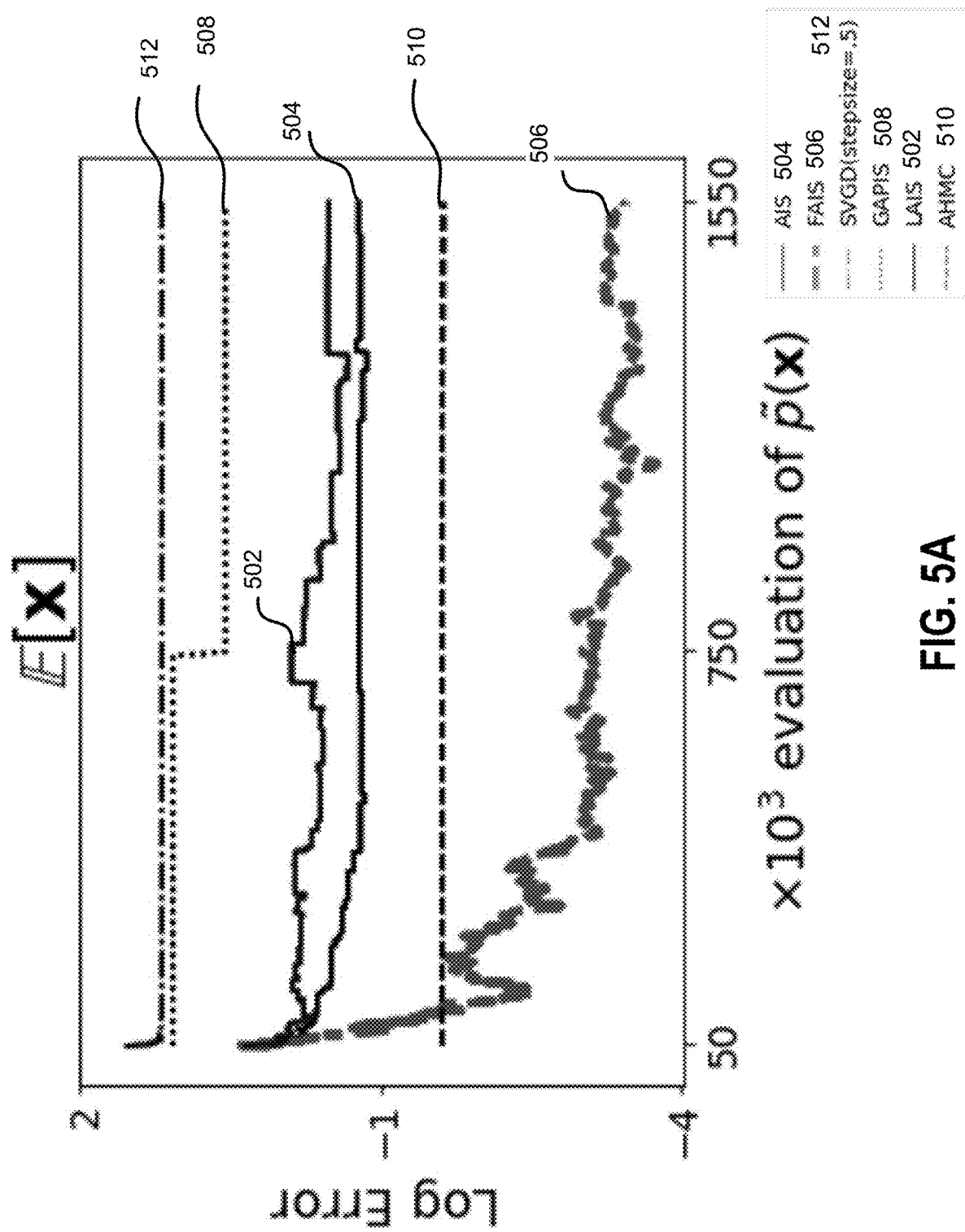
FIG. 5A is a graph diagram of a Schwefel Distribution based Monte Carlo error of a mean, according to some embodiments.
Figure 5B:
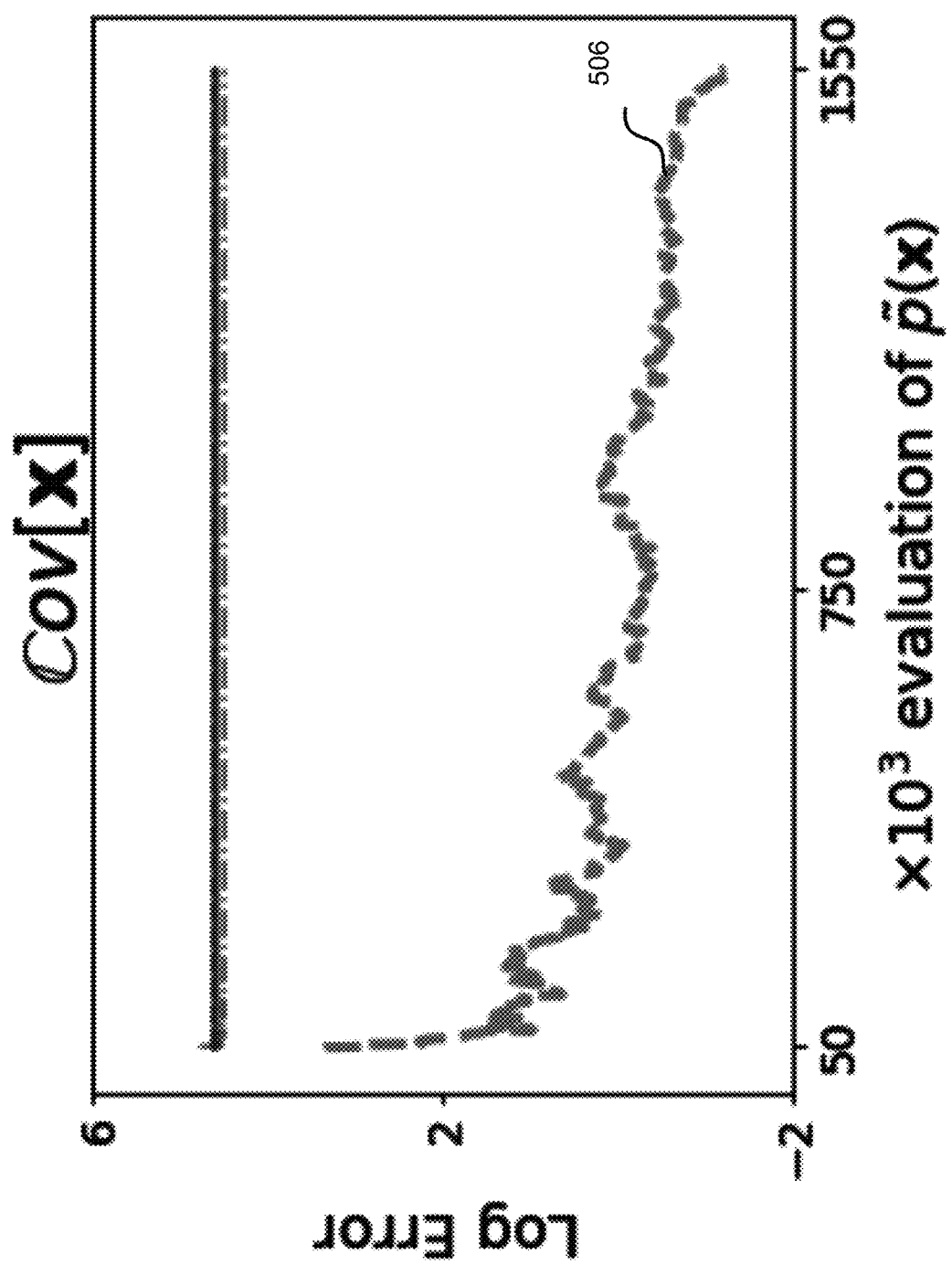
FIG. 5B is a graph diagram of a Schwefel Distribution based Monte Carlo error of a co-variance, according to some embodiments.
Figure 5C:
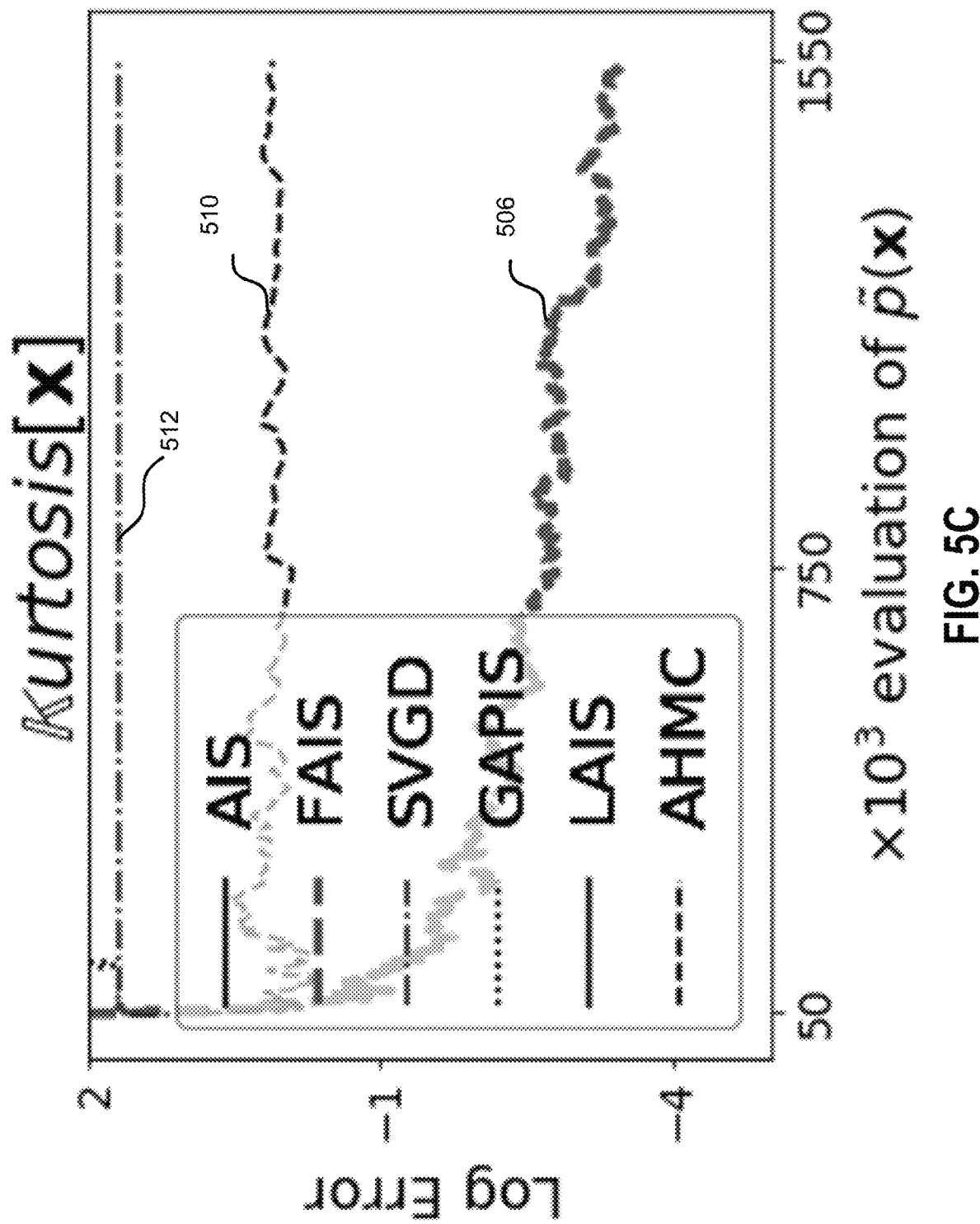
FIG. 5C is a graph diagram of a Schwefel Distribution based Monte Carlo error of a fourth moment, according to some embodiments.

FIGS. 5A-5C describe the measured mean (FIG. 5A), co-variance matrix (by averaging the error of each entry from co-variance matrix) (FIG. 5B) and fourth moments estimation (FIG. 5C), with lines 502, 504, 506, 508, 510, and 512 indicating the results for LAIS, AIS, FAIS, GAPIS, AMHC and SVGD, respectivelty. AIS (with HMC transition) and HMC fails on such task.

The "Rough" surface of the distribution increases the challenge in the simulation of Hamiltonian dynamic with discretization leapfrog; hence, the properties of Schwefel Distributions lead to a very low acceptance rate. FAIS, as its optimization is independent of the exact gradient of target distribution, is able to circumvent the ill-behaviours of sinusoids and explore the correlated space.

100D Banana Distribution Experiment

The proposed method of some embodiments is discussed in references to non-linear correlated distribution, or Banana Distributions (BD), in this section. The challenge of this distribution arises from its strongly twisted shape that leads to the skewness, and high variance. The first moment also presents challenges to estimate because of the asymmetric two tail regions and requires sufficient exploration on both sides tails. The target is defined as $$\tilde{p}(x) = N\left((x_1, x_2 - b(x_2^2 - \sigma^2), \ldots, x_D)\Big|0, \sum\right)$$

where b=1; the covariance matrix $\Sigma$ has ones along the diagonal and 0.95 for the rest of the entries. The major challenge of this target distribution is to estimate the mean, variance and skewness of second coordinate and the variance of all coordinates.

FIGS. 6A-6E show the measured variance error averaged over dimensions (FIG. 6A), and also, the statistics of the second coordinate (first (FIG. 6C), second (FIG. 6D), third moments (FIG. 6E)) because these four are the most challenging tasks as discussed above, with lines 602, 604, 606, 608, 610, and 612 indicating the results for LAIS, AIS, FAIS, GAPIS, AHMC, and SVGD, respectivelty. The low error on first, second and third moment estimation indicates that FAIS is capable of modeling the two asymmetric tails of target distribution.

Figure 6A:
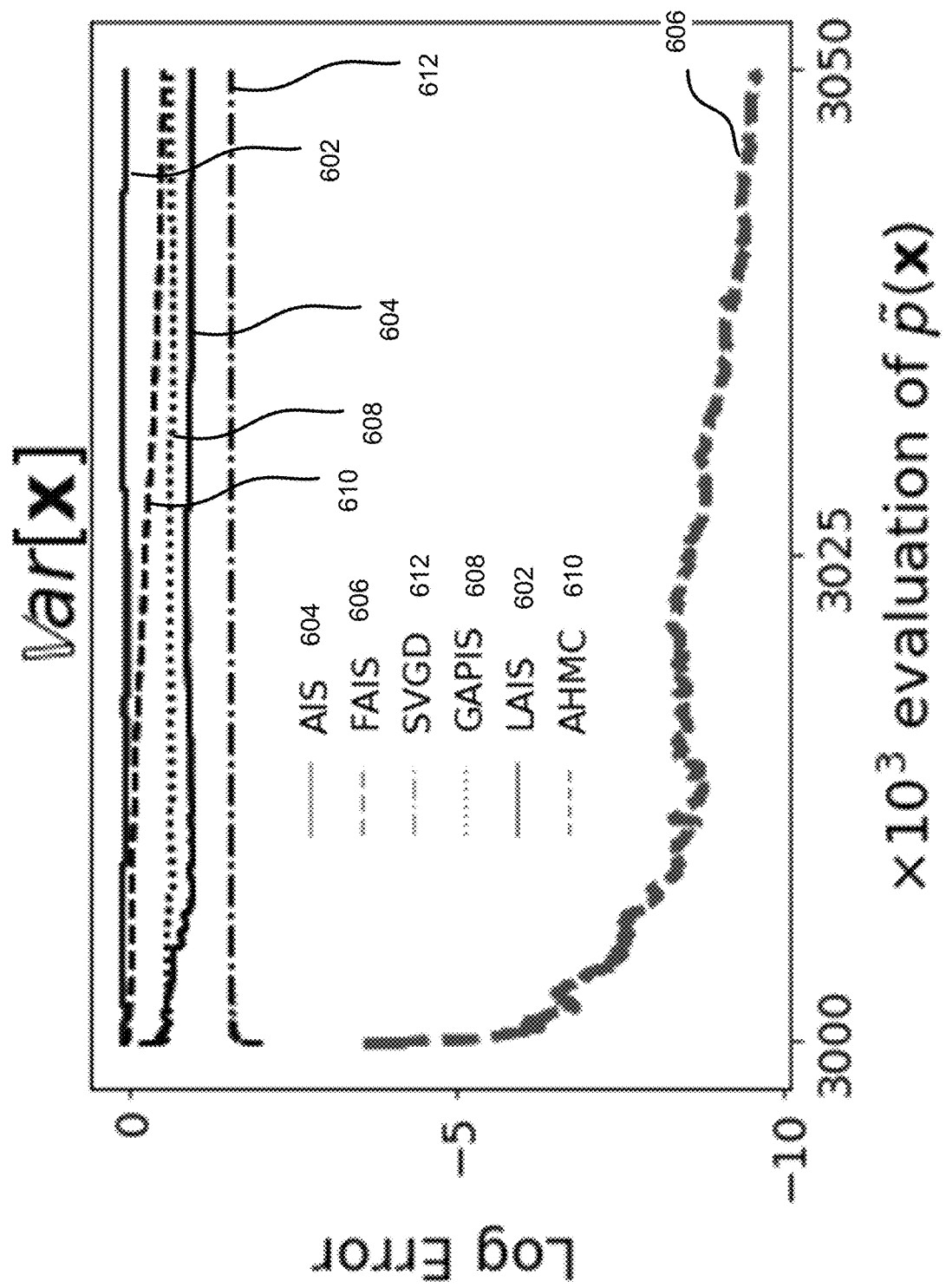
FIG. 6A is a graph diagram of a Banana Distribution based Monte Carlo error of a variance of a first coordinate, according to some embodiments.
Figure 6B:
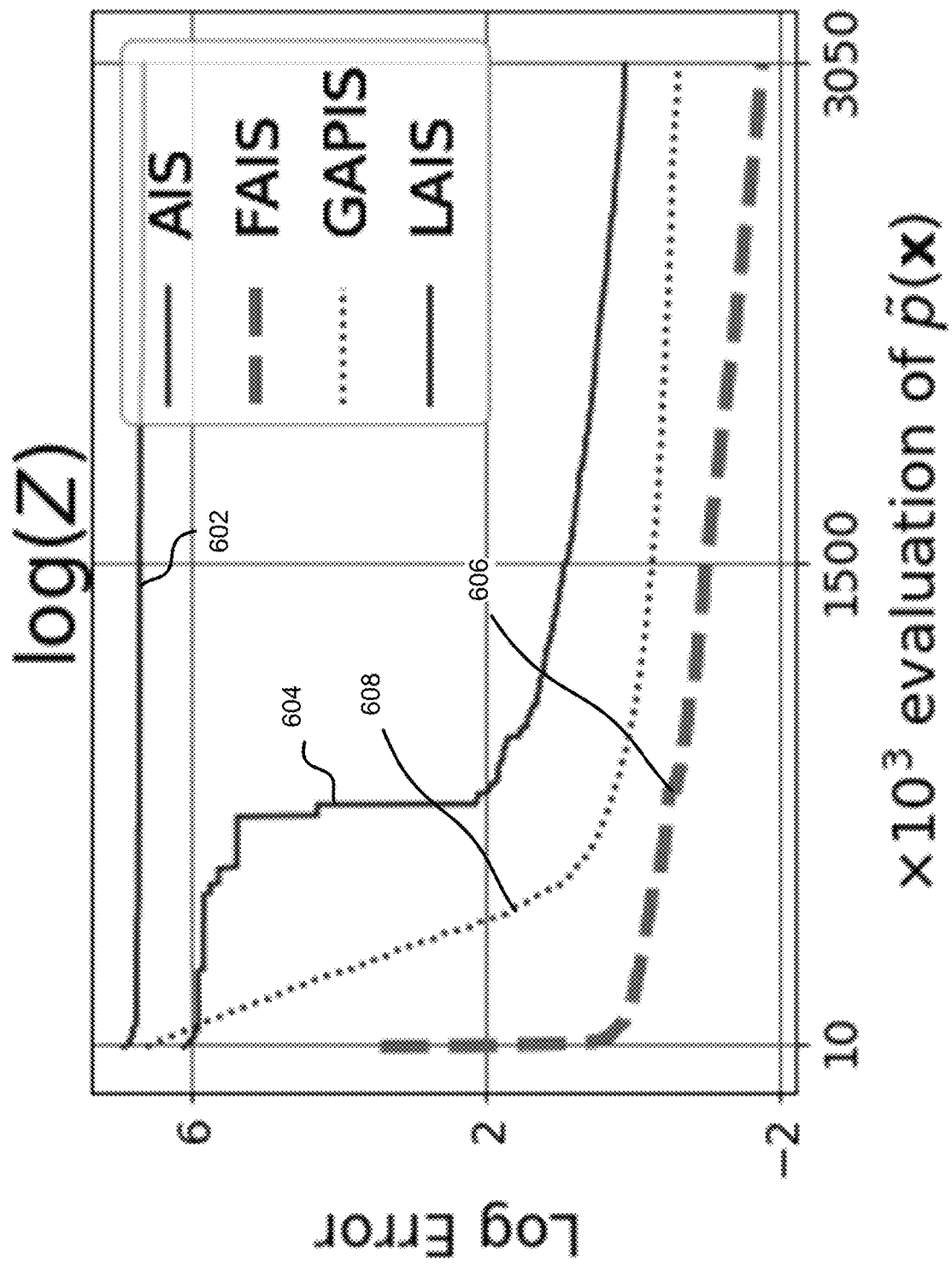
FIG. 6B is a graph diagram of a Banana Distribution based Monte Carlo error of a normalizing constant, according to some embodiments.
Figure 6C:
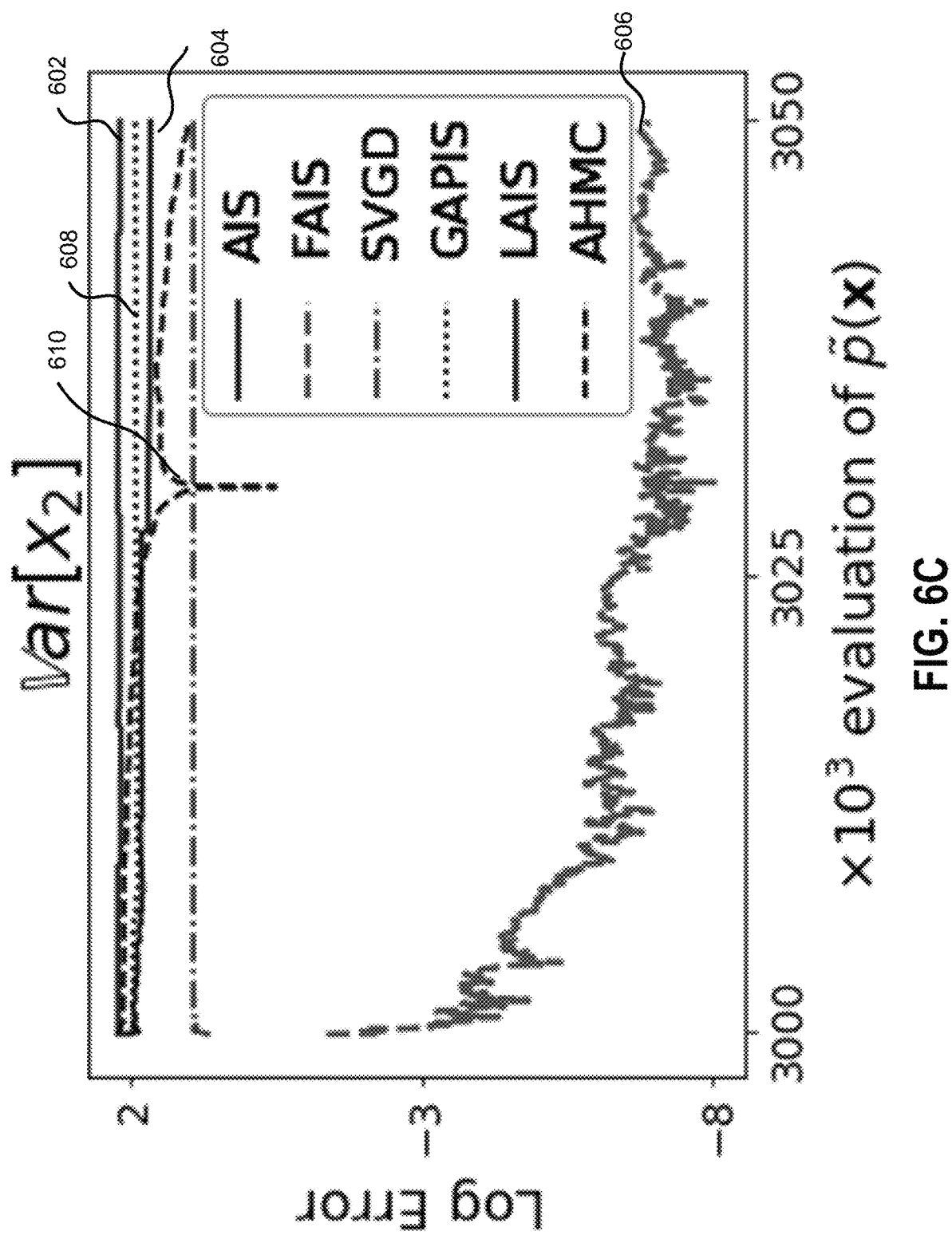
FIG. 6C is a graph diagram of a Banana Distribution based Monte Carlo error of a first moment of a second coordinate, according to some embodiments.
Figure 6D:
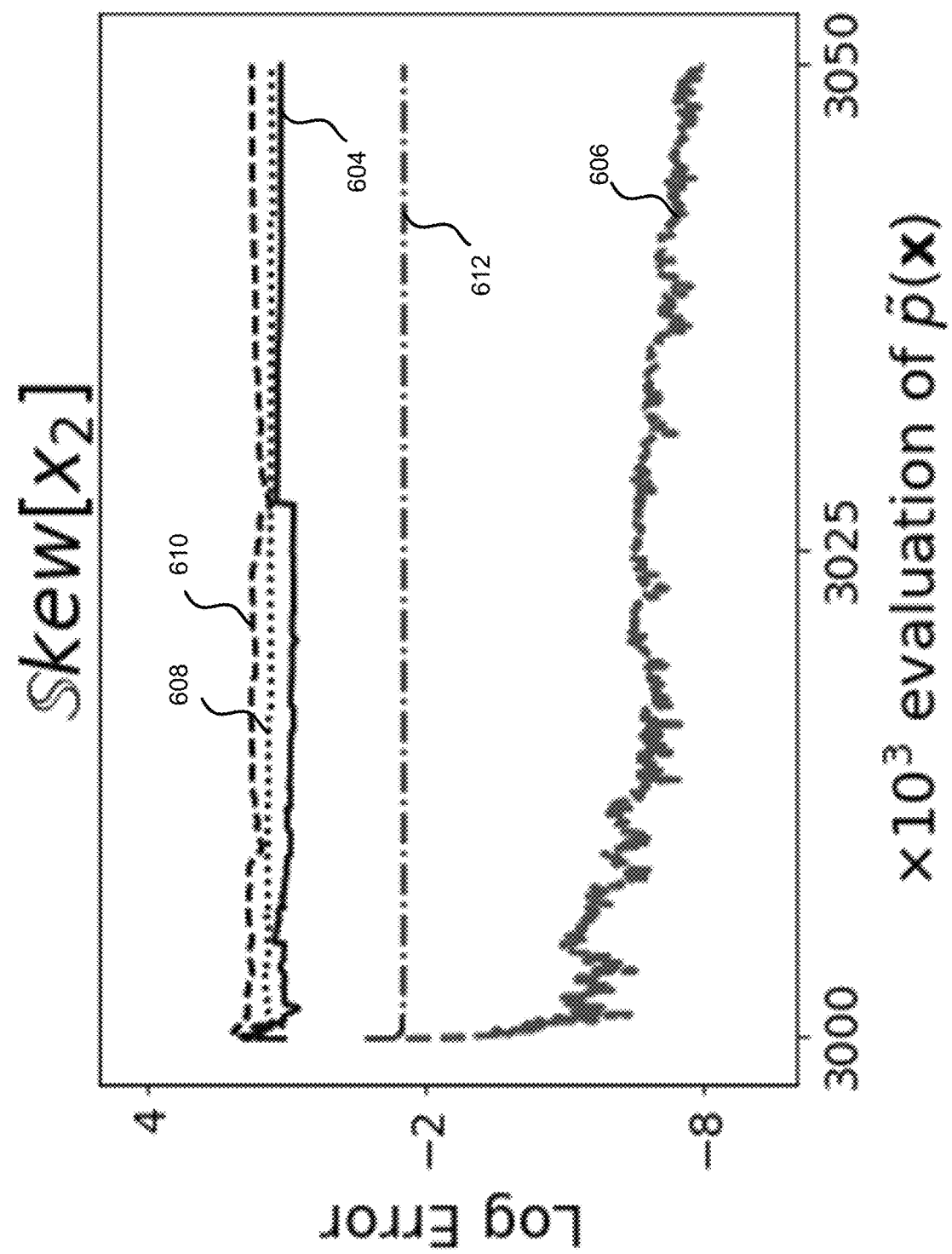
FIG. 6D is a graph diagram of a Banana Distribution based Monte Carlo error of a second moment of a second coordinate, according to some embodiments.
Figure 6E:
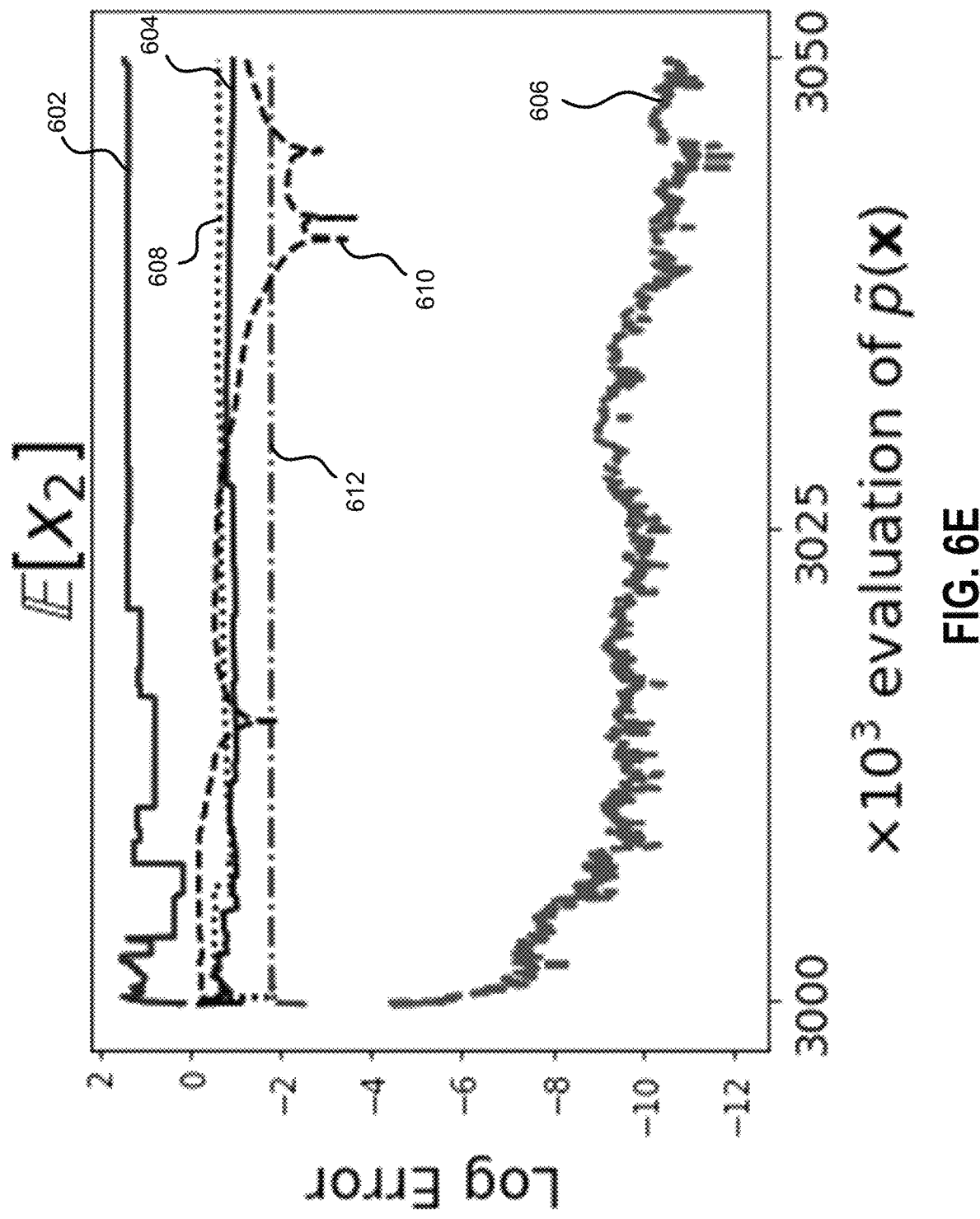
FIG. 6E is a graph diagram of a Banana Distribution based Monte Carlo error of a third moment of a second coordinate, according to some embodiments.

On the other hand, the high error of second and third moments estimation from baseline methods suggests the following possible phenomena: (1) the sampler is stuck on one sided-tail, (2) the sampler can only model the central region, but is unable to reach out to the tail region. FIG. 6B demonstrates the error of the normalizing constant for each algorithm.

Table 3, shown below, shows the log error of MC estimation based on a Banana Distribution:

| (r)1-2 Algorithm | $\mathbb{E}_p[x_2]$ | $\mathbb{V}_p[x_2]$ | $\mathbb{V}_p[x]$ | $\mathbb{S}\mathrm{kew}_p[x_2]$ | log(Z) |
|---|---|---|---|---|---|
| FAIS | −10.66 | −6.842 | −9.56 | −7.958 | −1.778 |
| AHMC | −1.268 | 0.965 | −0.551 | 1.714 | NA |
| AIS | −0.97 | 1.6361 | −0.975 | 1.085 | 0.092 |
| GAIS | −0.65 | 1.911 | −0.663 | 1.273 | −0.6381 |
| LAIS | 1.43 | 2.1731 | 0.033 | 6.582 | 6.648 |
| SVGD stepsize = 0.2 | −1.81 | 0.901 | −1.584 | −1.570 | NA |

100D Funnel Distribution Experiment

Funnel Distribution (FD) is a special case of a hierarchical Bayesian model. It contains almost all pathological geometry such as varying curvatures, extreme outliers, asymmetry, etc. that can fail all types of sampling methods. Even worse, the high curvature region has high density with small volume such that many optimization methods either completely stuck in the low volume region and are unable to escape from it or traversing in the high volume region and become incapable of maneuvering into the low volume area. Both cases lead to biased estimation. Define target distribution as:

$$\tilde{p}(x) = \prod_{d=2}^{D} N(x_d|0, e^{x_1})N(x_1|0, 9)$$

Note that the major challenge in Funnel Distribution lies in the estimation of the first order moment of first coordinates $x_1$ and the second order moment for all coordinates.

FIGS. 7A-7D, show the measured first (FIG. 7C) and second (FIG. 7D) moments of first coordinate and the variance error averaged over dimension (FIG. 7A) with lines 702, 704, 706, 708, 710, and 712 indicating the results for LAIS, AIS, FAIS, GAPIS, AHMC, and SVGD respectivelty.

The high error of the estimation on first coordinate may be attributed to two possible scenarios: (1) the failure of collecting samples from funnel region (such as HMC, SVGD); (2) the samples collected are mostly from funnel region (trapped in the high curvature region; such as GAPIS method).

Figure 7A:
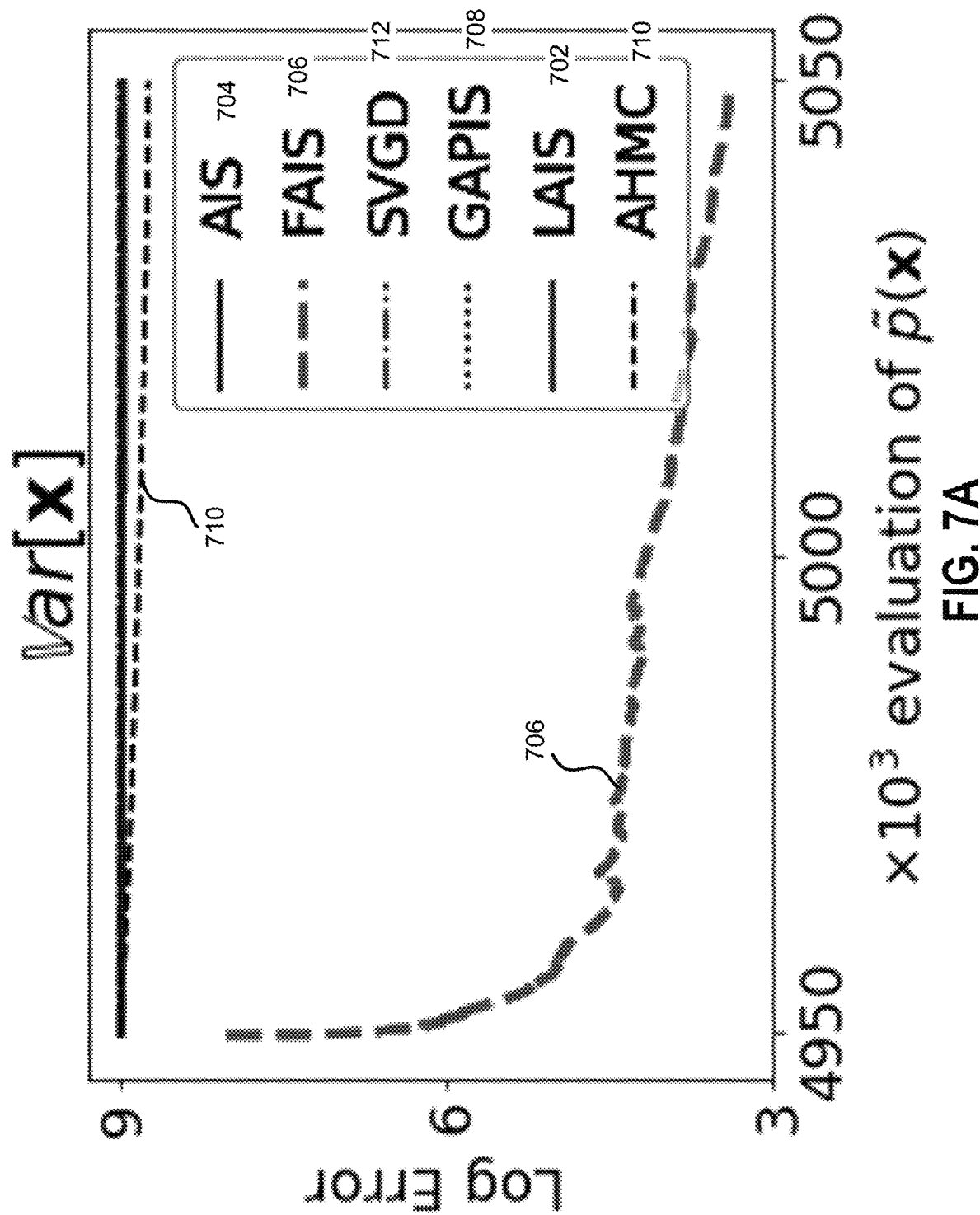
FIG. 7A is a graph diagram of a Funnel Distribution based Monte Carlo error of a variance of a first coordinate, according to some embodiments.
Figure 7B:
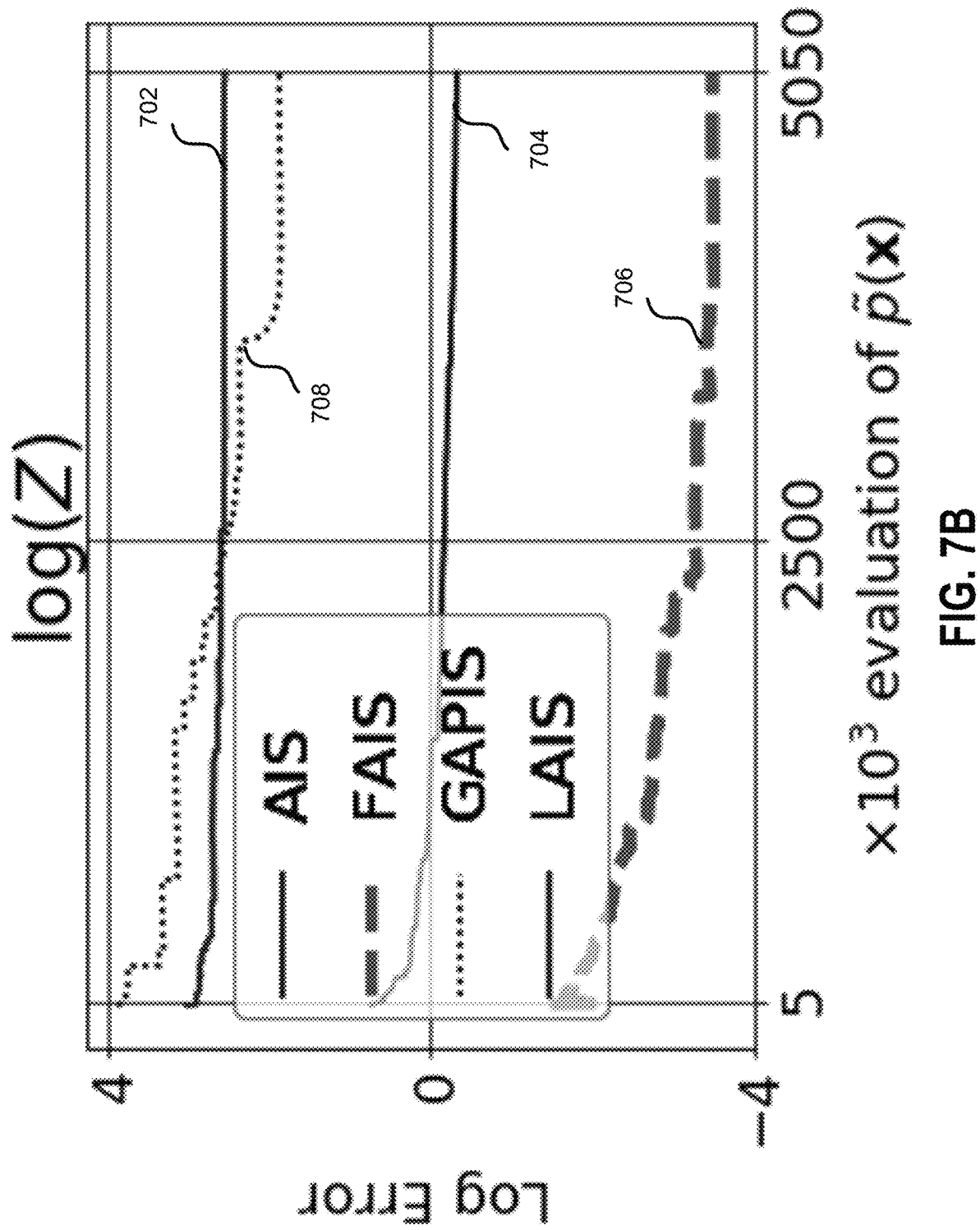
FIG. 7B is a graph diagram of a Funnel Distribution based Monte Carlo error of a normalizing constant, according to some embodiments.
Figure 7C:
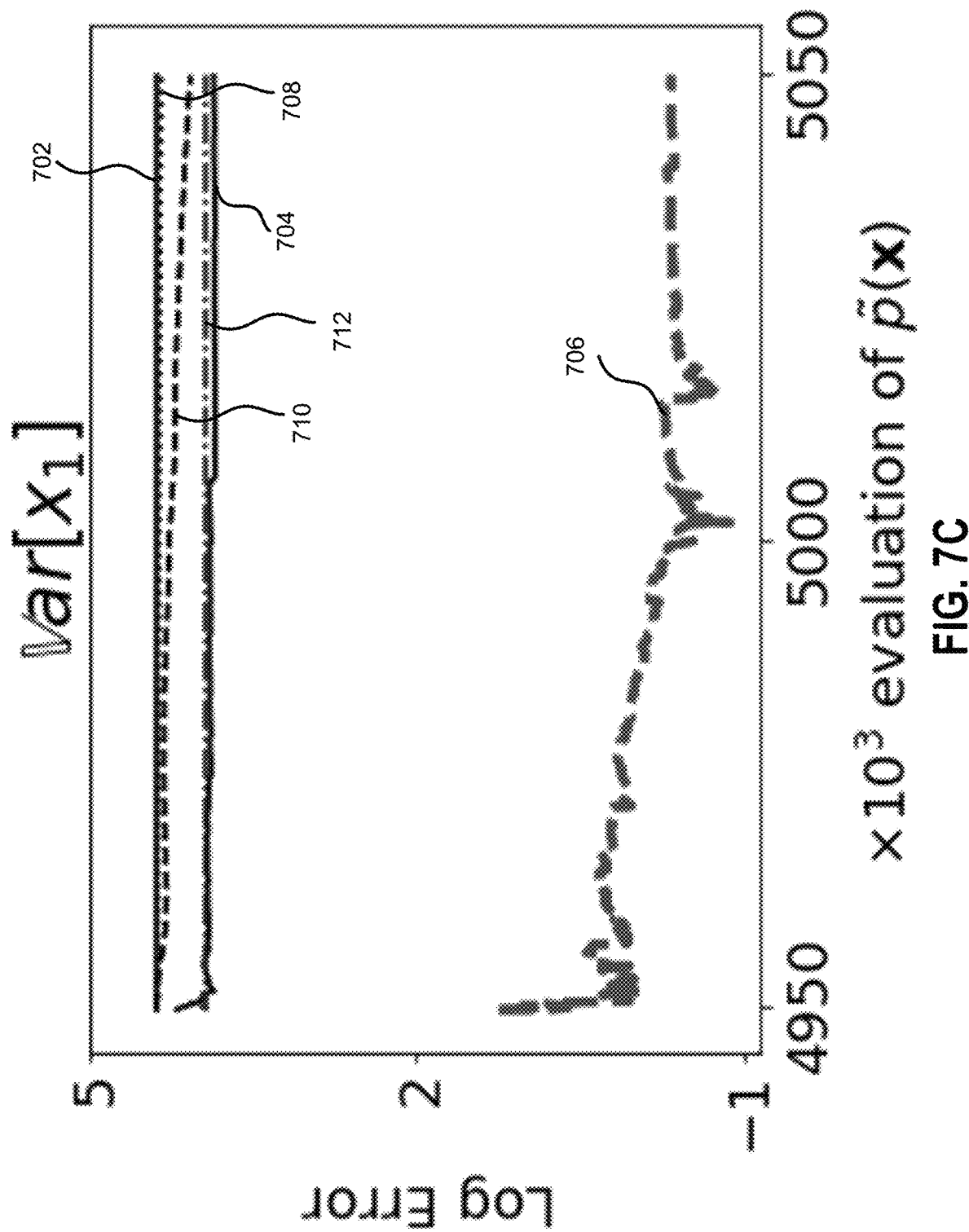
FIG. 7C is a graph diagram of a Funnel Distribution based Monte Carlo error of a first moment of a second coordinate, according to some embodiments.
Figure 7D:
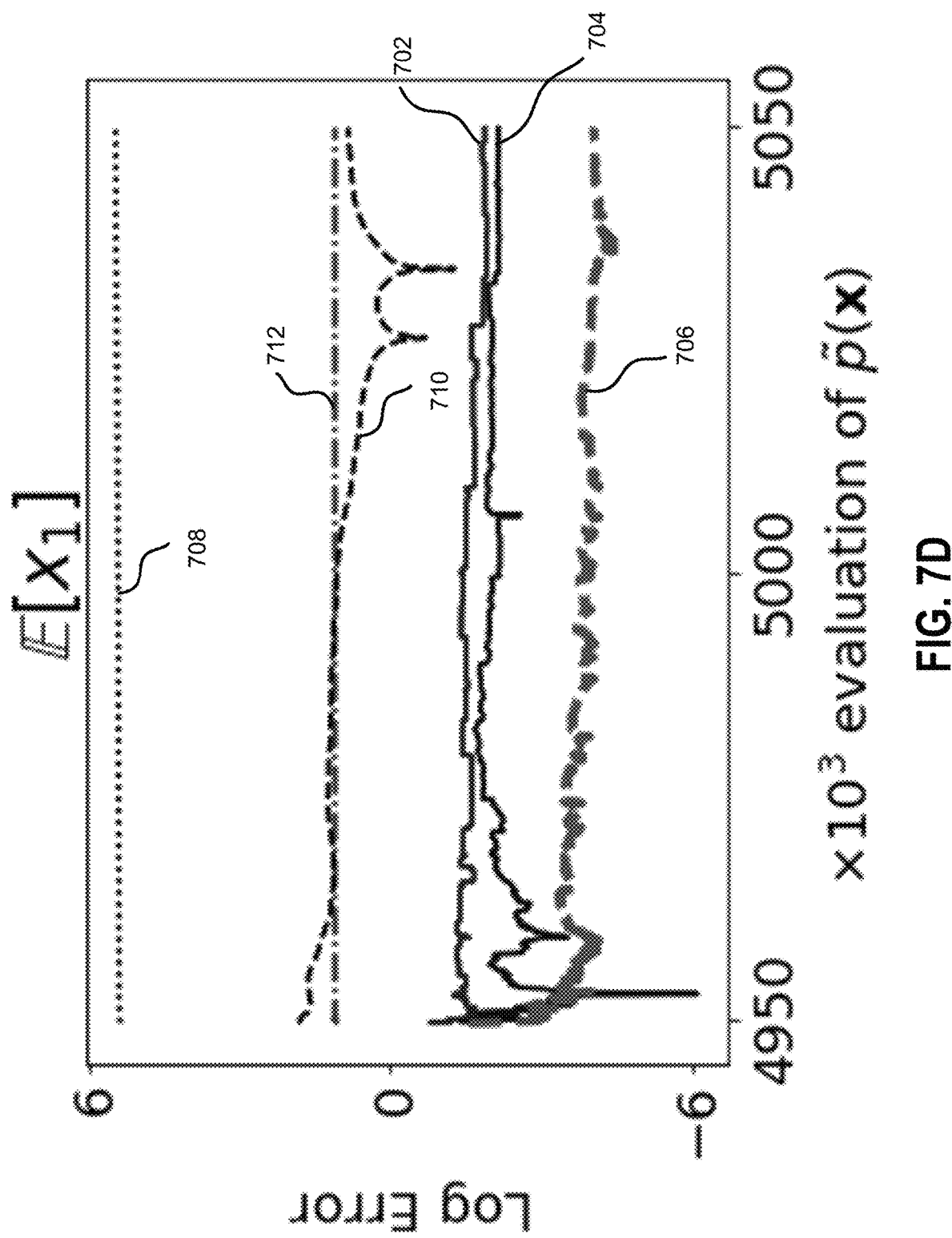
FIG. 7D is a graph diagram of a Funnel Distribution based Monte Carlo error of a second moment of a second coordinate, according to some embodiments.

On the other hand, the averaged high error over dimensions on variance estimation attributed to the inefficiency of learning the tail region of target distribution (failed to traverse the low curvature region). Applicant notes here that FAIS is able to capture both low and high curvature regions relatively well compared against other baselines. FIG. 7B demonstrates the error of the normalizing constant for each algorithm.

100D VAE Experiment

Quantitative analysis on generative model has been studied where AIS has been used for evaluating marginal likelihood of trained generative model. Applicants train a VAE model proposed in Appendix C.1 from on the MNIST dataset. The target distribution is:

$$\tilde{p}(z|x) \propto p(x|z)p(z)$$

where $$p(z) \text{ is } N(0, I) \text{ and } p(x|z) = \exp\left(\sum_{1}^{D} x_i \log(y_i) + (1 - x_i)\log(1 - y_i)\right)$$

where x is the output from a two-layer decoder with ReLu activation function and y is the original image. In this case, marginal likelihood of x is the normalizing constant of above target distribution.

Table 4 shows the result, as the number in the table, being the log error of MC estimation based on a Funnel Distribution:

| (r)1-2 Algorithm | $\mathbb{E}_p[x1]$ | $\mathbb{V}_p[x1]$ | $\mathbb{V}_p[x]$ | log(Z) |
|---|---|---|---|---|
| FAIS | −4.07 | −0.34 | 3.37 | −3.5 |
| AHMC | 0.84 | 4.07 | 8.72 | NA |
| AIS | −2.15 | 3.86 | 8.94 | −0.33 |
| GAIS | 5.46 | 4.34 | 8.98 | 1.87 |
| LAIS | −1.9 | 4.38 | 8.97 | 2.53 |
| SVGD stepsize = 0.02 | 1.1 | 3.94 | 8.98 | NA |

Restricted Boltzmann Machine

The estimate utilizing the partition function of RBM is discussed in this section. Let $x \in \mathbb{R}^D$ be the variable of interest and $h \in \{1, -1\}^{10}$ be hidden binary variables. Applicants randomly generated matrix W, and vector b, c from standard normal distribution. The target distribution is:

$$\tilde{p}(x) \propto \sum_h \exp\left(x^T W h + b^T x + c^T h - \frac{1}{2}\|x\|^2\right)$$

Figure 8A:
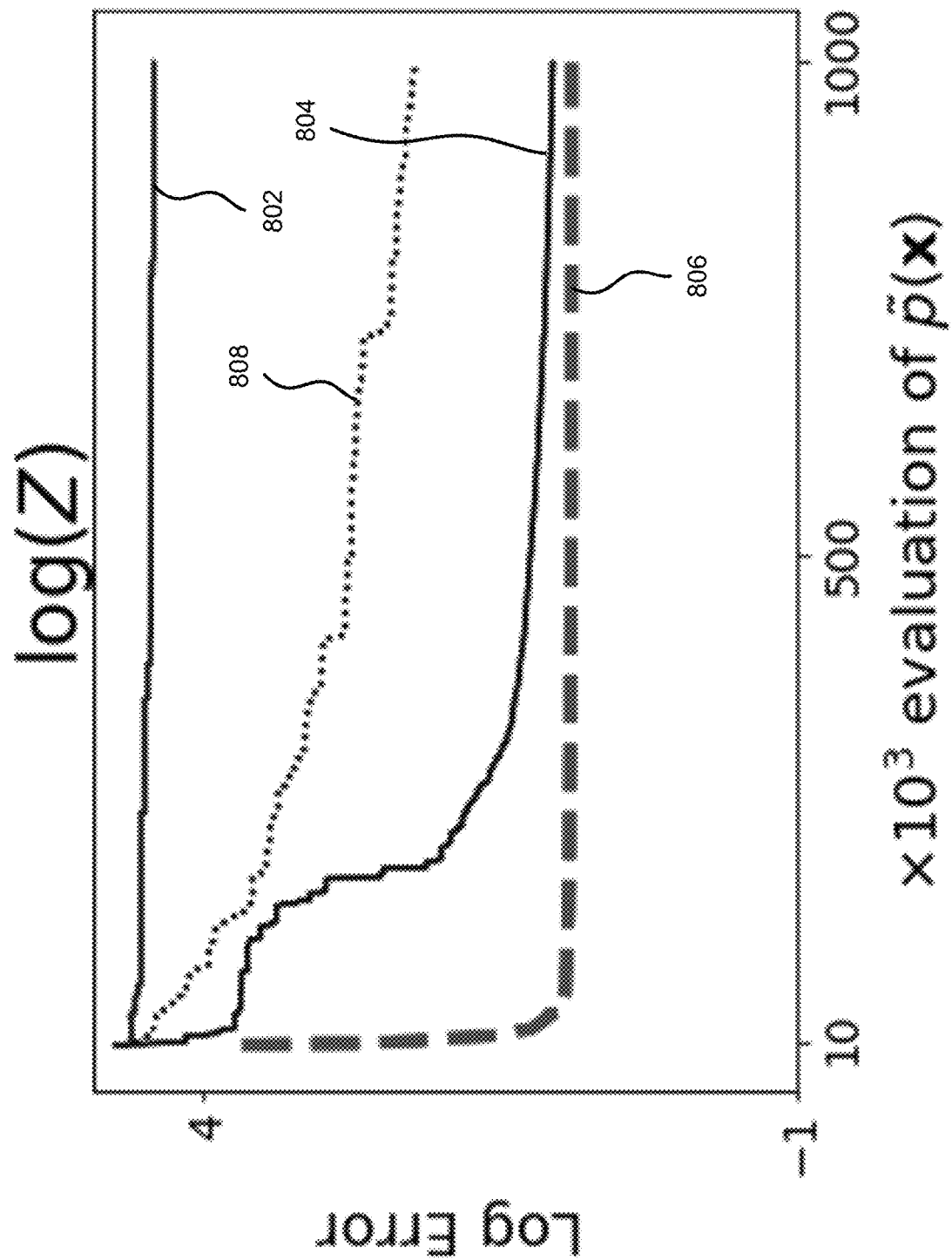
FIG. 8A is a graph diagram of a performance on the marginal likelihood estimation for VAE, according to some embodiments.
Figure 8B:
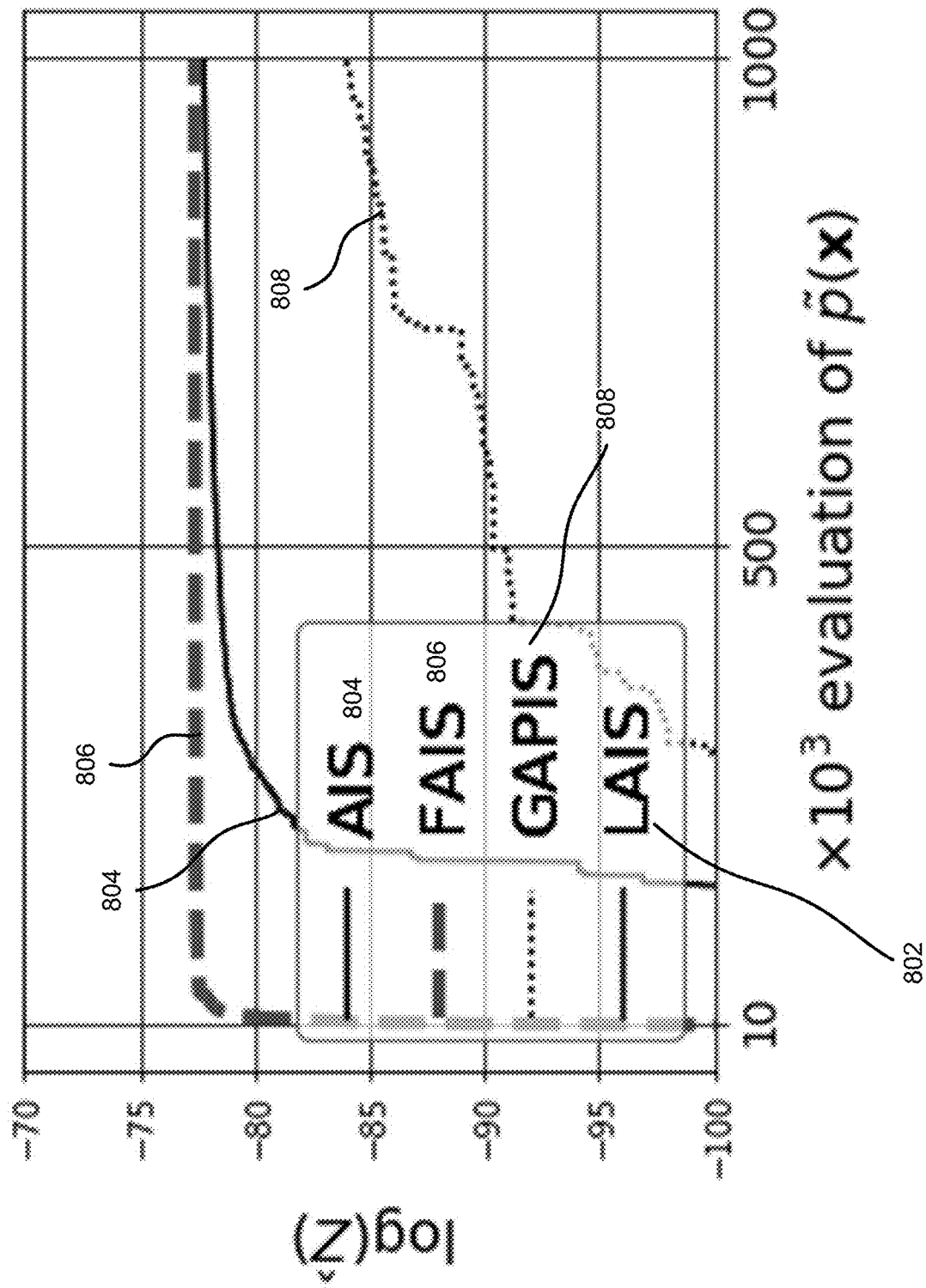
FIG. 8B is a graph diagram of a performance on the marginal likelihood estimation for RBM, according to some embodiments.

FIGS. 8A and 8B show the graphical results based on the above.

The performance on the marginal likelihood estimation for VAE is shown in FIG. 8A and for RBM is shown in FIG. 8B, with lines 802, 804, 806 and 808 indicating the results for LAIS, AIS, FAIS, GAPIS respectivelty. FAIS can reduce the error below zero by utilizing the first $10^4$ number of $\tilde{p}(x)$ evaluations while AIS requires $5 \times 10^5$.

APPENDIX

Loss Function Comparison

Figure 9A:
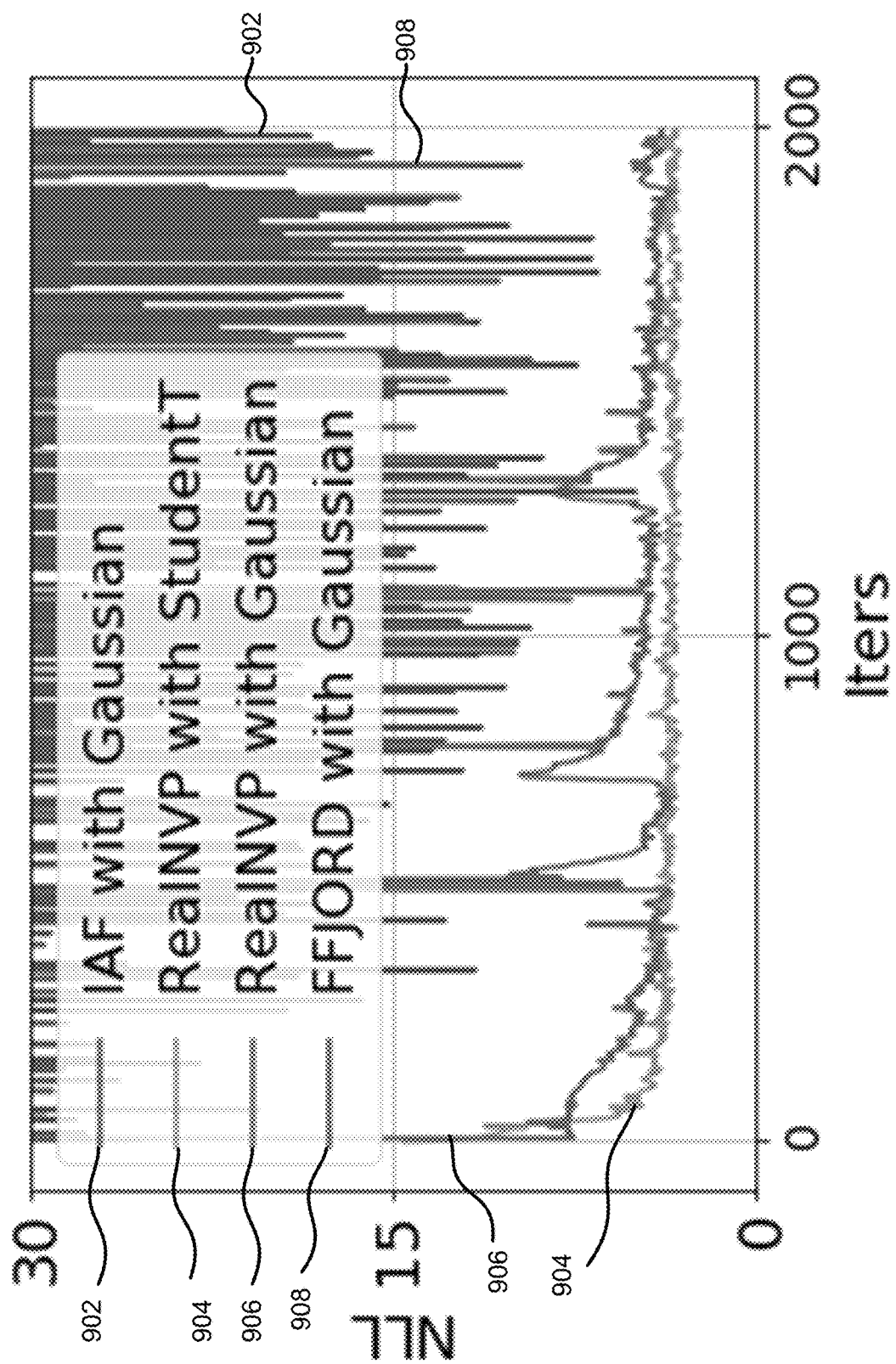
FIG. 9A is a graph diagram of the learning ability of a 2D Pareto Banana Distribution model measured with a log-likelihood, according to some embodiments.
Figure 9B:
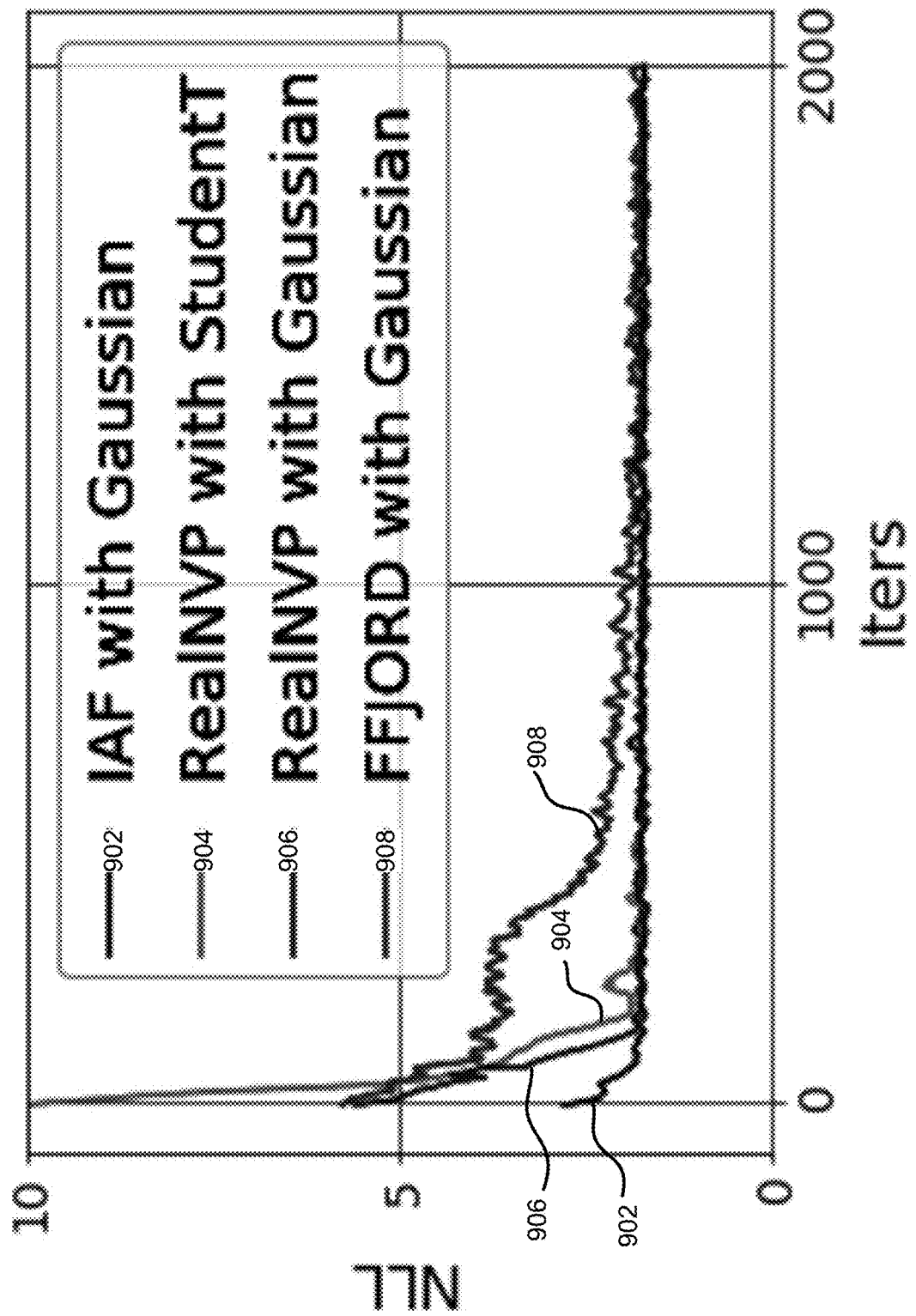
FIG. 9B is a graph diagram of the learning ability of a 2D Gaussian Banana Distribution model measured with a log-likelihood, according to some embodiments.

FIGS. 9A-9D assess the learning ability of flow model by measuring the log-likelihood, which describes the fit of q(x) to p(x). Lines 902, 904, 906, and 908 of FIGS. 9A and 9B indicate the log-likelihood results for IAF with Guassian, RealNVP with Student-t, RealNVP with Guassian, and FFJORD with Guassian models, respectivelty. FIG. 9A shows 2D Pareto Banana Distribution MLE, FIG. 9B shows 2D Gaussian Banana Distribution MLE.

Figure 9C:
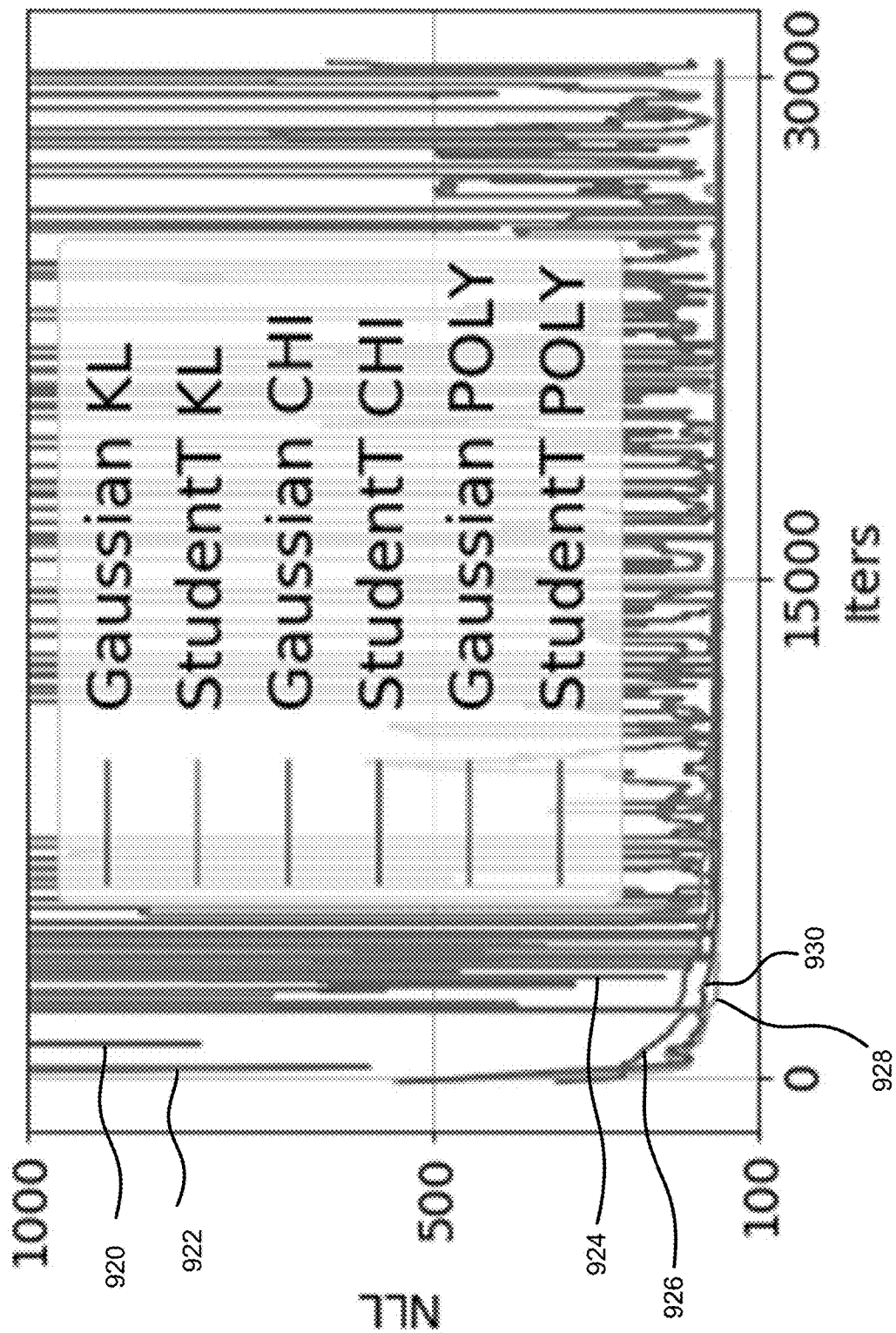
FIG. 9C is a graph diagram of the learning ability of a 100D dimensional Funnel Distribution model measured with a log-likelihood, according to some embodiments.
Figure 9D:
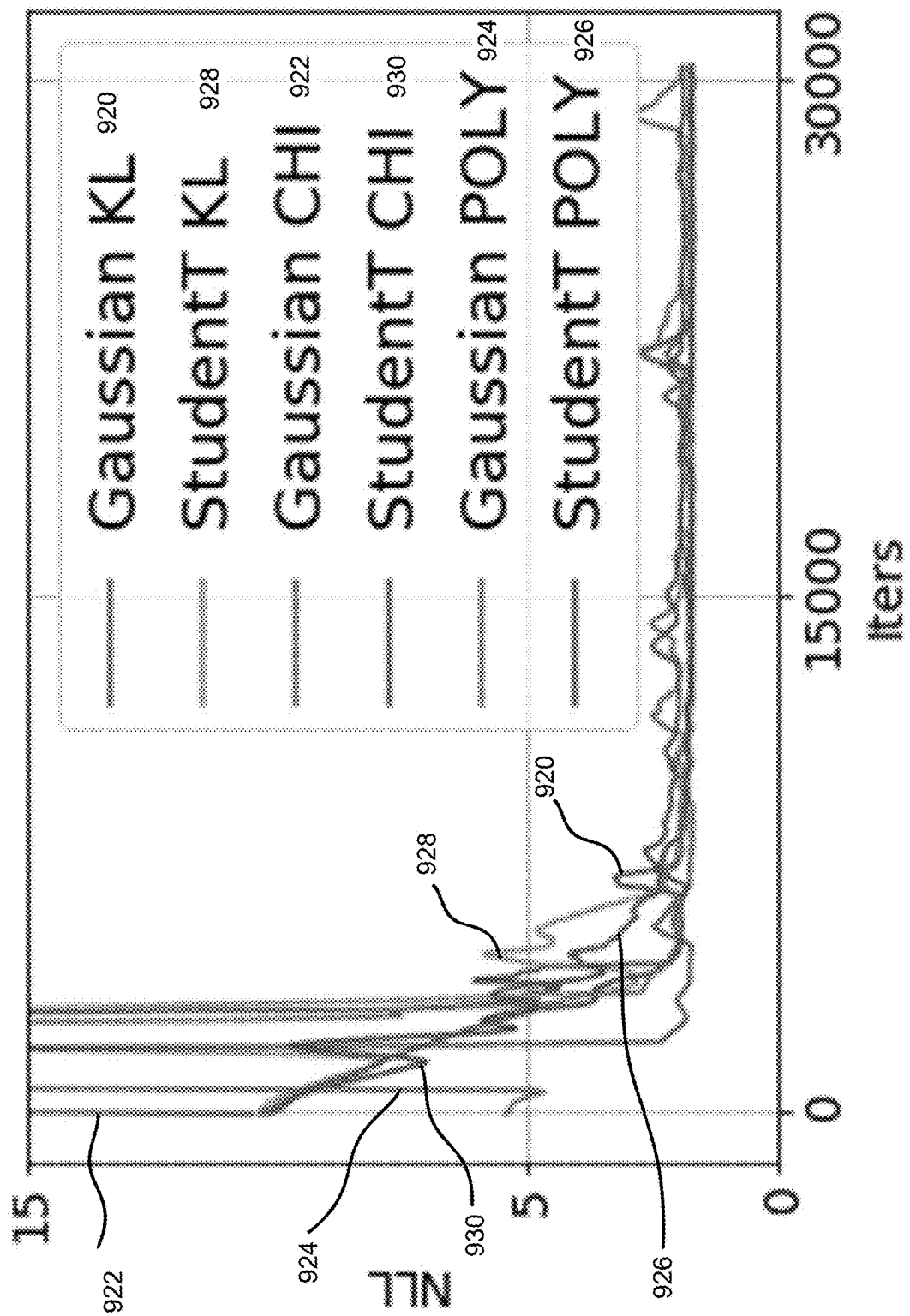
FIG. 9D is a graph diagram of the learning ability of a 2D Gaussian Banana Distribution model measured with a log-likelihood, according to some embodiments.

Lines 920, 922, 924, 926, 928, and 930 of FIG. 9C and FIG. 9D show the experimental log-likelihood of, respectively, approaches including: a Gaussian base distribution and a KL loss function, a Student's t base distribution and KL loss function, a Gaussian base distribution and a Chi Square loss function, a Student's t base distribution and a Chi Square loss function, a Gaussian base distribution and a polynomial loss function, and a Student's t base distribution and a polynomial loss function.

FIG. 9C shows 100D dimensional Funnel Distribution importance sampling. FIG. 9D shows 2D Gaussian Banana Distribution importance sampling.

FIG. 9A shows that IAF and FFJORD models are incapable of modelling heavy tailed distributions even in the 2 dimensional cases. RealNVP with Gaussian base performs better than IAF and FFJORD due to its explicitly exponential scaling; however, the occasional spikes indicates that it still fits the target poorly and such phenomena gets worse as the dimensionality increases. With Student-t based RealNVP, there may be a very smooth NLL curve.

FIG. 9B shows that when the target distribution is light tailed, Student-t based RealNVP can still perform equvalently good after few iterations. The earlier high loss is due to the fact that degree of freedom was initialized to be small at the beginning but the approach quickly adapts parameter to model the light tail.

FIG. 9C shows that a chart where, instead of asessing maximum likelihood on the generated data from target distribution, the importance sampling algorithm was executed and the likelihood was performed at each iteration. As in higher dimension, even with only one dimension is heavy tailed, Gaussian based RealNVP (e.g., lines 920, 922, and 924) catastrophic failed to fit the target distribution while Student-t based distribution (lines 926, 928, and 930) can fit well regardless of the choice of loss function.

FIG. 9D shows that, on light tailed distribution with importance sampling algorithm, that there isn't too much significant differences across all methods. Applicants Student-t based RealNVP can still successfully model the light tailed in this case.

Figure 10A:
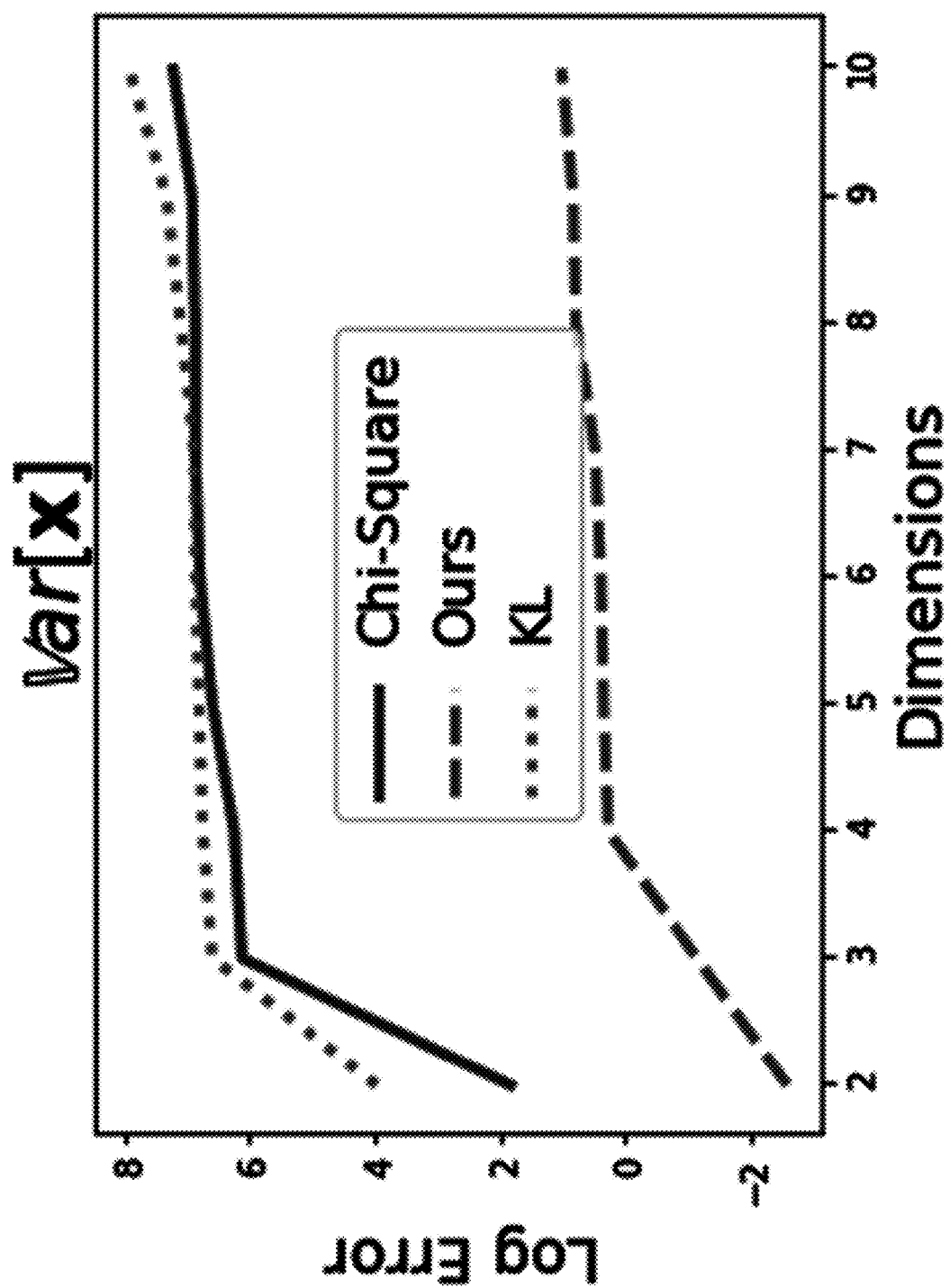
FIG. 10A is a graph diagram of a second moment estimation error on a Funnel for lower dimensions, according to some embodiments.
Figure 10B:
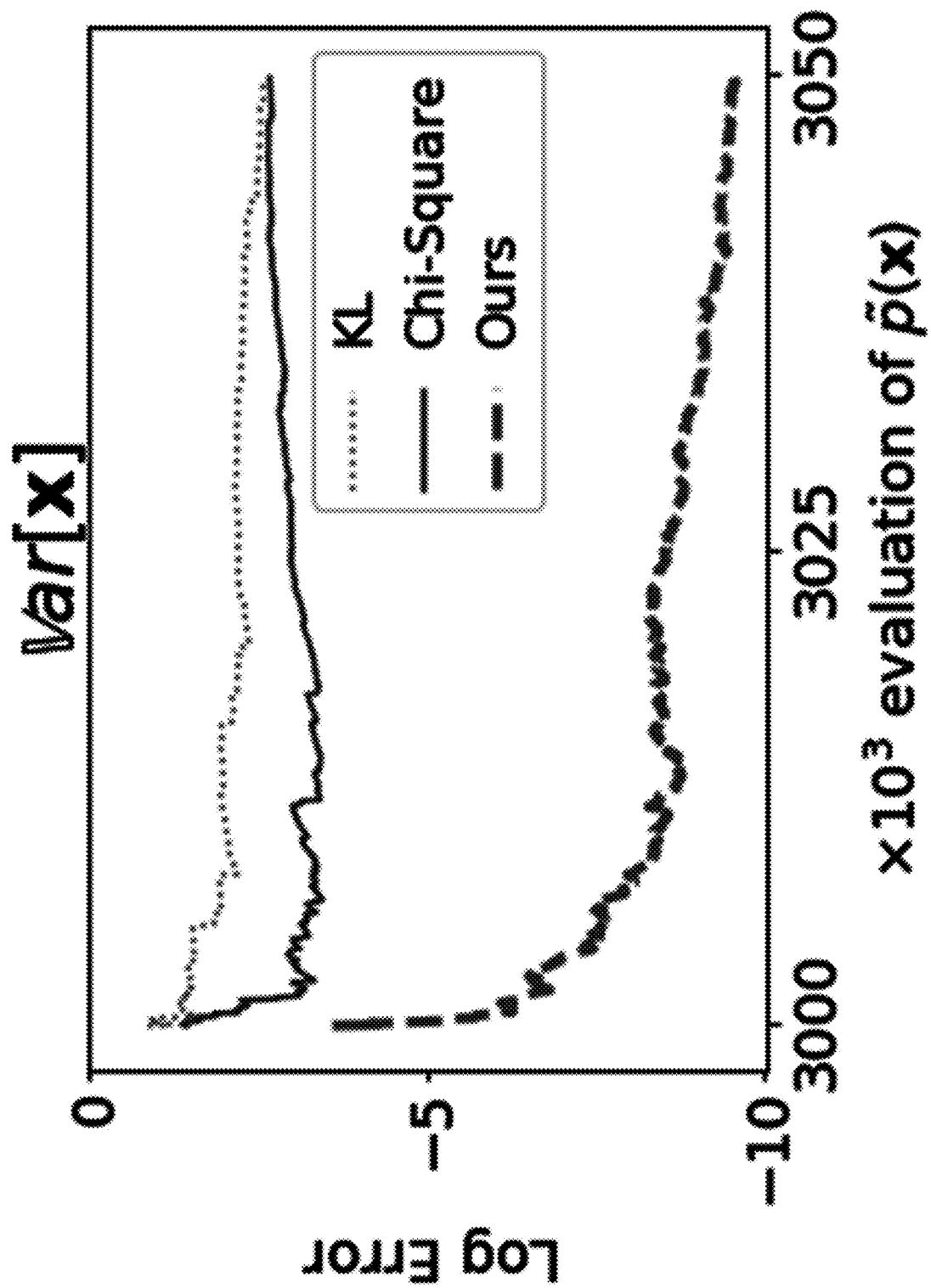
FIG. 10B is a graph diagram of a second moment estimation error on a 100D Banana Distribution, according to some embodiments.
Figure 10C:
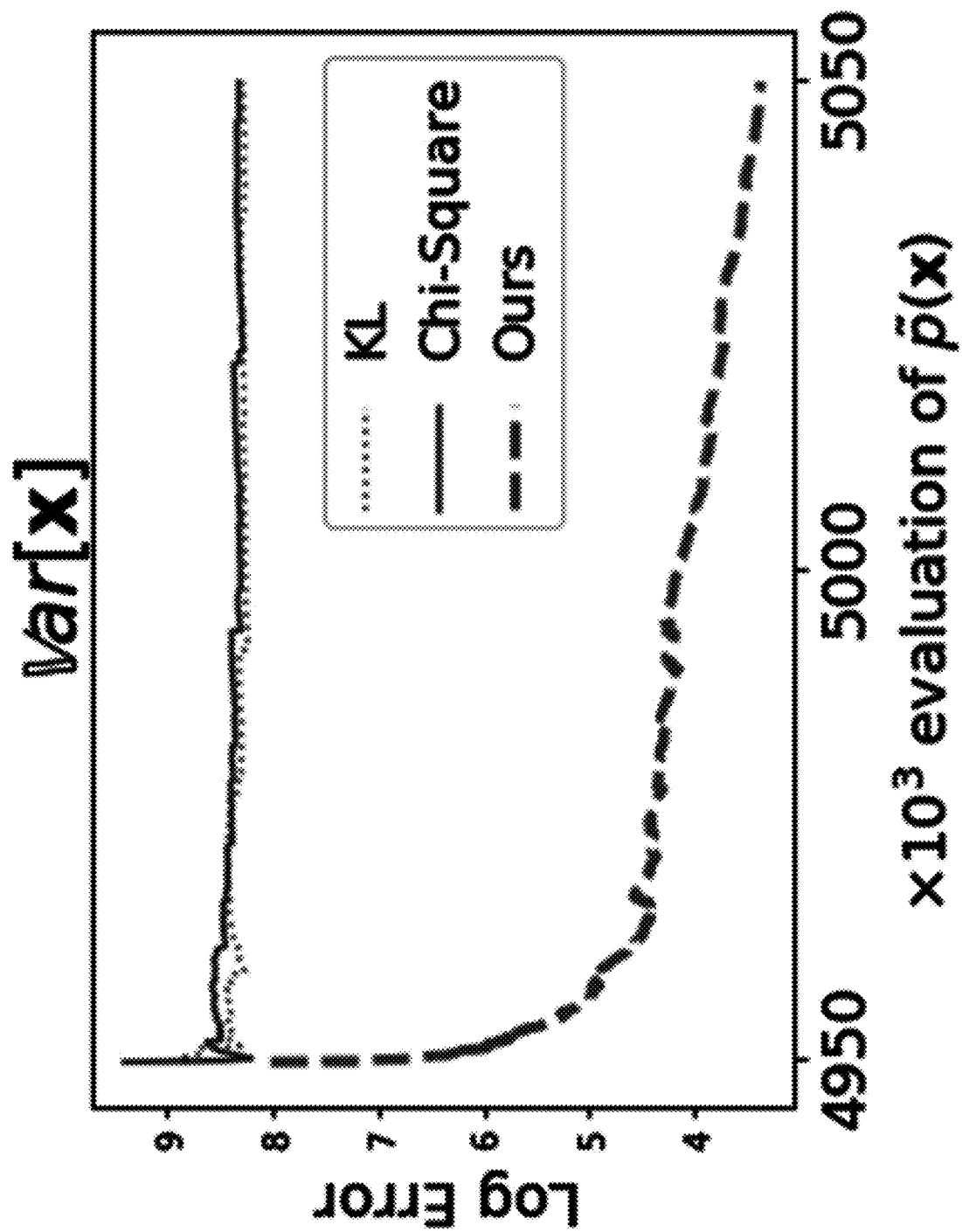
FIG. 10C is a graph diagram of a second moment estimation error on a 100D Funnel Distribution, according to some embodiments.

FIGS. 10A-10C show a comparison of Applicants optimization against KL, Chi-Square loss function. Error for each method (FIG. 10A shows the second moment estimation error on Funnel for lower dimensions; FIG. 10B shows the second moment estimation error on 100D Banana Distribution; and FIG. 10C shows the second moment estimation error on 100D Funnel Distribution) is averaged over 30 independent experiments. The estimation errors on low dimensional target distributions in which KL perform worse than Chi-Square; however, as dimension goes higher the difference is less significant while Applicants method is capable of outperforming on both low and high dimension problems (as shown in FIG. 10B and FIG. 10C).

Experiment Details

Flow Model

Applicants use the adam optimizer with learning rate 1e-3. The initial proposal distribution (base distribution) is Student-t distribution center at zero with diagonal variance of value 1. Applicants set the initial degree of freedom to be 64. 20 bijectors were used, each bijector consisting of 4 layers and each layer has 64 hidden units. The batch sample sized for each iteration is 100. Above three settings are for all experiments except for mixture model.

For the mixture model, Applicants use 5 bijectors, each bijector has 4 layers with 32 hidden units and the batch size is 10000 for each iterations.

AHMC

Given a fixed number of target evaluations, the first half of evaluations is for step-size adaption. The second half of evaluations is for HMC chain simulation. The initial samples is generated from N(0, I).

AIS

For the mixture model, Applicants set the batch size to be 1000 as this gives AIS the best estimation on Mixture. For the rest of the models, the batch size is fixed to 100, which is same as the proposed flow model approach. For all problems, each transition is done by simulating two iterations of HMC chain in which each iteration performs 2 number of leapfrog.

The initial proposal distribution is N(0, I).

SVGD

For each problem, Applicants ran SVGD for each choice of step size from {0.01,0.02,0.1,0.2,0.5}, and reported the best result for each model of them. Applicants used 1000 batch size for the mixture model. The batch size is set to be 100 (same as flow model) for the rest of the problems. The initial particles are generated from N(0, I).

GAPIS

Applicants used $N(0,10^2)$ as the initial proposal distribution. Each batch size is 100 for all problems except mixture model (for mixture model, 10000 batch size is used). The gradient descent rate is $1^{-4}$.

LAIS

For each training iteration, Applicants performed 50 number of steps for MCMC warm-up, then with additional 200 steps of MCMC simulation. In the end Applicants collected 100 more samples from MCMC and used these samples to compute the empirical mean and co-variance matrix to update the proposal Gaussian distribution. The batch size setting is same as GAPIS and FAIS, that is 10000 samples for mixture model and 100 samples for other problems.

Standard Deviation

In this section, Applicants report another estimation accuracy measure. Consider the estimator $\hat{f}^{(i)}$ results from the i-th experiment. The averaged estimator across all experiments defined as $$\bar{\hat{f}} = \frac{1}{M}\sum_j \hat{f}(j)$$

where M is the total number of experiments. $\hat{f}$ is a vector in $\mathbb{R}^D$ (in case that $\hat{f}$ is the estimator of normalizing constant, it's a constant). To analyze its accuracy, Applicants also look at the standard deviation over all experiments; which would be in the form of $(\bar{\hat{f}}_1 \pm \sigma_{\hat{f}_1}, \ldots, \bar{\hat{f}}_D \pm \sigma_{\hat{f}_D}) \in \mathbb{R}^D$ where $\bar{\hat{f}}_d$ and $\sigma_{\hat{f}_d}$ are the averaged estimated value and the standard deviation along d-th dimension respectively. It is possible to average over the dimensions; and define $$\mu_{\hat{f}} = \frac{1}{D}\sum_{d=1}^{D}\bar{\hat{f}}_d \text{ and } \sigma_{\hat{f}}\frac{1}{D}\sum_{d=1}^{D}\sigma_{\hat{f}_d}.$$

Table 5: Moisture Distribution Result: The Number in the Table is the Standard Deviation of the Estimator:

| (r)1-2 Algorithm | $\mathbb{E}_p[x]$ | $\mathbb{V}_p[x]$ | log(Z) |
|---|---|---|---|
| True | 0 | 5 | 0 |
| FAIS | 0.01 ± 0.01 | 5.00 ± 0.04 | −0.05 ± 0.07 |
| AHMC | 0.00 ± 2.2 | 0.99 ± 0.04 | NA |
| AIS | 0.01 ± 0.08 | 5.00 ± 0.09 | −0.14 ± 0.05 |
| GAIS | −1.99 ± 0.005 | 1.00 ± 0.01 | −0.70 ± 0.03 |
| LAIS | 1.99 ± 0.23 | 0.89 ± 0.29 | −1.47 ± 0.05 |
| SVGD stepsize = 0.5 | 0.05 ± 0.07 | 4.78 ± 0.03 | NA |

Table 5: Note that although AHMC has seemingly achieved good results for the first moment estimation, it should be noted that the problem is equal weighted mixture model and the estimated value is averaged over many experiments in which each experiment stuck in one of the local modes; in this case, HMC's high standard deviation tells us that it does poorly on learning multi-modes.

Diagnostic

A natural (but not perfect) diagnostic for assessing the learning performance is to examine the disagreement between target distribution p and importance distribution q according to example embodiments is presented herein.

The method follows the re-sampling procedure with respect to the importance weights. By the end of training, a set of N samples is drawn, its importance weights are normalized to the proper probability distribution. Then, a set of M index is drawn with respect to weight distribution. The subset samples with respect to the index are retreived, and an inverse function is applied to invert this subset samples. Some multivariate statistics tests can be performed to assess the distribution of inverted samples whether the transformed samples follows the base distribution. If the inversely transformed sub-samples don't fit into base distribution, one can confidently claim q is poorly model p.

An example of the diagnostic method is shown below:

---

Algorithm 2: A simple diagnostic for flow based importance sampling method

---

Input : A fully trained normalizing flow $q(x; \Theta^T)$ parameterized by $\Theta^T = \{\theta^T ; df^T\}$; N, M ∈ N Draw N number of samples $\{x^{(i)}\}_{i=1}^N \sim q(x; \theta^T)$ and compute weights $$w^{(i)} \leftarrow \frac{\tilde{p}(x)}{q(x; \Theta^T)} \forall i$$

Normalize the weight $\overline{w}_{(i)} = \frac{w^{(i)}}{\sum_i w^{(i)}}$ $\{x^{(i)}\}_{i=1}^M \sim \text{Multinomial}(\text{prob} = \overline{w})$ Apply the inverse function $z = f_{\theta_T}^{-1}(x)$ on the re-samples Perform Multivariate Student-T test with degree $df^T$ to assess if $\{z\}$ follow Student-T base distribution

---

TABLE 6

Schwefel Distribution Result

| (r)1-2 Algorithm | $\mathbb{C}\text{ov}_p[x]$ | $\mathbb{K}\text{urtosis}_p[x]$ |
|---|---|---|
| TRUE | 9.9533 | 3 |
| FAIS | 9.65 ± 1.09 | 2.98 ± 0.36 |
| AHMC | 0.0001 ± 0.001 | 2.59 ± 0.89 |
| AIS | 0.02 ± 0.06 | $9 \cdot 10^6 \pm 2 \cdot 10^7$ |
| GAIS | 0.002 ± 0.11 | $8 \cdot 10^{13} \pm 2 \cdot 10^{14}$ |
| LAIS | 0.01 ± 0.04 | $1 \cdot 10^3 \pm 3 \cdot 10^3$ |
| SVGD stepsize = 0.1 | 24.97 ± 17.75 | 3.37 ± 2.79s |

Table 6: Note that AHMC's extremely small standard deviation and almost zero second moment estimation indicates, that adaptive method has adapted HMC's step-size so small in one of the local mode every run of experiment (another explanation could be that almost all samples get rejected).

TABLE 7

Banana Distribution Result: the number in the table is the standard deviation of the estimator:

| (r)1-2 Algorithm | $\mathbb{E}_p[x_2]$ | $\mathbb{V}_p[x_2]$ | $\mathbb{V}_p[x]$ | $\mathbb{S}\text{kew}_p[x_2]$ | log(Z) |
|---|---|---|---|---|---|
| TRUE | −2 | 3 | 1.02 | −2.5 | 0 |
| FAIS | −2.00 ± 0.01 | 2.99 ± 0.08 | 1.02 ± 0.01 | −2.54 ± 0.06 | −0.16 ± 0.01 |
| AHMC | −2.10 ± 1.07 | 0.96 ± 1.07 | 0.27 ± 0.11 | −0.21 ± 0.22 | NA |
| AIS | −1.57 ± 0.50 | 0.69 ± 0.43 | 0.43 ± 0.09 | −0.77 ± 0.66 | −1.10 ± 0.02 |
| GAIS | −1.27 ± 0.07 | 0.39 ± 0.08 | 0.33 ± 0.05 | −0.68 ± 0.16 | −0.53 ± 0.07 |
| LAIS | −0.27 ± 1.62 | 0.03 ± 0.08 | 0.02 ± 0.07 | $-1 \cdot 10^4 \pm 4 \cdot 10^4$ | −771 ± 48 |

TABLE 7-continued

Banana Distribution Result: the number in the table is the standard deviation of the estimator:

| (r)1-2 Algorithm | $\mathbb{E}_p[x_2]$ | $\mathbb{V}_p[x_2]$ | $\mathbb{V}_p[x]$ | $\mathbb{S}\text{kew}_p[x_2]$ | log(Z) |
|---|---|---|---|---|---|
| SVGD stepsize = 0.2 | −1.60 ± 0.01 | 1.44 ± 0.04 | 0.58 ± 0.002 | −2.10 ± 0.13 | NA |

Table 7: Once again the HMC seemingly has good results on estimate the first moment of the second coordinate. However, large variance among the experiment runs indicates the instability of HMC.

TABLE 8

Funnel Distribution Result

| (r)1-2 Algorithm | $\mathbb{E}_p[x1]$ | $\mathbb{V}_p[x_1]$ | $\mathbb{V}_p[x]$ | log(Z) |
|---|---|---|---|---|
| TRUE | 0 | 9 | 89 | 93 |
| FAIS | 0.11 ± 0.14 | 8.2 ± 0.59 | 86.53 ± 5.78 | 92.97 ± 0.04 |
| AHMC | 0.97 ± 2.95 | 1.24 ± 1.2 | 13.86 ± 24.16 | NA |
| AIS | −0.19 ± 0.33 | 2.09 ± 0.36 | 1.85 ± 0.87 | 92.28 ± 0.06 |
| GAIS | −15.36 ± 0.2 | 0.21 ± 0.07 | 0.002 ± 0.00 | 86.48 ± 0.35 |
| LAIS | 0.42 ± 0.16 | 0.05 ± 0.05 | 0.62 ± 0.61 | 80.34 ± 1.55 |
| SVGD stepsize = 0.02 | −1.93 ± 1.12 | 1.69 ± 1.54 | 0.13 ± 0.16 | NA |

TABLE 9

Restricted Boltzmann Machine

| Algorithm | log(Z) |
|---|---|
| TRUE | 220 |
| FAIS | 219.02 ± 0.04 |
| GAPIS | 160.07 ± 4.20 |
| LAIS | 174.04 ± 10.73 |
| AIS | 218.62 ± 0.07 |

TABLE 10

Variational Auto-Encoder

| Algorithm | log(Z) |
|---|---|
| TRUE | −76 |
| FAIS | −77.42 ± 0.01 |
| GAPIS | −84.01 ± 2.90 |
| LAIS | −156 ± 10.77 |
| AIS | −77.84 ± 0.03 |

Figure 11:
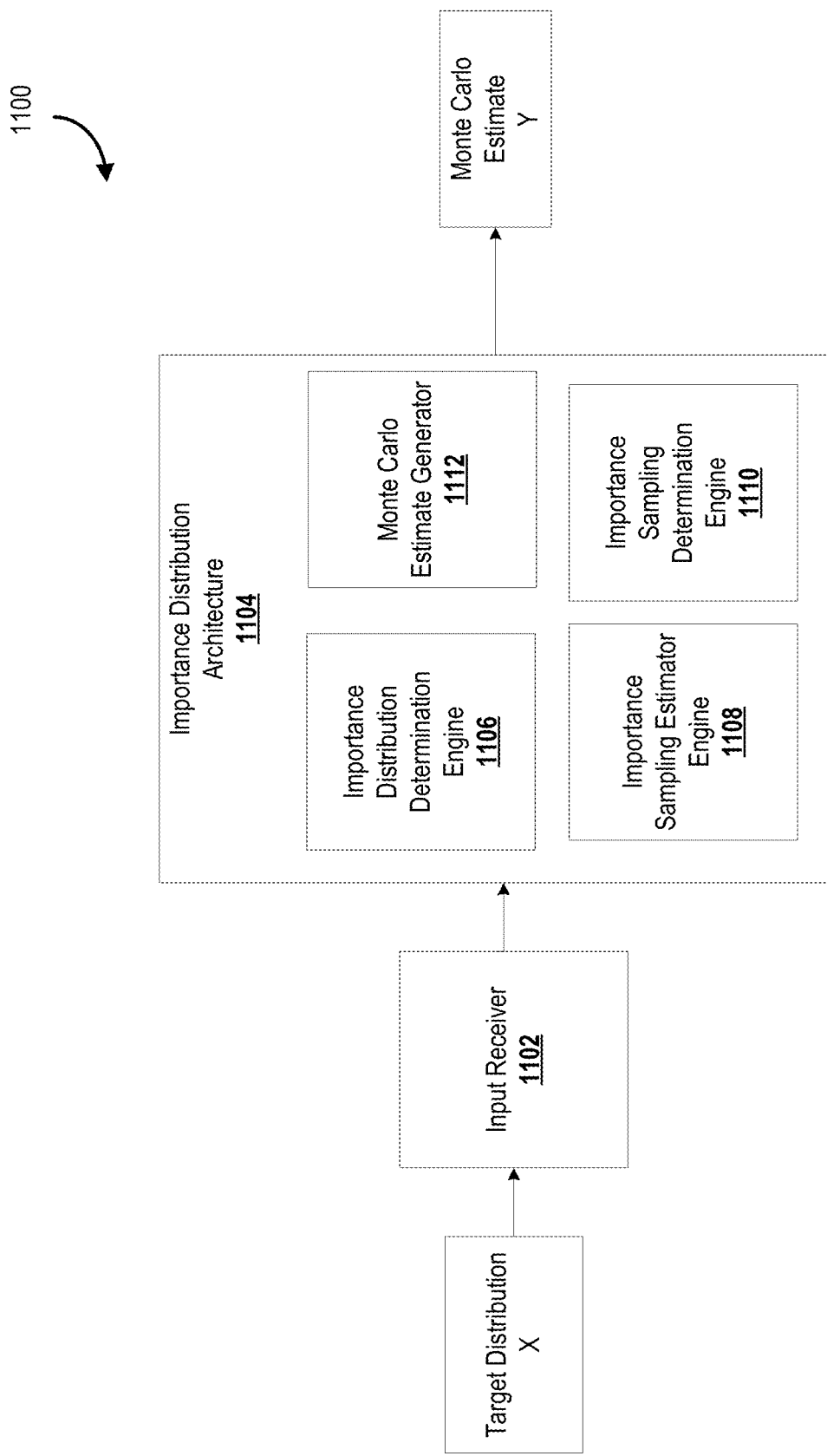
FIG. 11 is a block schematic diagram of an example system for computational estimation sampling from nontrivial probability distributions, according to some embodiments.

In FIG. 11, a system for computational estimation sampling from non-trivial probability distributions 1100 is shown, according to some embodiments.

An input x which is indicative of a target distribution is received at input receiver 1102. In example embodiments, the target distribution is represented by a high dimensional integrals.

An importance distribution architecture 1104 is configured to receive the input to conduct importance sampling by drawing samples from an importance distribution, the importance sampling using a loss function adapted to minimize a variance of an importance sampling estimator for higher order moments.

In example embodiments, an importance distribution determination engine 1106 determines or selects the relevant importance distribution, an importance sampling estimator engine 1108 generates samples of a distribution based on the importance distribution, an importance sampling determination engine 1110 conducts importance sampling by reviewing samples from the importance sampling estimator engine 1108, using a loss function adapted to minimize a variance of the importance sampling estimator 1108 samples for higher order moments.

The importance distribution architecture 1104 may further comprise a MC estimate generator 1112 configured to weigh the samples reviewed by the importance sampling determination engine 1110 by a ratio of a target posterior and the importance distribution to construct a MC estimate Y.

In example embodiments, the system 1100 may be configured to be a stand alone system. In some embodiments, system 1100 may be configured to connect to utilize the provided as a system interoperating upstream and downstream computing devices within a data center.

FIG. 12 is a schematic diagram of the computing device 100, which may be a server or series of servers, which in some embodiments, may be a special purpose machine that is specifically configured for generating MC estimates, having, for example, specialized hardware components and/or software components, such as graphics cards or dedicated high performance processors adapted for parallel processing. The computing device 100 can be utilized as a computer server or computational mechanism for conducting and/or retrofitting MC estimates such that an improved distribution can be used for adaptive importance sampling, which can aid in establishing improved probability distributions for modelling distributions that have significant tails. This can aid the MC estimation from a computational perspective as it can improve accuracy for a given amount of available computing resources or processing capabilities.

As depicted, the computing device 100 includes at least one processor 1202, memory 1208, at least one I/O interface 1206, and at least one network interface 1208.

Processor 1202 may be an Intel or AMD x86 or x64, PowerPC, ARM processor, or the like. Memory 1204 may include a combination of computer memory that is located either internally or externally such as, for example, random-access memory (RAM), read-only memory (ROM), compact disc read-only memory (CDROM).

Each I/O interface 1206 enables computing device 100 to interconnect with one or more input devices, such as a keyboard, mouse, camera, touch screen and a microphone, or with one or more output devices such as a display screen and a speaker. A graphical interface can be provided which receives inputs and can be used to receive parameters and/or instruction sets to control retrofitting of computational models.

Each network interface 1208 enables computing device 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

The network interface 1208 can connect to a message bus, for example, which may couple with downstream or upstream computational systems which may provide data sets for training and/or models for retrofit (e.g., data structures representing same).

Applicants, in example embodiments, propose a system where the importance distribution is adapted (according to the loss function) throughout the overall process of sampling.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A computer system for generating a Monte Carlo estimation value from a target distribution p(x) using a proposal distribution q(x) representative of a learned importance distribution to encourage computational efficiency of the generation of the Monte Carlo estimation value, the computer system comprising:
    one or more processors configured to:
    instantiate a proposal distribution model data object having a first set of parameters representative of adjustable features of the proposal distribution q(x);
    perform an iterative exploitation training stage for training the proposal distribution model data object, the iterative exploitation training stage including:
        iteratively obtaining one or more new sample observations from the proposal distribution q(x) using a normalizing flow model to represent the learned importance distribution, wherein the normalizing flow model is defined using a succession of bi-jective transformations conducted on a random variable with a defined distribution having a base distribution $p_z(z)$ representative of a probability density function of the random variable z, the base distribution having a second set of parameters, including a degree of freedom parameter adapted for modelling tail-behavior of the target distribution p(x);
        for each new sample observation of the one or more new sample observations, iteratively determining a corresponding weight value based at least upon a ratio of the target distribution p(x) and the proposal distribution q(x) corresponding to the respective new sample observation;
        updating both the first set of parameters representative of adjustable features of the proposal distribution q(x) and the second set of parameters of the base distribution based on the one or more new sample observations such that the proposal distribution q(x) is updated for a next iteration of the exploitation training stage;
        recording the one or more new sample observations from the proposal distribution q(x) along with the corresponding weight values; and
        continuing to alternatively obtain new sample observations and update both the first set of parameters of the proposal distribution q(x) and the second set of parameters of the base distribution until a number of exploitation training steps are taken; and
    generate the Monte Carlo estimation value based at least on a sum of the recorded weight values applied to each of the recorded sample observations; and
    store the Monte Carlo estimation value as a data value in an output data structure.

2. The computer system of claim 1, wherein the proposal distribution q(x) is initially poorly fit to the target distribution p(x), and the one or more processors are further configured to:
    perform an iterative exploration training stage prior to the iterative exploitation training stage, the iterative exploration training stage including, iteratively:
        iteratively obtaining a new sample observation from the proposal distribution q(x);
        updating both the first set of parameters representative of adjustable features of the proposal distribution q(x) and the second set of parameters of the base distribution based on the one or more new sample observations such that the proposal distribution q(x) is updated for a next iteration of training;
        discarding the new sample observation; and
        continuing to alternatively obtain new sample observations and update both the first set of parameters of the proposal distribution q(x) and the second set of parameters of the base distribution until a number of exploration training steps M are taken;
    wherein the proposal distribution q(x) following the exploration stage is utilized as an initial proposal distribution q(x) for the exploitation stage; and
    wherein T is a total number of training steps and wherein the number of exploitation training steps is T-M.

3. The computer system of claim 2, wherein a balance between the number of exploration training steps M and the number of exploitation training steps T-M is established using a parameter $\beta$, and the parameter $\beta$ is used to establish an annealing schedule to balance exploration of support of the proposal distribution q(x) and a fine-tuning of regions of the proposal distribution q(x).

4. The computer system of claim 1, wherein the one or more processors are configured for parallel processing using a plurality of processing cores, threads, or processes, and the steps of obtaining the one or more new sample observations and determining the corresponding weight values are conducted on parallel processing cores, threads, or processes of the plurality of processing cores, threads, or processes.

5. The computer system of claim 4, wherein the iterative steps of obtaining the one or more new sample observations and updating the proposal distribution q(x) are represented as homogenous processing tasks, and the plurality of processing cores, threads, or processes utilize graphics processing units tuned for efficient processing of the homogenous processing tasks.

6. The computer system of claim 1, wherein the degree of freedom parameter is adapted for automatically modelling tail-behavior of the target distribution p(x) by adjusting a tail heaviness characteristic of the base distribution, allowing the proposal distribution q(x) to accommodate both light and heavy tailed distribution variants of the target distribution p(x).

7. The computer system of claim 1, wherein the corresponding weight value is determined using a loss function:

$$O_{\chi^2}(f_j; \theta) = \mathbb{V}[f_j(x)w] \approx \frac{1}{N} \sum_i \left( \frac{f_j(x^{(i)}) \tilde{p}(x^{(i)})}{q(x^{(i)})} \right)^2$$

wherein the loss function is based on an optimization relation O of a variance $\mathbb{V}$ of importance weights, wherein the corresponding weight value_w is assigned a positive scalar penalty based on a distance from an empirical mean of the proposal distribution q(x), wherein a scalar function $f_j$ of the loss function parameterized by θ is utilized to match a j-th centered moment of the proposal distribution q(x) and the target distribution p(x), wherein x is a sample observation with an iterative index of i.

8. The computer system of claim 7, wherein the scalar function $f_j$ is defined by:

$$f_0(x^{(i)}) = 1 \text{ and } f_1(x^{(i)}) = \frac{1}{D} \sum_{d=1}^{D} x_d^{(i)} \text{ and For } j > 1 f_j(x^{(i)}) = \frac{1}{D} \sum_{d=1}^{D} (x_d^{(i)} - \bar{x}_d)^j$$

where the new sample observations are denoted by $x^{(i)}$ and where a sample mean is defined $\bar{x}=(\bar{x}_1, \ldots, \bar{x}_d)$ where D is an amount of the one or more new sample observations drawn prior to updating the first and the second set of parameters.

9. The computer system of claim 1, wherein the base distribution is a Student's T-distribution having adjustable tail behavior characteristics using the degree of freedom parameter.

10. The computer system of claim 1, wherein the first set of parameters are updated based on a previous value of the first set of parameters of a previous iteration.

11. A method for generating a Monte Carlo estimation value from a target distribution p(x) using a proposal distribution q(x) representative of a learned importance distribution to encourage computational efficiency of the generation of the Monte Carlo estimation value, the method comprising:

instantiating a proposal distribution model data object having a first set of parameters representative of adjustable features of the proposal distribution q(x);

performing an iterative exploitation training stage for training the proposal distribution model data object, the iterative exploitation training stage including:

iteratively obtaining one or more new sample observations from the proposal distribution q(x) using a normalizing flow model to represent the learned importance distribution, wherein the normalizing flow model is defined using a succession of bi-jective transformations conducted on a random variable with a defined distribution having a base distribution $p_z(z)$ representative of a probability density function of the random variable z, the base distribution having a second set of parameters, including a degree of freedom parameter adapted for modelling tail-behavior of the target distribution p(x);

for each new sample observation of the one or more new sample observations, iteratively determining a corresponding weight value based at least upon a ratio of the target distribution p(x) and the proposal distribution q(x) corresponding to the respective new sample observation;

updating both the first set of parameters representative of adjustable features of the proposal distribution q(x) and the second set of parameters of the base distribution based on the one or more new sample observations such that the proposal distribution q(x) is updated for a next iteration of the exploitation training stage;

recording the one or more new sample observations from the proposal distribution q(x) along with the corresponding weight values; and continuing to alternatively obtain new sample observations and update both the first set of parameters of the proposal distribution q(x) and the second set of parameters of the base distribution until a number of exploitation training steps are taken; and generating the Monte Carlo estimation value based at least on a sum of the recorded weight values applied to each of the recorded sample observations; and storing the Monte Carlo estimation value as a data value in an output data structure.

12. The method of claim 11, wherein the proposal distribution q(x) is initially poorly fit to the target distribution p(x), and the method further comprises:

performing an iterative exploration training stage prior to the iterative exploitation training stage, the iterative exploration training stage including, iteratively:

iteratively obtaining a new sample observation from the proposal distribution q(x);

updating both the first set of parameters representative of adjustable features of the proposal distribution q(x) and the second set of parameters of the base distribution based on the one or more new sample observations such that the proposal distribution q(x) is updated for a next iteration of training;

discarding the new sample observation; and continuing to alternatively obtain new sample observations and update both the first set of parameters of the proposal distribution q(x) and the second set of parameters of the base distribution until a number of exploration training steps M are taken;

wherein the proposal distribution q(x) following the exploration stage is utilized as an initial proposal distribution q(x) for the exploitation stage; and wherein T is a total number of training steps and wherein the number of exploitation training steps is T-M.

13. The method of claim 12, wherein a balance between the number of exploration training steps M and the number of exploitation training steps is established using a parameter β, and the parameter β is used to establish an annealing schedule to balance exploration of the support of the proposal distribution q(x) and a fine-tuning of regions of the proposal distribution q(x).

14. The method of claim 11, wherein the method is performed on one or more processors that are configured for parallel processing using a plurality of processing cores, threads, or processes, and the steps of obtaining the one or more new sample observations and determining the corresponding weight values are conducted on parallel processing cores, threads, or processes of the plurality of processing cores, threads, or processes.

15. The method of claim 14, wherein the iterative steps of obtaining the one or more new sample observations and updating the proposal distribution q(x) are represented as homogenous processing tasks, and the plurality of processing cores, threads, or processes utilize graphics processing units tuned for efficient processing of the homogenous processing tasks.

16. The method of claim 11, wherein the degree of freedom parameter is adapted for automatically modelling tail-behavior of the target distribution p(x) by adjusting a tail heaviness characteristic of the base distribution, allowing the proposal distribution q(x) to accommodate both light and heavy tailed distribution variants of the target distribution p(x).

17. The method of claim 11, wherein the corresponding weight value is determined using a loss function:

$$O_{\chi^2}(f_j; \theta) = \mathbb{V}[f_j(x)w] \approx \frac{1}{N}\sum_i \left(\frac{f_j(x^{(i)})\tilde{p}(x^{(i)})}{q(x^{(i)})}\right)^2$$

wherein the loss function is based on an optimization relation O of a variance $\mathbb{V}$ of importance weights, wherein the corresponding weight value w is assigned a positive scalar penalty based on a distance from an empirical mean of the proposal distribution q(x), wherein a scalar function $f_j$ of the loss function parameterized by $\theta$ is utilized to match a j-th centered moment of the proposal distribution q(x) and the target distribution p(x), wherein x is a sample observation with an iterative index of i.

18. The method of claim 17, wherein the scalar function $f_j$ is defined by:

$$f_0(x^{(i)}) = 1 \text{ and } f_1(x^{(i)}) = \frac{1}{D}\sum_{d=1}^{D} x_d^{(i)} \text{ and For } j > 1 f_j(x^{(i)}) = \frac{1}{D}\sum_{d=1}^{D}(x_d^{(i)} - \bar{x}_d)^j$$

where the new sample observations are denoted by $x^{(i)}$ and where a sample mean is defined $\bar{x}=(\bar{x}_1, \ldots, \bar{x}_d)$ where D is an amount of the one or more new sample observations drawn prior to updating the first and the second set of parameters.

19. The method of claim 11, wherein the base distribution is a Student's T-distribution having adjustable tail behavior characteristics using the degree of freedom parameter.

20. A non-transitory computer readable medium storing machine interpretable instructions which when executed by one or more processors, cause the one or more processors to perform a method for generating a Monte Carlo estimation value from a target distribution p(x) using a proposal distribution q(x) representative of a learned importance distribution to encourage computational efficiency of the generation of the Monte Carlo estimation value, the method comprising:
  instantiating a proposal distribution model data object having a first set of parameters representative of adjustable features of the proposal distribution q(x);
  performing an iterative exploitation training stage for training the proposal distribution model data object, the iterative exploitation training stage including:
    iteratively obtaining one or more new sample observations from the proposal distribution q(x) using a normalizing flow model to represent the learned importance distribution, wherein the normalizing flow model is defined using a succession of bi-jective transformations conducted on a random variable with a defined distribution having a base distribution $p_z(z)$ representative of a probability density function of the random variable z, the base distribution having a second set of parameters, including a degree of freedom parameter adapted for modelling tail-behavior of the target distribution p(x);
    for each new sample observation of the one or more new sample observations, iteratively determining a corresponding weight value based at least upon a ratio of the target distribution p(x) and the proposal distribution q(x) corresponding to the respective new sample observation;
    updating both the first set of parameters representative of adjustable features of the proposal distribution q(x) and the second set of parameters of the base distribution based on the one or more new sample observations such that the proposal distribution q(x) is updated for a next iteration of the exploitation training stage;
    recording the one or more new sample observations from the proposal distribution q(x) along with the corresponding weight values; and
    continuing to alternatively obtain new sample observations and update both the first set of parameters of the proposal distribution q(x) and the second set of parameters of the base distribution until a number of exploitation training steps are taken; and
  generating the Monte Carlo estimation value based at least on a sum of the recorded weight values applied to each of the recorded sample observations; and
  storing the Monte Carlo estimation value as a data value in an output data structure.

* * * * *